United States Patent
Mimura et al.

(10) Patent No.: US 11,870,031 B2
(45) Date of Patent: Jan. 9, 2024

(54) SOLID ELECTROLYTE COMPOSITION, SHEET FOR ALL-SOLID STATE SECONDARY BATTERY, ELECTRODE SHEET FOR ALL-SOLID STATE SECONDARY BATTERY AND METHOD FOR MANUFACTURING SAME, ALL-SOLID STATE SECONDARY BATTERY AND METHOD FOR MANUFACTURING SAME

(71) Applicant: FUJIFILM Corporation, Tokyo (JP)

(72) Inventors: Tomonori Mimura, Kanagawa (JP); Hiroaki Mochizuki, Kanagawa (JP); Masaomi Makino, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 340 days.

(21) Appl. No.: 15/992,522

(22) Filed: May 30, 2018

(65) Prior Publication Data

US 2018/0277892 A1  Sep. 27, 2018

Related U.S. Application Data

(63) Continuation of application No. PCT/JP2016/086821, filed on Dec. 9, 2016.

(30) Foreign Application Priority Data

Dec. 11, 2015 (JP) ................... 2015-241755

(51) Int. Cl.
*H01M 10/0562* (2010.01)
*H01M 4/62* (2006.01)
(Continued)

(52) U.S. Cl.
CPC ........ *H01M 10/0562* (2013.01); *C01D 15/00* (2013.01); *C08L 33/02* (2013.01);
(Continued)

(58) Field of Classification Search
CPC .......... H01M 10/0562; H01M 4/0404; H01M 4/0457; H01M 4/13; H01M 4/133;
(Continued)

(56) References Cited

U.S. PATENT DOCUMENTS 9,276,263 B2 * 3/2016 Yoshida ................ H01M 4/621
9,441,054 B2 * 9/2016 Stanga ................ H01M 8/1023
(Continued)

FOREIGN PATENT DOCUMENTS

CN    1969407 A    5/2007
CN    101002347 A    7/2007
(Continued)

OTHER PUBLICATIONS

Machine translation of JP-2011014387-A (Year: 2011).*
(Continued)

*Primary Examiner* — Milton I Cano
*Assistant Examiner* — Mary G Henshaw
(74) *Attorney, Agent, or Firm* — Sughrue Mion, PLLC

(57) ABSTRACT

Provided are a solid electrolyte composition including an inorganic solid electrolyte, binder particles which include a polymer having an SP value of 10.5 $cal^{1/2}$ $cm^{-3/2}$ or more and have an average particle diameter of 10 nm or more and 50,000 nm or less, and a dispersion medium, a sheet for an all-solid state secondary battery, an electrode sheet for an all-solid state secondary battery, and an all-solid state secondary battery for which the same solid electrolyte composition is used, and methods for manufacturing the electrode sheet for an all-solid state secondary battery and the all-solid state secondary battery.

16 Claims, 1 Drawing Sheet

(51) Int. Cl.

| | |
|---|---|
| *H01M 10/0585* | (2010.01) |
| *H01M 4/13* | (2010.01) |
| *H01B 1/06* | (2006.01) |
| *H01M 10/052* | (2010.01) |
| *C01D 15/00* | (2006.01) |
| *C08L 33/02* | (2006.01) |
| *H01M 4/133* | (2010.01) |
| *H01M 4/1393* | (2010.01) |
| *H01M 4/66* | (2006.01) |
| *H01M 10/0525* | (2010.01) |
| *H01M 10/058* | (2010.01) |
| *H01M 4/02* | (2006.01) |
| *H01M 4/139* | (2010.01) |
| *C08L 33/24* | (2006.01) |
| *C08L 75/02* | (2006.01) |
| *C08L 75/04* | (2006.01) |
| *H01M 4/04* | (2006.01) |
| *H01M 50/119* | (2021.01) |

(52) U.S. Cl.
CPC .............. *C08L 33/24* (2013.01); *C08L 75/02* (2013.01); *C08L 75/04* (2013.01); *H01B 1/06* (2013.01); *H01M 4/0404* (2013.01); *H01M 4/0457* (2013.01); *H01M 4/13* (2013.01); *H01M 4/133* (2013.01); *H01M 4/139* (2013.01); *H01M 4/1393* (2013.01); *H01M 4/62* (2013.01); *H01M 4/622* (2013.01); *H01M 4/662* (2013.01); *H01M 10/052* (2013.01); *H01M 10/058* (2013.01); *H01M 10/0525* (2013.01); *H01M 10/0585* (2013.01); *H01M 50/119* (2021.01); *H01M 2004/027* (2013.01); *H01M 2004/028* (2013.01); *H01M 2300/0071* (2013.01); *H01M 2300/0082* (2013.01); *Y02T 10/70* (2013.01)

(58) Field of Classification Search
CPC ...... H01M 4/139; H01M 4/1393; H01M 4/62; H01M 4/622; H01M 10/052; H01M 10/0525; H01M 10/058; H01M 10/0585; H01M 50/119; H01M 2004/027; H01M 2004/028; H01M 2300/0071; H01M 2300/0082; C01D 15/00; C08L 33/02; C08L 33/24; C08L 75/02; C08L 75/04; Y02T 10/70
See application file for complete search history.

(56) References Cited

U.S. PATENT DOCUMENTS

| | | | |
|---|---|---|---|
| 2007/0122716 A1* | 5/2007 | Seo .................... | H01M 10/052 |
| | | | 429/251 |
| 2014/0127579 A1 | 5/2014 | Yoshida et al. | |
| 2014/0312282 A1* | 10/2014 | Lim .................... | H01M 4/622 |
| | | | 252/511 |
| 2015/0132643 A1 | 5/2015 | Sasaki | |
| 2015/0147660 A1* | 5/2015 | Fujiki ................. | H01M 4/62 |
| | | | 29/623.5 |
| 2016/0204465 A1 | 7/2016 | Mimura et al. | |
| 2016/0359195 A1 | 12/2016 | Makino et al. | |
| 2019/0067698 A1* | 2/2019 | Matsumoto ......... | H01M 4/622 |
| 2020/0295326 A1* | 9/2020 | Qiao ................... | H01M 10/0525 |

FOREIGN PATENT DOCUMENTS

| | | | |
|---|---|---|---|
| CN | 104823308 | A | 8/2015 |
| JP | 4438104 | B2 | 3/2010 |
| JP | 2011014387 | A * | 1/2011 |
| JP | 2015-88486 | A | 5/2015 |
| JP | 2015-167126 | A | 9/2015 |
| JP | 2016-139511 | A | 8/2016 |
| JP | 2016-212990 | A | 12/2016 |
| WO | 2007/094642 | A1 | 8/2007 |
| WO | 2012/173089 | A1 | 12/2012 |
| WO | 2014/088070 | A1 | 6/2014 |
| WO | 2015/129704 | A1 | 9/2015 |
| WO | 2016/132872 | A1 | 8/2016 |

OTHER PUBLICATIONS

Signma Aldrich Fact Sheet for polyethyleneglycol (meth)acrylate (Year: 2021).*
Communication dated Nov. 8, 2019, from the European Patent Office in counterpart European Application No. 16873140.4.
Communication dated Apr. 9, 2019, issued by the Japan Patent Office in corresponding Japanese Application No. 2017-555176.
Communication dated Aug. 5, 2019 from the Korean Intellectual Property Office in corresponding application No. 10-2018-7018843.
International Preliminary Report on Patentability with the Translation of Written Opinion dated Jun. 12, 2018 issued by the International Bureau in PCT/JP2016/086821.
International Search Report for PCT/JP2016/086821 dated Mar. 14, 2017.
Notice of Reasons for Refusal dated Feb. 12, 2020 from the Japanese Patent Office in application No. 2017-555176.
Decision of Dismissal of Amendment from Japanese Patent Office dated Aug. 4, 2020 in corresponding JP Application No. 2017-555176.
Decision of Refusal from Japanese Patent Office dated Aug. 4, 2020 in corresponding JP Application No. 2017-555176.
Communication dated Aug. 8, 2018, from the European Patent Office in counterpart European Application No. 16873140.4.
Communication dated Jun. 3, 2020, from the European Patent Office in European Application No. 16873140.4.
G.Y. Gor et al., "Swelling and softening of lithium-ion battery separators in electrolyte solvents", Journal of Power Sources, vol. 294, 2015, pp. 167-172 (6 Pages Total).
D. Yuying et al., "Technical Lecture on Macromolecular Materials for Battery Application (III)", Battery Bimonthly, vol. 23., No. 2, Apr. 1993, pp. 84-88 (5 Pages Total).
The State Intellectual Property Office of the P.R. of China Communication dated Sep. 28, 2020, issued in Application No. 201680072916.5.

* cited by examiner

SOLID ELECTROLYTE COMPOSITION, SHEET FOR ALL-SOLID STATE SECONDARY BATTERY, ELECTRODE SHEET FOR ALL-SOLID STATE SECONDARY BATTERY AND METHOD FOR MANUFACTURING SAME, ALL-SOLID STATE SECONDARY BATTERY AND METHOD FOR MANUFACTURING SAME

CROSS-REFERENCE TO RELATED APPLICATIONS

This application is a Continuation of PCT International Application No. PCT/JP2016/086821 filed on Dec. 9, 2016, which claims priorities under 35 U.S.C. § 119 (a) to Japanese Patent Application No. JP2015-241755 filed on Dec. 11, 2015. Each of the above applications is hereby expressly incorporated by reference, in its entirety, into the present application.

BACKGROUND OF THE INVENTION

1. Field of the Invention

The present invention relates to a solid electrolyte composition, a sheet for an all-solid state secondary battery, an electrode sheet for an all-solid state secondary battery and a method for manufacturing the same, an all-solid state secondary battery and a method for manufacturing the same.

2. Description of the Background Art

Lithium ion secondary batteries are storage batteries which have a negative electrode, a positive electrode, and an electrolyte sandwiched between the negative electrode and the positive electrode and which can be discharged and charged by lithium ions reciprocally migrating between both electrodes. In the related art, in lithium ion secondary batteries, organic electrolytic solutions have been used as electrolytes. However, organic electrolytic solutions are likely to cause liquid leakage, additionally, there is a concern that overcharging and over-discharging may cause short circuits and ignition in batteries, and there is a demand for further improving reliability and safety.

In such a circumstance, all-solid state secondary batteries in which an inorganic solid electrolyte is used instead of an organic electrolytic solution are attracting attention. In all-solid state secondary batteries, all of the negative electrode, the electrolyte, and the positive electrode are made of a solid, stability or reliability which is a problem of batteries in which an organic electrolytic solution is used can be significantly improved, and it becomes possible to extend the service lives of batteries. Furthermore, to all-solid state secondary batteries, it is possible to provide a structure in which electrodes and an electrolyte are disposed in series in a direct arrangement. Therefore, compared with secondary batteries in which an organic electrolytic solution is used, it becomes possible to increase the energy density, and the application to electrical vehicles, large-sized storage batteries, and the like is expected.

In the above-described all-solid state secondary batteries, the formation of any of an active material layer of the negative electrode, a solid electrolyte layer, and an active material layer of the positive electrode using a material containing an inorganic solid electrolyte or an active material and the binder particles (binding agent) of a specific polymer compound or the like is proposed. For example, WO2012/173089A describes the addition of a combination of a binding agent made of a specific particulate polymer and an inorganic solid electrolyte to an active material layer or the like. In addition, JP2015-88486A describes a solid electrolyte composition including an inorganic solid electrolyte, binder particles which are constituted of a specific polymer and have an average particle diameter of 10 nm or more and 1,000 nm or less, and a dispersion medium.

SUMMARY OF THE INVENTION

In recent years, rapid development has been underway for all-solid state secondary batteries, and performance required for all-solid state secondary batteries has also enhanced. Particularly, in all-solid state secondary batteries in which electrode active material layers and a solid electrolyte layer are formed of solid particles, there is a demand for suppressing an increase in the interface resistance between the solid particles or between the solid particles and a collector of an electrode and enhancing the bonding property thereof in order to improve battery performance such as ion conductivity.

An object of the present invention is to provide a solid electrolyte composition capable of suppressing an increase in the interface resistance between solid particles or between the solid particles and a collector of an electrode in an all-solid state secondary battery and, furthermore, realizing a favorable bonding property. In addition, an object of the present invention is to provide a sheet for an all-solid state secondary battery, an electrode sheet for an all-solid state secondary battery, and an all-solid state secondary battery in which the solid electrolyte composition is used. Furthermore, an object of the present invention is to provide a method for manufacturing the electrode sheet for an all-solid state secondary battery and a method for manufacturing the all-solid state secondary battery.

The present inventors found that, in an all-solid state secondary battery, in a case in which an inorganic solid electrolyte or an active material is used in combination with the particles of a polymer having a specific SP value, it is possible to improve wettability while maintaining a low reactivity with the inorganic solid electrolyte or the active material and enhance the bonding property between solid particles or between the solid particles and a collector, and furthermore, an increase in the interface resistance is also suppressed. The present invention has been completed by further repeating studies on the basis of the above-described finding.

That is, the above-described objects were achieved using the following means.

<1> A solid electrolyte composition comprising: an inorganic solid electrolyte having conductivity for ions of metal elements belonging to Group I or II of the periodic table; binder particles which include a polymer having an SP value of 10.5 $cal^{1/2}$ $cm^{-3/2}$ or more and have an average particle diameter of 10 nm or more and 50,000 nm or less; and a dispersion medium.

<2> The solid electrolyte composition according to <1>, in which the polymer has a repeating unit derived from a monomer having an SP value of 12 $cal^{1/2}$ $cm^{-3/2}$ or more or a partial structure derived from a condensation component having an SP value of 12 $cal^{1/2}$ $cm^{-3/2}$ or more in an amount of 35% by mass or more and 100% by mass or less of the entire polymer.

<3> The solid electrolyte composition according to <1> or <2>, in which a glass transition temperature of the polymer is 30° C. or lower.

<4> The solid electrolyte composition according to any one of <1> to <3>, in which the polymer has, as a side chain component, a repeating unit derived from a macromonomer having a mass-average molecular weight of 1,000 or more.

<5> The solid electrolyte composition according to any one of <1> to <4>, in which the polymer is a polyamide, a polyimide, a polyurea, a urethane resin, or an acrylic resin.

<6> The solid electrolyte composition according to any one of <1> to <5>, in which the polymer includes a repeating unit derived from at least one of monomers represented by Formulae (a-1) to (a-8).

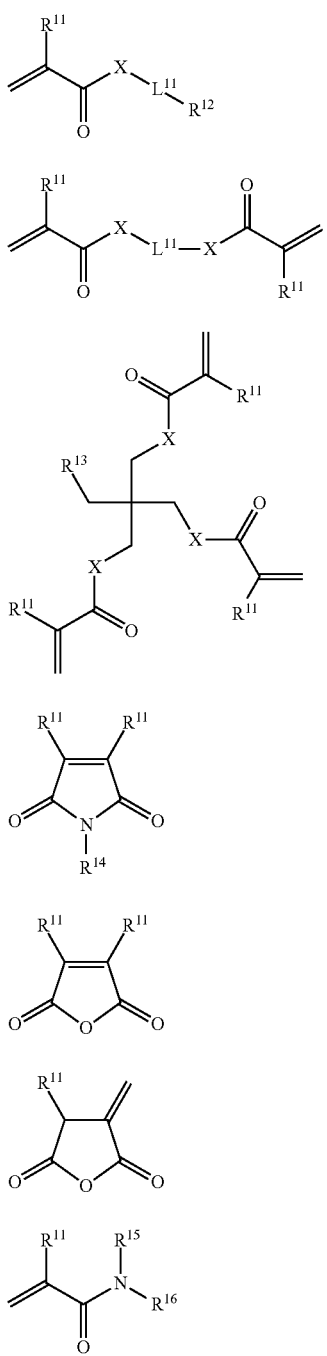

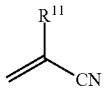

In the formulae, $L^{11}$ represents a single bond or a linking group. X represents —O— or >NH. $R^{11}$ represents a hydrogen atom, a hydroxy group, a cyano group, a halogen atom, an alkyl group, an alkenyl group, an alkynyl group, or an aryl group. $R^{12}$ and $R^{14}$ each independently represent a hydrogen atom or a substituent. $R^{13}$ represents a hydrogen atom, an alkyl group, a hydroxy group-containing group, or a carboxy group-containing group. Meanwhile, $R^{13}$ may be the linking group of $L^{11}$ and constitute a dimer at this portion. $R^{11}$ and $R^{16}$ each independently represent a substituent.

<7> The solid electrolyte composition according to any one of <1> to <6>, in which the polymer includes a hydroxy group or a carbamoyl group.

<8> The solid electrolyte composition according to any one of <1> to <7>, in which the inorganic solid electrolyte is represented by Formula (1), $$L_{a1}M_{b1}P_{c1}S_{d1}A_{e1} \qquad (1)$$

in the formula, L represents an element selected from Li, Na, and K. M represents an element selected from B, Zn, Sn, Si, Cu, Ga, Sb, Al, and Ge. A represents I, Br, Cl, or F. a1 to e1 represent the compositional ratios among the respective elements, and a1:b1:c1:d1:e1 satisfies 1 to 12:0 to 5:1:2 to 12:0 to 10.

<9> The solid electrolyte composition according to any one of <1> to <8>, in which a C log P value of the dispersion medium is 1 or more.

<10> The solid electrolyte composition according to any one of <1> to <9>, in which the dispersion medium is selected from an ether compound solvent, an aromatic compound solvent, and an aliphatic compound solvent.

<11> A solid electrolyte composition comprising: an active material capable of intercalating and deintercalating ions of metal elements belonging to Group I or Group II of the periodic table.

<12> The solid electrolyte composition according to <11>, in which the active material is a transition metal oxide or a metal oxide.

<13> A sheet for an all-solid state secondary battery, comprising: a film of the solid electrolyte composition according to any one of <1> or <10> formed on a base material.

<14> An electrode sheet for an all-solid state secondary battery, comprising: a film of the solid electrolyte composition according to <11> or <12> formed on a metal foil.

<15> An all-solid state secondary battery comprising: a positive electrode active material layer; a solid electrolyte layer; and a negative electrode active material layer in this order, in which at least one of the positive electrode active material layer, the solid electrolyte layer, and the negative electrode active material layer is a layer including an inorganic solid electrolyte having conductivity for ions of metal elements belonging to Group I or II of the periodic table and binder particles which include a polymer having an SP value of 10.5 cal$^{1/2}$ cm$^{-3/2}$ or more and have an average particle diameter of 10 nm or more and 50,000 nm or less.

<16> A method for manufacturing an electrode sheet for an all-solid state secondary battery, comprising: forming a film of the solid electrolyte composition according to <11> or <12> on a metal foil.

<17> A method for manufacturing an all-solid state secondary battery, comprising: forming an all-solid state secondary battery using the method for manufacturing an electrode sheet for an all-solid state secondary battery according to <16>.

In the present specification, numerical ranges expressed using "to" include numerical values before and after "to" as the lower limit value and the upper limit value.

In the present specification, in the case of being simply expressed, "acryl" or "(meth)acryl" refers to both methacryl and/or acryl.

In the case of being used as a material of a solid electrolyte layer or an active material layer in an all-solid state secondary battery, the solid electrolyte composition of the present invention is capable of suppressing an increase the interface resistance between solid particles or between solid particles and a collector or the like and, furthermore, also exhibits an excellent effect of realizing a favorable bonding property.

In addition, the sheet for an all-solid state secondary battery, the electrode sheet for an all-solid state secondary battery, and the all-solid state secondary battery of the present invention use the solid electrolyte composition exhibiting the above-described excellent effect and exhibit excellent performance.

Furthermore, the manufacturing methods of the present invention are capable of preferably manufacturing the electrode sheet for an all-solid state secondary battery and the all-solid state secondary battery.

The above-described characteristics and advantages and other characteristics and advantages of the present invention will be further clarified from the following description with reference to the appropriately accompanied drawings.

DESCRIPTION OF THE PREFERRED EMBODIMENTS

A solid electrolyte composition of the present invention includes a specific inorganic solid electrolyte, binder particles which include a polymer having an SP value of 10.5 $cal^{1/2}$ $cm^{-3/2}$ or more and have an average particle diameter of 10 to 50,000 nm, and a dispersion medium. Hereinafter, a preferred embodiment thereof will be described below, and, first, an all-solid state secondary battery in which the solid electrolyte composition of the present invention is used will be described.

[All-Solid State Secondary Battery]

An all-solid state secondary battery of the present invention has a positive electrode, a negative electrode facing this positive electrode, and a solid electrolyte layer between the positive electrode and the negative electrode. The positive electrode has a positive electrode active material layer on a positive electrode collector. The negative electrode has a negative electrode active material layer on a negative electrode collector.

At least one layer of the negative electrode active material layer, the positive electrode active material layer, and the solid electrolyte layer is preferably formed of the solid electrolyte composition of the present invention described below, and particularly, all of the layers are more preferably formed of the solid electrolyte composition of the present invention.

The kinds of the components and the content ratio therebetween of the active material layers or the solid electrolyte layer formed of the solid electrolyte composition are preferably the same as those in the solid content of the solid electrolyte composition.

Hereinafter, a preferred embodiment of the present invention will be described, but the present invention is not limited thereto.

Figure 1:
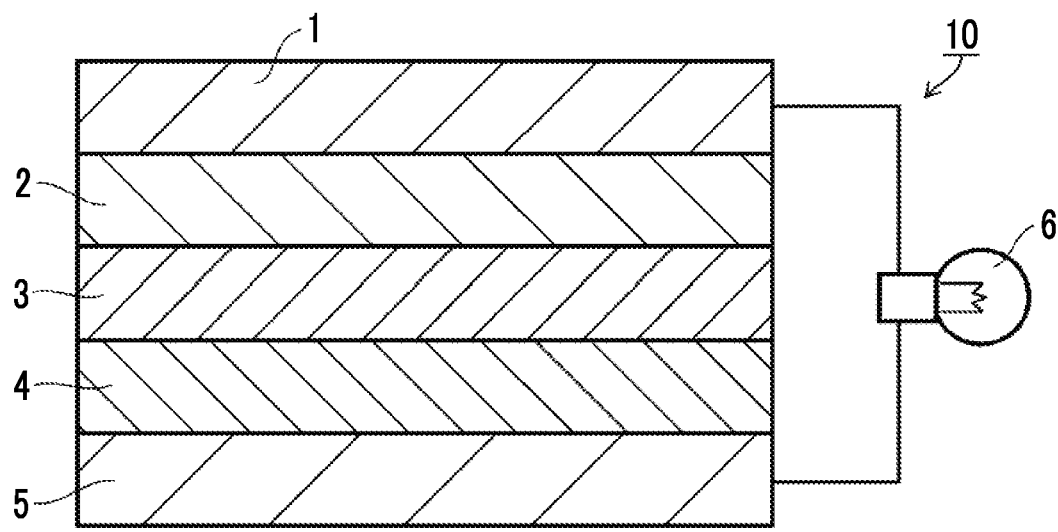
FIG. 1 is a vertical cross-sectional view schematically illustrating an all-solid state secondary battery according to a preferred embodiment of the present invention.

FIG. 1 is a cross-sectional view schematically illustrating an all-solid state secondary battery (lithium ion secondary battery) according to the preferred embodiment of the present invention. In the case of being seen from the negative electrode side, an all-solid state secondary battery 10 of the present embodiment has a structure in which a negative electrode collector 1, a negative electrode active material layer 2, a solid electrolyte layer 3, a positive electrode active material layer 4, and a positive electrode collector 5 are laminated in this order, and adjacent layers are in direct contact with each other. In a case in which the above-described structure is employed, during charging, electrons ($e^-$) are supplied to the negative electrode side, and lithium ions ($Li^+$) are accumulated thereon. On the other hand, during discharging, the lithium ions ($Li^+$) accumulated on the negative electrode return to the positive electrode side, and it is possible to supply electrons to an operation portion 6. In the example of the all-solid state secondary battery illustrated in the drawing, an electric bulb is employed as a model of the operation portion 6 and is lit by discharging.

[Positive Electrode Active Material Layer, Solid Electrolyte Layer, and Negative Electrode Active Material Layer]

In the all-solid state secondary battery 10, all of the positive electrode active material layer, the solid electrolyte layer, and the negative electrode active material layer are formed of the solid electrolyte composition of the present invention.

That is, the solid electrolyte layer 3 includes an inorganic solid electrolyte and binder particles which include a polymer having an SP value of 10.5 $cal^{1/2}$ $cm^{-3/2}$ or more and have an average particle diameter of 10 nm or more and 50,000 nm or less. The solid electrolyte layer, generally, does not include any positive electrode active materials and/or negative electrode active materials. In the solid electrolyte layer 3, the binder particles are present between the solid particles of the inorganic solid electrolyte, the active materials in the adjacent active material layers, and the like, and thus the bonding property between the solid particles is enhanced.

The positive electrode active material layer 4 and the negative electrode active material layer 2 include a positive electrode active material and a negative electrode active material respectively and further include an inorganic solid electrolyte and binder particles which include a polymer having an SP value of 10.5 $cal^{1/2}$ $cm^{-3/2}$ or more and has an average particle diameter of 10 nm or more and 50,000 nm or less. In a case in which the active material layer contains the inorganic solid electrolyte, it is possible to improve the ion conductivity. In the active material layer, the binder particles are present between solid particles and the like, between the active material layer and the solid electrolyte layer, and between the active material layer and the collector, and thus the interface resistance thereof is decreased, and the bonding property is enhanced.

The kinds of the inorganic solid electrolytes and the binder particles that the positive electrode active material layer 4, the solid electrolyte layer 3, and the negative electrode active material layer 2 contain may be identical to or different from each other.

In the present invention, there are cases in which any or both of the positive electrode active material layer and the negative electrode active material layer will be simply referred to as the active material layer or the electrode active material layer. In addition, there are cases in which any or both of the positive electrode active material and the negative electrode active material will be simply referred to as the active material or the electrode active material.

In the present invention, in a case in which the above-described binder particles are used (contained) in combination with the solid particles of the inorganic solid electrolyte, the active material, or the like, the interface contact area between the binder particles and the solid particles decreases, and thus wettability with the solid particles improves, and it is possible to enhance the bonding property between the solid particles or between the solid particles and the collector. Therefore, an increase in the interface resistance between the solid particles, an increase in the interface resistance between the solid particles and the collector, and furthermore, the peeling of the solid particles from the collector are suppressed, and excellent battery characteristics such as a high ion conductivity is exhibited.

In the present invention in which the binder particles exhibiting a favorable bonding property with the solid particles and the like are used, in addition to the above-described excellent battery characteristics, it is possible to maintain the contact state between the active materials and the solid electrolyte through the contraction and expansion of the active materials caused by the emission and absorption of the ions of metal elements belonging to Group I or II of the periodic table (the charging and discharging of the all-solid state secondary battery) and suppress an increase in the interface resistance (the cycle characteristic is excellent).

In the present invention, in a case in which the binder particles are used in combination with an inorganic solid electrolyte represented by Formula (1), a negative electrode active material such as LTO, or a positive electrode active material such as a transition metal oxide as the solid particles, superior battery characteristics are exhibited.

The mechanism of the binder particles bonding to the solid particles, the active materials, or the collectors is not clear, but is assumed to result from an increase in the contact area due to the binder particles having a large SP value which are favorably wetted to the solid particles or the like (exhibit favorable wettability).

The thicknesses of the positive electrode active material layer 4, the solid electrolyte layer 3, and the negative electrode active material layer 2 are not particularly limited. In a case in which the dimensions of ordinary batteries are taken into account, the thicknesses of the respective layers are preferably 10 to 1,000 µm and more preferably 20 µm or more and less than 500 µm. In the all-solid state secondary battery of the present invention, the thickness of at least one layer of the positive electrode active material layer 4, the solid electrolyte layer 3, or the negative electrode active material layer 2 is still more preferably 50 µm or more and less than 500 µm.

[Collector (Metal Foil)]

The positive electrode collector 5 and the negative electrode collector 1 are preferably an electron conductor.

In the present invention, there are cases in which any or both of the positive electrode collector and the negative electrode collector will be simply referred to as the collector.

As a material forming the positive electrode collector, aluminum, an aluminum alloy, stainless steel, nickel, titanium, or the like, and furthermore, a material obtained by treating the surface of aluminum or stainless steel with carbon, nickel, titanium, or silver (a material forming a thin film) is preferred, and, among these, aluminum or an aluminum alloy is more preferred.

As a material forming the negative electrode collector, aluminum, copper, a copper alloy, stainless steel, nickel, titanium, or the like, and furthermore, a material obtained by treating the surface of aluminum, copper, a copper alloy, or stainless steel with carbon, nickel, titanium, or silver is preferred, and aluminum, copper, a copper alloy, or stainless steel is more preferred.

Regarding the shape of the collector, generally, collectors having a film sheet-like shape are used, but it is also possible to use net-shaped collectors, punched collectors, compacts of lath bodies, porous bodies, foaming bodies, or fiber groups, and the like.

The thickness of the collector is not particularly limited, but is preferably 1 to 500 µm. In addition, the surface of the collector is preferably provided with protrusions and recesses by means of a surface treatment.

In the present invention, a functional layer, member, or the like may be appropriated interposed or disposed between the respective layers of the negative electrode collector, the negative electrode active material layer, the solid electrolyte layer, the positive electrode active material layer, and the positive electrode collector or on the outside thereof. In addition, the respective layers may be constituted of a single layer or multiple layers.

[Chassis]

The basic structure of the all-solid state secondary battery can be produced by disposing the respective layers described above. Depending on the use, the basic structure alone may be used as an all-solid state secondary battery, but the basic structure may be used in a state of being further enclosed by an appropriate chassis in order to have a dry battery form. The chassis may be a metallic chassis or a resin (plastic) chassis. In a case in which a metallic chassis is used, examples thereof include an aluminum alloy chassis and a stainless-steel chassis. The metallic chassis is preferably classified into a positive electrode chassis and a negative electrode chassis and electrically connected to the positive electrode collector and the negative electrode collector respectively. The positive electrode chassis and the negative electrode chassis are preferably integrated by being joined together through a short circuit prevention gasket.

[Solid Electrolyte Composition]

The solid electrolyte composition of the present invention is as described above and will be specifically described below.

(Inorganic Solid Electrolyte)

The solid electrolyte composition of the present invention contains an inorganic solid electrolyte.

A solid electrolyte of the inorganic solid electrolyte refers to a solid-form electrolyte capable of migrating ions therein. The solid electrolyte is clearly differentiated from organic solid electrolytes (polymer electrolytes represented by polyethylene oxide (PEO) or the like and organic electrolyte salts represented by lithium bis(trifluoromethanesulfonyl)imide (LiTFSI)) since the solid electrolyte does not include any organic substances as a principal ion-conductive material. In addition, the inorganic solid electrolyte is a solid in a static state and is thus not disassociated or liberated into cations and anions. Due to this fact, the inorganic solid electrolyte is also clearly differentiated from inorganic electrolyte salts in which cations and anions are disassociated or liberated in electrolytic solutions or polymers (LiPF$_6$, LiBF$_4$, lithium bis(fluorosulfonyl)imide (LiFSI), LiCl, and the like). The inorganic solid electrolyte is not particularly limited as long as the inorganic solid electrolyte has conductivity for ions of metal elements belonging to Group I or II of the periodic table and is generally a substance not having electron conductivity. In a case in which the all-solid state secondary battery of the present invention is a lithium ion battery, the inorganic solid electrolyte preferably has ion conductivity for lithium ions.

As the inorganic solid electrolyte, it is possible to appropriately select and use solid electrolyte materials that are generally used in all-solid state secondary batteries. Typical examples of the inorganic solid electrolyte include (i) sulfide-based inorganic solid electrolytes and (ii) oxide-based inorganic solid electrolytes. In the present invention, a sulfide-based inorganic solid electrolyte is preferably used since it is possible to form a more favorable interface between the active material and the inorganic solid electrolyte.

(i) Sulfide-Based Inorganic Solid Electrolytes

Sulfide-based inorganic solid electrolytes are preferably inorganic solid electrolytes which contain sulfur (S), have ion conductivity for metals belonging to Group I or II of the periodic table, and have electron-insulating properties. The sulfide-based inorganic solid electrolytes are preferably inorganic solid electrolytes which, as elements, contain at least Li, S, and P and have a lithium ion conductivity, but the sulfide-based inorganic solid electrolytes may also include elements other than Li, S, and P depending on the purposes or cases. Examples thereof include lithium ion-conductive inorganic solid electrolytes satisfying a composition represented by Formula (1).

$$L_{a1}M_{b1}P_{c1}S_{d1}A_{e1} \quad (1)$$

In Formula (1), L represents an element selected from Li, Na, and K and is preferably Li. M represents an element selected from B, Zn, Sn, Si, Cu, Ga, Sb, Al, and Ge. A represents I, Br, Cl, and F. a1 to e1 represent the compositional ratios among the respective elements, and a1:b1:c1:d1:e1 satisfies 1 to 12:0 to 5:1:2 to 12:0 to 10. Furthermore, a1 is preferably 1 to 9 and more preferably 1.5 to 7.5. b1 is preferably 0 to 3. Furthermore, d1 is preferably 2.5 to 10 and more preferably 3.0 to 8.5. Furthermore, e1 is preferably 0 to 5 and more preferably 0 to 3.

The compositional ratios among the respective elements can be controlled by adjusting the amounts of raw material compounds blended to manufacture the sulfide-based solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials among, for example, lithium sulfide (Li$_2$S), phosphorus sulfide (for example, diphosphorus pentasulfide (P$_2$S$_5$)), a phosphorus single body, a sulfur single body, sodium sulfide, hydrogen sulfide, halogenated lithium (for example, LiI, LiBr, and LiCl) and sulfides of an element represented by M (for example, SiS$_2$, SnS, and GeS$_2$).

The ratio between Li$_2$S and P$_2$S$_5$ in Li—P—S-based glass and Li—P—S-based glass ceramic is preferably 60:40 to 90:10 and more preferably 68:32 to 78:22 in terms of the molar ratio between Li$_2$S:P$_2$S$_5$. In a case in which the ratio between Li$_2$S and P$_2$S$_5$ is set in the above-described range, it is possible to increase the lithium ion conductivity. Specifically, the lithium ion conductivity can be preferably set to 1×10$^{-4}$ S/cm or more and more preferably set to 1×10$^{-3}$ S/cm or more. The upper limit is not particularly limited, but realistically 1×10$^{-1}$ S/cm or less.

As specific examples of the sulfide solid electrolyte compound, combination examples of raw materials will be described below. Specific examples thereof include Li$_2$S—P$_2$S$_5$, Li$_2$S—P$_2$S$_5$—LiCl, Li$_2$S—P$_2$S$_5$—H$_2$S, Li$_2$S—P$_2$S$_5$—H$_2$S—LiCl, Li$_2$S—LiI—P$_2$S$_5$, Li$_2$S—LiI—Li$_2$O—P$_2$S$_5$, Li$_2$S—LiBr—P$_2$S$_5$, Li$_2$S—Li$_2$O—P$_2$S$_5$, Li$_2$S—Li$_3$PO$_4$—P$_2$S$_5$, Li$_2$S—P$_2$S$_5$—P$_2$O$_5$, Li$_2$S—P$_2$S$_5$—SiS$_2$, Li$_2$S—P$_2$S$_5$—SiS$_2$—LiCl, Li$_2$S—P$_2$S$_5$—SnS, Li$_2$S—P$_2$S$_5$—Al$_2$S$_3$, Li$_2$S—GeS$_2$, Li$_2$S—GeS$_2$—ZnS, Li$_2$S—Ga$_2$S$_3$, Li$_2$S—GeS$_2$—Ga$_2$S$_3$, Li$_2$S—GeS$_2$—P$_2$S$_5$, Li$_2$S—GeS$_2$—Sb$_2$S$_5$, Li$_2$S—GeS$_2$—Al$_2$S$_3$, Li$_2$S—SiS$_2$, Li$_2$S—Al$_2$S$_3$, Li$_2$S—SiS$_2$—Al$_2$S$_3$, Li$_2$S—SiS$_2$—P$_2$S$_5$, Li$_2$S—SiS$_2$—P$_2$S$_5$—LiI, Li$_2$S—SiS$_2$—LiI, Li$_2$S—SiS$_2$—Li$_4$SiO$_4$, Li$_2$S—SiS$_2$—Li$_3$PO$_4$, Li$_{10}$GeP$_2$S$_{12}$, and the like. Here, the respective raw materials may be mixed together at any ratios. Examples of a method for synthesizing sulfide solid electrolyte materials using the above-described raw material compositions include an amorphization method. Examples of the amorphization method include a mechanical milling method, a solution method, and a melting quenching method. This is because treatments at a normal temperature become possible, and it is possible to simplify manufacturing steps.

(ii) Oxide-Based Inorganic Solid Electrolytes

Oxide-based inorganic solid electrolytes are preferably solid electrolytes which contain oxygen atoms (O), have an ion conductivity for metal elements belonging to Group I or II of the periodic table, and have electron-insulating properties.

The ion conductivity for the oxide-based inorganic solid electrolyte is preferably 1×10$^{-6}$ S/cm or more, more preferably 5×10$^{-6}$ S/cm or more, and particularly preferably 1×10$^{-5}$ S/cm or more. The upper limit is not particularly limited, but is realistically 1×10$^{-1}$ S/cm or less.

Specific examples of the compounds include Li$_{xa}$La$_{ya}$TiO$_3$ [xa satisfies 0.3≤xa≤0.7 and ya satisfies 0.3≤ya≤0.7.] (LLT); Li$^{xb}$La$_{yb}$Zr$_{zb}$M$^{bb}{}_{mb}$O$_{nb}$ (M$^{bb}$ is at least one element selected from Al, Mg, Ca, Sr, V, Nb, Ta, Ti, Ge, In and Sn, xb satisfies 5≤xb≤10, yb satisfies 1≤yb≤4, zb satisfies 1≤zb≤4, mb satisfies 0≤mb≤2, and nb satisfies 5≤nb≤20); Li$_{xc}$B$_{yc}$M$^{cc}{}_{zc}$O$_{nc}$ (M$^{cc}$ is at least one element selected from C, S, Al, Si, Ga, Ge, In, and Sn, xc satisfies 0≤xc≤5, yc satisfies 0≤yc≤1, zc satisfies 0≤zc≤1, and nc satisfies 0≤nc≤6); Li$_{xd}$(Al, Ga)$_{yd}$(Ti, Ge)$_{zd}$Si$_{ad}$P$_{md}$O$_{nd}$ (xd satisfies 1≤xd≤3, yd satisfies 0≤yd≤1, zd satisfies 0≤zd≤2, ad satisfies 0≤ad≤1, md satisfies 1≤md≤7, and nd satisfies 3≤nd≤13); Li$_{(3-2xe)}$M$^{ee}{}_{xe}$D$^{ee}$O (xe represents a number of 0 or more and 0.1 or less, and M$^{ee}$ represents a divalent metal atom. D$^{ee}$ represents a halogen atom or a combination of two or more halogen atoms); Li$_{xf}$Si$_{yf}$O$_{zf}$ (xf satisfies 1≤xf≤5, yf satisfies 0≤yf≤3, and zf satisfies 1≤zf≤10), Li$_{xg}$S$_{yg}$O$_{zg}$ (xg satisfies 1≤xg≤3, yg satisfies 0≤yg≤2, and zg satisfies 1≤zg≤10); Li$_3$BO$_3$; Li$_3$BO$_3$—Li$_2$SO$_4$; Li$_2$O—B$_2$O$_3$—P$_2$O$_5$; Li$_2$O—SiO$_2$; Li$_6$BaLa$_2$Ta$_2$O$_{12}$; Li$_3$PO$_{(4-3/2w)}$N$_w$ (w satisfies w<1); Li$_{3.5}$Zn$_{0.25}$GeO$_4$ having a lithium super ionic conductor (LISICON)-type crystal structure; La$_{0.55}$Li$_{0.35}$TiO$_3$ having a perovskite-type crystal structure; LiTi$_2$P$_3$O$_{12}$ having a natrium super ionic conductor (NASICON)-type crystal structure; $Li_{1+xh+yh}(Al, Ga)_{xh}(Ti, Ge)_{2-xh}Si_{yh}P_{3-yh}O_{12}$ (xh satisfies 0≤xh≤1 and yh satisfies 0≤yh≤1); $Li_7La_3Zr_2O_{12}$ (LLZ) having a garnet-type crystal structure.

In addition, phosphorus compounds containing Li, P, and O are also desirable. Examples thereof include lithium phosphate ($Li_3PO_4$); LiPON in which some of oxygen atoms in lithium phosphate are substituted with nitrogen, $LiPOD^1$ ($D^1$ is preferably one or more elements selected from Ti, V, Cr, Mn, Fe, Co, Ni, Cu, Zr, Nb, Mo, Ru, Ag, Ta, W, Pt, and Au); and the like.

Furthermore, it is also possible to preferably use $LiA^1ON$ ($A^1$ is one or more elements selected from Si, B, Ge, Al, C, and Ga) and the like.

Among these, LLT, $Li_{xb}La_{yb}Zr_{zb}M^{bb}{}_{mb}O_{nb}$ ($M^{bb}$, xb, yb, zb, mb, and nb are as described above), LLZ, $Li_3BO_3$; $Li_3BO_3$—$Li_2SO_4$, and $Li_{xd}(Al, Ga)_{yd}(Ti, Ge)_{zd}Si_{ad}P_{md}O_{nd}$ (xd, yd, zd, ad, md, and nd are as described above) are preferred, and LLZ, LLT, LAGP ($Li_{1.5}Al_{0.5}Ge_{1.5}(PO_4)_3$), or LATP ($[Li_{1.4}Ti_2Si_{0.4}P_{2.6}O_{12}]$—$AlPO_4$) are more preferred.

The inorganic solid electrolyte is preferably particles. The volume-average particle diameter of the particulate inorganic solid electrolyte is not particularly limited, but is preferably 0.01 μm or more and more preferably 0.1 μm or more. The upper limit is preferably 100 μm or less and more preferably 50 μm or less. Meanwhile, the volume-average particle diameter of the inorganic solid electrolyte is measured in the following order. One percent by mass of a dispersion liquid is diluted and prepared using the inorganic solid electrolyte particles and water (heptane in a case in which the inorganic solid electrolyte is unstable in water) in a 20 mL sample bottle. The diluted dispersion specimen is irradiated with 1 kHz ultrasonic waves for 10 minutes and is then immediately used for testing. Data capturing is carried out 50 times using this dispersion liquid specimen, a laser diffraction/scattering-type particle size distribution measurement instrument LA-920 (trade name, manufactured by Horiba Ltd.), and a silica cell for measurement at a temperature of 25° C., thereby obtaining the volume-average particle diameter. Regarding other detailed conditions and the like, the description of JIS Z8828:2013 "Particle size analysis-Dynamic light scattering method" is referred to as necessary. Five specimens are produced per level, and the average values thereof are employed.

In a case in which the satisfaction of both the battery performance and the interface resistance-reducing and maintaining effect is taken into account, the content of the inorganic solid electrolyte in the solid electrolyte composition is preferably 5% by mass or more, more preferably 70% by mass or more, and particularly preferably 90% by mass or more with respect to 100% by mass of the solid content. From the same viewpoint, the upper limit is preferably 99.9% by mass or less, more preferably 99.5% by mass or less, and particularly preferably 99% by mass or less.

Here, in a case in which the solid electrolyte composition contains the positive electrode active material or the negative electrode active material, regarding the content of the inorganic solid electrolyte in the solid electrolyte composition, the total content of the positive electrode active material or the negative electrode active material and the inorganic solid electrolyte is preferably in the above-described range.

Meanwhile, the solid content in the present specification refers to a component that does not disappear due to volatilization or evaporation in the case of being dried at 170° C. for six hours in a nitrogen atmosphere. Typically, the solid content indicates components other than a dispersion medium described below.

These inorganic solid electrolytes may be used singly or two or more inorganic solid electrolytes may be used in combination.

(Binder Particles)

The solid electrolyte composition of the present invention also preferably contains binder particles which include a polymer having an SP value of 10.5 ($cal^{1/2}$ $cm^{-3/2}$) or more and have an average particle diameter of 10 to 50,000 nm.

The average particle diameter of the binder particles is 50,000 nm or less, preferably 1,000 nm or less, more preferably 500 nm or less, still more preferably 300 nm or less, and particularly preferably 250 nm or less. The lower limit value is 10 nm or more, preferably 30 nm or more, more preferably 50 nm or more, and still more preferably 80 nm or more. In a case in which the size of the binder particles is set in the above-described range, while not impairing favorable wettability exhibited by the polymer, it is possible to decrease the contact area with the solid particles and the like and decrease the resistance. That is, it is possible to realize a favorable bonding property and the suppression of interface resistance.

Unless particularly otherwise described, the average particle diameter of the binder particles refers to an average particle diameter according to the following measurement conditions and definition.

One percent by mass of a dispersion liquid is diluted and prepared using the binder particles and an appropriate solvent (an organic solvent that is used to prepare the solid electrolyte composition, for example, heptane) in a 20 mL sample bottle. The diluted dispersion specimen is irradiated with 1 kHz ultrasonic waves for 10 minutes and then immediately used for testing. Data capturing is carried out 50 times using this dispersion liquid specimen, a laser diffraction/scattering-type particle size distribution measurement instrument LA-920 (trade name, manufactured by Horiba Ltd.), and a silica cell for measurement at a temperature of 25° C., and the obtained volume-average particle diameter is considered as the average particle diameter. Regarding other detailed conditions and the like, the description of JIS Z8828:2013 "Particle size analysis-Dynamic light scattering method" is referred to as necessary. Five specimens are produced and measured per level, and the average values thereof are employed.

Meanwhile, in a case in which the all-solid state secondary battery is used, the average particle diameter can be measured by, for example, disassembling the all-solid state secondary battery, peeling the active material layer or the solid electrolyte layer, measuring the average particle diameter of the material according to the above-described method for measuring the average particle diameter of the binder particles, and subtracting the measurement values of the average particle diameters of particles other than the binder particles which have been measured in advance.

The binder particles include one or more specific polymers and are preferably formed of a specific polymer.

From the viewpoint of the above-described excellent battery performance, a polymer forming the binder particles is not particularly limited as long as the SP value is 10.5 ($cal^{1/2}$ $cm^{-3/2}$) or more, and a variety of polymers can be used.

From the viewpoint of battery performance, the SP value of the polymer is preferably 11 ($cal^{1/2}$ $cm^{-3/2}$) or more, more preferably 11.5 ($cal^{1/2}$ $cm^{-3/2}$) or more, and still more preferably 12 ($cal^{1/2}$ $cm^{-3/2}$) or more. Meanwhile, the upper limit is not particularly limited and appropriately set. For example, the upper limit is preferably 20 $(cal^{1/2}\ cm^{-3/2})$ or less, more preferably 17 $(cal^{1/2}\ cm^{3}/2)$ or less, and still more preferably 15 $(cal^{1/2}\ cm^{-3/2})$ or less.

In the present invention, the SP value of the polymer $(SP_P)$ is a value that is computed from the following expression in a case in which the SP values of individual repeating units constituting the polymer are represented by $SP_1, SP_2, \ldots$ respectively.

$$SP_P{}^2 = SP_1{}^2 + SP_2{}^2 + \ldots$$

Here, unless particularly otherwise described, as the SP value of the repeating unit, a value obtained using the Hoy method (H. L. Hoy Journal of Painting, 1970, Vol. 42, 76-118) is used.

The polymer constituting the binder particles is preferably amorphous. In the present invention, the polymer "being amorphous" typically refers to a polymer in which no endothermic peak attributed to crystal melting is observed in the case of being measured using a method for measuring the glass transition temperature (Tg) described below. The Tg of the polymer is preferably 50° C. or lower, more preferably 30° C. or lower, still more preferably 20° C. or lower, and particularly preferably 10° C. or lower. The lower limit value is preferably −80° C. or higher, more preferably −60° C. or higher, still more preferably −50° C. or higher, and particularly preferably −40° C. or higher.

The glass transition temperature (Tg) is measured using a dried specimen of the binder particles and a differential scanning calorimeter: X-DSC7000 (trade name, manufactured by SII-NanoTechnology Inc.) under the following conditions. The glass transition temperature of the same specimen is measured twice, and the measurement result of the second measurement is employed.

Atmosphere in the measurement chamber: Nitrogen gas (50 mL/min)
Temperature-increase rate: 5° C./min
Measurement-start temperature: −100° C.
Measurement-end temperature: 200° C.
Specimen pan: Aluminum pan
Mass of the measurement specimen: 5 mg
Calculation of Tg: Tg is calculated by rounding off the middle temperature between the declination-start point and the declination-end point in the DSC chart to the integer.

Meanwhile, in a case in which an all-solid state secondary battery is used, for example, the all-solid state secondary battery is dissembled, the active material layer or the solid electrolyte layer is immersed in water so as to disperse the materials, then, filtering is carried out, the remaining solid is collected, and the glass transition temperature is measured using the above-described measurement method.

The mass-average molecular weight of the polymer forming the binder particles is preferably 5,000 or more, more preferably 10,000 or more, and still more preferably 30,000 or more. The upper limit is practically 1,000,000 or less, but a crosslinked aspect is also preferred.

—Measurement of Molecular Weight—

In the present invention, unless particularly otherwise described, the molecular weight of the polymer refers to the mass-average molecular weight, and the standard polystyrene-equivalent mass-average molecular weight is measured by means of gel permeation chromatography (GPC). Regarding the measurement method, basically, a value measured using a method under the following condition 1 or 2 (preferential) is used. Here, an appropriate eluent may be appropriately selected and used depending on the kind of the polymer.

(Condition 1)
Column: Two TOSOH TSKgel Super AWM-H are connected together
Carrier: 10 mM LiBr/N-methylpyrrolidone
Measurement temperature: 40° C.
Carrier flow rate: 1.0 mL/min
Specimen concentration: 0.1% by mass
Detector: Refractive index (RI) detector
(Condition 2) (preferential)
Column: A column obtained by connecting TOSOH TSKgel Super HZM-H, TOSOH TSKgel Super HZ4000, and TOSOH TSKgel Super HZ 2000 is used
Carrier: Tetrahydrofuran
Measurement temperature: 40° C.
Carrier flow rate: 1.0 mL/min
Specimen concentration: 0.1% by mass
Detector: Refractive index (RI) detector In a case in which the polymer is crosslinked by heating or the application of voltage, the molecular weight may be greater than the above-described molecular weight. The mass-average molecular weight of the polymer forming the binder particles is preferably in the above-described range at the time of initiating the use of the all-solid state secondary battery.

The polymer constituting the binder particles that are used in the present invention preferably has a moisture concentration of 100 ppm or less (mass-based).

In addition, the polymer constituting the binder particles that are used in the present invention may be dried by being crystallized or may be used in a polymer solution form. The amount of a metal-based catalyst (a urethanization or polyesterification catalyst=tin, titanium, or bismuth) is preferably small. The metal concentration in copolymers is preferably set to 100 ppm or less (mass-based) by decreasing the amount of the metal during polymerization or removing the catalyst by means of crystallization.

The structure of the polymer forming the binder particles is not particularly limited as long as the polymer has the above-described SP value.

The polymer preferably has one or more repeating units or partial structures derived from a compound (condensation component) forming the polymer. The structure of the repeating unit (unless particularly otherwise described, the repeating unit includes a partial structure) is not particularly limited. In addition, in a case in which the polymer has two or more repeating units, the mass ratio of the repeating units is not particularly limited. From the viewpoint of the bonding property, the polymer preferably includes a repeating unit derived from a monomer having an SP value of 10.5 $(cal^{1/2}\ cm^{-3/2})$ or more and preferably more than 11 $(cal^{1/2}\ cm^{-3/2})$ or a partial structure derived from a condensation component having an SP value of 10.5 $(cal^{12}\ cm^{-3/2})$ or more and preferably more than 11 $(cal^{12}\ cm^{-3/2})$ in a content of 25% to 100% by mass of the mass of the entire polymer. The content of the above-described repeating unit derived from a monomer having an SP value of 12 $(cal^{12}\ cm^{-3/2})$ or more (unless particularly otherwise described, the monomer includes a condensation component) is preferably 35% to 100% by mass and more preferably 50% by mass to 95% by mass of the entire polymer. In a case in which the polymer has a specific monomer at a specific ratio, it is possible to enhance the dispersibility of the solid electrolyte composition and, furthermore, enhance the bonding property. The SP value is as described above.

The monomer having an SP value of 10.5 $(cal^{1/2}\ cm^{-3/2})$ or more is not particularly limited, and examples thereof include the acrylic monomer, dihydroxy compounds (diol compounds), diamino compounds, dicarboxy compounds, diisocyanate compounds, tetracarboxylic dianhydride-containing compounds, vinyl-based monomers, and the like.

The monomer having an SP value of 10.5 (cal$^{1/2}$ cm$^{-3/2}$) or more, specifically, more preferably includes at least one of monomers represented by Formulae (a-11) to (a-15). The number of the monomers represented by Formulae (a-11) to (a-15) may be one or more.

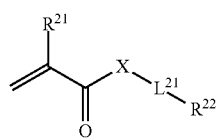   (a-11)

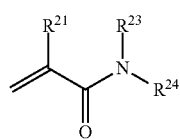   (a-12)

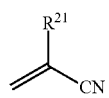   (a-13)

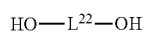   (a-14)

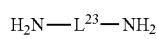   (a-15)

In the formulae, $R^{21}$ represents a hydrogen atom, a hydroxy group, a cyano group, a halogen atom, or an alkyl group. The alkyl group that can be used as $R^{21}$ is the same as the alkyl group as $R^{11}$. Among them, a methyl group is particularly preferred. The halogen atom that can be used as $R^{21}$ is the same as the halogen atom as $R^{11}$. Among them, $R^{21}$ is preferably a hydrogen atom or an alkyl group and more particularly preferably a hydrogen atom or methyl.

$R^{22}$ represents a hydrogen atom or a substituent. Examples of the substituent include the substituent Z described below. A preferred aspect thereof is the same as that of $R^{12}$. Among these, a hydrogen atom, an alkyl group, a cyano group, a phenyl group, a carboxy group, a hydroxy group, a sulfonic acid group, a phosphoric acid group, an aliphatic heterocyclic group containing an oxygen atom, an amino group, and an ammonium group are preferred, a hydrogen atom, an alkyl group, a carboxy group, a phosphoric acid group, a hydroxy group, an amino group, and an ammonium group are more preferred, and a hydrogen atom, an alkyl group, a carboxy group, a phosphoric acid group, a hydroxy group, and an ammonium group are particularly preferred.

$R^{23}$ and $R^{24}$ each are the same as $R^{15}$ described below. Among these, a hydrogen atom, methyl, and ethyl are particularly preferred.

A linking group $L^{21}$ is the same as $L^{11}$. Among these, a single bond, an alkylene group having 1 to 4 carbon atoms and preferably having 1 to 3 carbon atoms, a carbonyl group, an ether group, an imino group, and a linking group made of a combination thereof are particularly preferred.

Linking groups $L^{22}$ and $L^{23}$ are the same as $L^{11}$. Among these, a single bond, an alkylene group having 1 to 4 carbon atoms, a carbonyl group, an ether group, an imino group, and a linking group made of a combination thereof are particularly preferred.

X is the same as X described above.

Hereinafter, examples of the monomer having an SP value of 10.5 (cal$^{1/2}$ cm$^{-3/2}$) will be illustrated together with the SP value (cal$^{1/2}$ cm$^{-3/2}$). In addition, monomers having an SP value of 10.5 (cal$^{1/2}$ cm$^{-3/2}$) or more are also included in the examples of the acrylic monomer and the vinyl-based monomer. Furthermore, the condensation component having an SP value of 10.5 (cal$^{1/2}$ cm$^{-3/2}$) or more are also included in the examples of the respective compounds described in the section of the polymer having the partial structure represented by Formula (I). Regarding the monomer and the condensation component having an SP value of 10.5 (cal$^{1/2}$ cm$^{-3/2}$) or more, the present invention is not limited to monomers and condensation components exemplified below. In the following formulae, n represents an integer of 1 to 30.

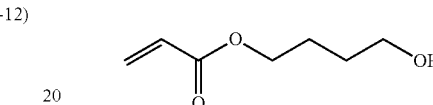

SP value: 11.7

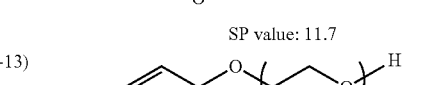

SP value: 10.6~12.7

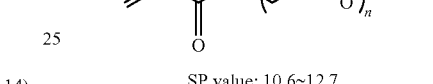 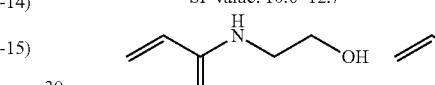

SP value: 14.6    SP value: 12.3

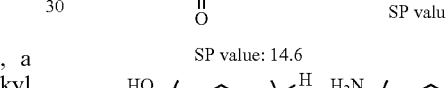 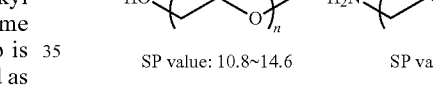

SP value: 10.8~14.6    SP value: 10.5~11.1

The polymer forming the binder particles preferably has a hydroxy group or an amide group (a carbamoyl group-CONR$_2$: R represents a hydrogen atom or a substituent (preferably represents an alkyl group, an ester group, or an ether group)). The hydroxy group and the carbamoyl group may be included in the main chain or may be included in a side chain described below, but are preferably included in the side chain. As described above, in a case in which the polymer includes a specific group in the side chain, the affinity (wettability) to sulfide-based inorganic solid electrolytes further improves, and a more favorable bonding property and a more favorable ion conductivity can be realized.

The polymer forming the binder particles preferably has, as the side chain component, a repeating unit derived from a macromonomer (X) having a mass-average molecular weight of 1,000 or more. The macromonomer is not particularly limited, and it is possible to preferably use the macromonomers described in Paragraphs "0043" to "0066" of JP2015-88486A, the content of which is preferably incorporated into the present specification and is shown below.

Side Chain Component (Macromonomer (X))

The number average molecular weight of the macromonomer is 1,000 or greater, more preferably 2,000 or greater, and particularly preferably 3,000 or greater. The upper limit thereof is preferably 500,000 or less, more preferably 100,000 or less, and particularly preferably 30,000 or less. If the polymer forming the binder particle has a side chain having the molecular weight in the range described above, the polymer can be evenly dispersed in the organic dissolving agent in a more satisfactory manner and can be mixed with the solid electrolyte particle to be applied.

Herein, if an action of the solid electrolyte composition according to the preferable embodiment of the invention is described, it is considered that the side chain component in the binder polymer has a function of improving dispersibility to the dissolving agent. In this manner, since the binder is satisfactorily dispersed in the dissolving agent in a particle state, the solid electrolyte can be fixed without being partially or entirely applied. As a result, even intervals between binder particles are maintained, electric connection between particles is not blocked, and thus it is considered that an increase in interface resistance between solid particles, between collectors, and the like is prevented. Further, if the binder polymer has a side chain, not only an effect that the binder particles are attached to the solid electrolyte particle but also an effect that the side chains thereof are twisted can be expected. Accordingly, it is considered that compatibility between the suppression of interface resistance relating to the solid electrolyte and the improvement of the adhesiveness can be achieved. Further, since dispersibility thereof is good, a step of inverting phases in the organic dissolving agent can be omitted compared with emulsion polymerization in water or the like, and a dissolving agent having a boiling point can be used as a dispersion medium. In addition, the molecular weight of the side chain component (X) can be identified by measuring a molecular weight of the polymerizable compound (macromonomer) that is combined when the polymer included in the binder particles (B) is synthesized.

Measuring of Molecular Weight

Unless otherwise described, the molecular weight of the polymer according to the invention refers to a number average molecular weight, the number average molecular weight in terms of standard polystyrene is calculated by the gel permeation chromatography (GPC). In the measuring method, a value measured by the method of Condition 1 or 2 (priority) below is basically used. However, depending on the polymer type, an appropriate or proper eluent is chosen to be used.

(Condition 1)

Column: Two items of TOSOH TSKgel Super AWM-H are connected.

Carrier: 10 mM LiBr/N-methyl pyrrolidone

Measuring temperature: 40° C.

Carrier flow rate: 1.0 ml/min

Specimen concentration: 0.1 mass %

Detector: Refractive Index (RI) detector (Condition 2)

Column: A column obtained by connecting TOSOH TSKgel Super HZM-H, TOSOH TSKgel Super HZ4000, and TOSOH TSKgel Super HZ2000 is used.

Carrier: Tetrahydrofuran

Measuring temperature: 40° C.

Carrier flow rate: 1.0 ml/min

Specimen concentration: 0.1 mass %

Detector: Refractive Index (RI) detector

The SP value of the macromonomer (X) is preferably 10 or less and more preferably 9.5 or less. The lower limit thereof is not particularly limited, but it is practical that the lower limit thereof is 5 or greater.

Definition of SP Value

Unless described otherwise, the SP value in this specification is obtained by the Hoy method (H. L. Hoy Journal of Painting, 1970, Vol. 42, 76 to 118). In addition, with respect to the SP value, the unit thereof is omitted, but the unit thereof is $cal^{1/2}$ $cm^{-3/2}$. The SP value of the side chain component (X) is almost the same as the SP value of the raw material monomer making the side chain, and thus the SP value of the side chain component (X) may be evaluated by the SP value of the raw material monomer.

The SP value may be an index indicating characteristics of being dispersed in an organic dissolving agent. Here, it is preferable that the side chain component is included in a specific molecular weight or greater and preferably in the SP value or greater, since binding properties with the solid electrolyte are enhanced, and accordingly, affinity with a solvent increases, such that the side chain component can be stably dispersed.

The main chain of the side chain component of the macromonomer (X) is not particularly limited, and a general polymer component can be applied. The macromonomer (X) preferably has a polymerizable unsaturated bond and may include, for example, various vinyl groups or (meth)acryloyl groups. According to the invention, among these, it is preferable that the macromonomer (X) has a (meth)acryloyl group.

In addition, in this specification, the expression "acryl" or "acryloyl" widely indicates not only an acryloyl group but also a group including a derivation structure thereof, and a structure having a specific substituent in an α position of an acryloyl group is included. However, in a narrow sense, a case where a hydrogen atom is in an α position is called acryl or acryloyl. A case where a methyl group is in an α position is called methacryl, and any one of acryl (a hydrogen atom in an α position) and methacryl (a methyl group in an α position) may be called as (meth)acryl or the like.

The macromonomer (X) preferably includes a repeating unit derived from a monomer selected from a (meth)acrylic acid monomer, a (meth)acrylic acid ester monomer, and (meth)acrylonitrile. In addition, the macromonomer (X) preferably includes a polymerizable double bond and a straight chain hydrocarbon structure unit having 6 or more carbon atoms (preferably an alkylene group having 6 to 30 carbon atoms and more preferably an alkylene group having 8 to 24 carbon atoms). In this manner, if the macromonomer making a side chain has a straight chain hydrocarbon structure unit S, affinity with a solvent increases and thus an effect of increasing dispersion stability can be expected.

The macromonomer (X) preferably has a portion expressed by Formula (b-11) below.

(b-11)

In the formula, $R^{11}$ represents a hydrogen atom, a hydroxy group, a cyano group, a halogen atom, and an alkyl group (the number of carbon atoms is preferably 1 to 24, more preferably 1 to 12, and particularly preferably 1 to 6), an alkenyl group (the number of carbon atoms is preferably 2 to 24, more preferably 2 to 12, and particularly preferably 2 to 6), an alkynyl group (the number of carbon atoms is preferably 2 to 24, more preferably 2 to 12, and particularly preferably 2 to 6), or an aryl group (the number of carbon atoms is preferably 6 to 22 and more preferably 6 to 14). Among these, a hydrogen atom or an alkyl group is preferable, and a hydrogen atom or a methyl group is more preferable. * is a bonding portion.

The macromonomer (X) preferably has a portion expressed by Formulae (b-12a) to (b-12c) below. Hereinafter, this portion may be referred to as a "specific polymerizable portion".

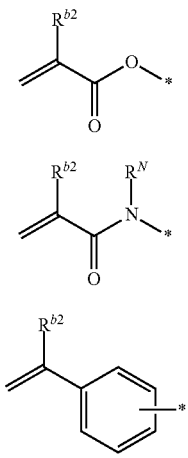

In the formulae, $R^{b2}$ represents a hydrogen atom, a hydroxy group, a cyano group, a halogen atom, and an alkyl group (the number of carbon atoms is preferably 1 to 24, more preferably 1 to 12, and particularly preferably 1 to 6), an alkenyl group (the number of carbon atoms is preferably 2 to 24, more preferably 2 to 12, and particularly preferably 2 to 6), an alkynyl group (the number of carbon atoms is preferably 2 to 24, more preferably 2 to 12, and particularly preferably 2 to 6), or an aryl group (the number of carbon atoms is preferably 6 to 22 and more preferably 6 to 14). Among these, a hydrogen atom or an alkyl group is preferable, and a hydrogen atom or a methyl group is more preferable. * is a bonding portion. $R^N$ has the same meaning as the definition indicated by the substituent T below. An arbitrary substituent T may be substituted with a benzene ring of Formulae (b-12c), (b-13c), and (b-14c).

The structural portion existing at an end of the bonding portion of * is not particularly limited, as long as a molecular weight as a macromonomer is satisfied, but the structural portion is preferably a structural portion formed of a carbon atom, an oxygen atom, and a hydrogen atom. At this point, the structural portion may have the substituent T and may have a halogen atom (fluorine atom).

The macromonomer (X) is preferably a compound expressed by Formulae (b-13a) to (b-13c) below or a compound having a repeating unit expressed by Formulae (b-14a) to (b-14c).

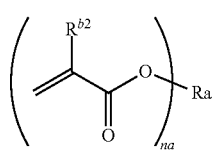

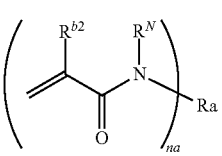

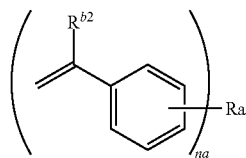

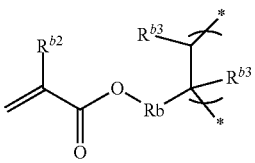

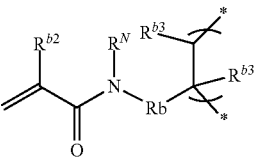

In the formulae, $R^{b2}$ and $R^{b3}$ each independently represent a hydrogen atom, a hydroxy group, a cyano group, a halogen atom, and an alkyl group (the number of carbon atoms is preferably 1 to 24, more preferably 1 to 12, and particularly preferably 1 to 6), an alkenyl group (the number of carbon atoms is preferably 2 to 24, more preferably 2 to 12, and particularly preferably 2 to 6), an alkynyl group (the number of carbon atoms is preferably 2 to 24, more preferably 2 to 12, and particularly preferably 2 to 6), or an aryl group (the number of carbon atoms is preferably 6 to 22 and more preferably 6 to 14). Among these, a hydrogen atom or an alkyl group is preferable, and a hydrogen atom or a methyl group is more preferable.

na is not particularly limited, but na is preferably an integer of 1 to 6 or more preferably 1 or 2.

Ra represents a substituent (preferably an organic group) when na is 1 and represents a linking group when na is 2 or greater.

Rb is a bivalent linking group.

When Ra and Rb are linking groups, examples of the linking group include the linking group L below. Specifically, an alkane linking group having 1 to 30 carbon atoms (an alkylene group, if the linking group is bivalent), a cycloalkane linking group having 3 to 12 carbon atoms (a cycloalkylene group, if the linking group is bivalent), an aryl linking group having 6 to 24 carbon atoms (an arylene group, if the linking group is bivalent), a heteroaryl linking group having 3 to 12 carbon atoms (a heteroarylene group, if the linking group is bivalent), an ether group (—O—), a sulfide group (—S—), a phosphinidene group (—PR—: R is a hydrogen atom or an alkyl group having 1 to 6 carbon atoms), a silylene group (—SiRR'—: R and R' are hydrogen atoms or alkyl groups having 1 to 6 carbon atoms), a carbonyl group, an imino group (—$NR^N$—: $R^N$ follows a definition described below and, herein, is preferably a hydrogen atom, an alkyl group having 1 to 6 carbon atoms, and an aryl group having 6 to 10 carbon atoms), or a combination thereof. Among these, an alkane linking group having 1 to 30 carbon atoms (an alkylene group, if the linking group is bivalent), an aryl linking group having 6 to 24 carbon atoms (an arylene group, if the linking group is bivalent), an ether group, a carbonyl group, and a combination thereof are preferable.

The linking group forming Ra and Rb is preferably a linking structure formed of a carbon atom, an oxygen atom, and a hydrogen atom. Otherwise, the linking group forming Ra and Rb is preferably a structural portion having the repeating unit (b-15) below. If Ra and Rb are linking groups, the number of atoms forming the linking group or the number of linking atoms has the same as the linking group L.

If Ra is a univalent substituent, examples of Ra include examples of the substituent T described below. Among them, an alkyl group, an alkenyl group, and an aryl group are preferable. At this point, the substituent may be substituted through a linking group L, or the linking group L may be inserted in the substituent.

Otherwise, if Ra is a univalent substituent, Ra is preferably a structure of —Rb-Rc or a structural portion having the repeating unit (b-15) below. Here, examples of Re include examples of the substituent T described below. Among them, an alkyl group, an alkenyl group, and an aryl group are preferable.

At this point, each of Ra and Rb preferably contains a straight chain hydrocarbon structure unit having 1 to 30 carbon atoms (preferably an alkylene group), and each of Ra and Rb more preferably includes the straight chain hydrocarbon structure unit S. In addition, each of Ra to Re described above may have a linking group or a substituent, and examples thereof include the linking group L or the substituent T described below.

The macromonomer (X) preferably has a repeating unit expressed by Formula (b-15) below.

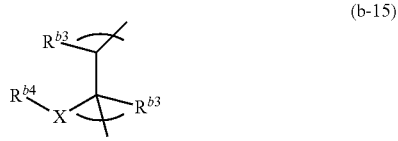

(b-15)

In the formula, $R^{b4}$ is a hydrogen atom or the substituent T described below. $R^{b4}$ is preferably a hydrogen atom, an alkyl group, an alkenyl group, and an aryl group. When $R^{b4}$ is an alkyl group, an alkenyl group, and an aryl group, $R^{b4}$ may further have the substituent T described below, for example, a halogen atom or a hydroxy group.

X is a linking group and examples thereof include examples of the linking group L. X is preferably an ether group, a carbonyl group, an imino group, an alkylene group, an arylene group, or a combination thereof. Specific examples of the linking group relating to the combination include a linking group formed of a carbonyloxy group, an amide group, an oxygen atom, a carbon atom, and a hydrogen atom. A preferable number of carbon atoms when $R^{b4}$ and X include carbon atom is the same as that of the substituent T or the linking group L. A preferable number of atoms formed of the linking group and a preferable number of the linking atoms are the same as those of the substituent T or the linking group L.

In addition, examples of the macromonomer (X) include a (meth)acrylate constituent unit such as Formula (b-15) above and an alkylene chain (for example, an ethylene chain) that may have a halogen atom (for example, a fluorine atom), in addition to the repeating unit having the polymerizable group described above. At this point, an alkylene chain may be have the ether groups (O) or the like.

The substituent may have a structure in which an arbitrary substituent is disposed in the terminal of the linking group, and examples of the terminal substituent include the substituent T below, and a hydrogen atom, a hydroxy group, a cyano group, a halogen atom, an alkyl group (the number of carbon atoms is preferably 1 to 24, more preferably 1 to 12, and particularly preferably 1 to 6), an alkenyl group (the number of carbon atoms is preferably 2 to 24, more preferably 2 to 12, and particularly preferably 2 to 6), an alkynyl group (the number of carbon atoms is preferably 2 to 24, more preferably 2 to 12, and particularly preferably 2 to 6), and an aryl group (the number of carbon atoms is preferably 6 to 22 and more preferably 6 to 14) are preferable.

In addition, with respect to the indication of the compound in the specification (for example, when a compound is attached at the foot of the indication), the indication is meant to include not only the compound but also a salt thereof and an ion thereof. In addition, the indication is meant to include a derivative in which a portion is changed such as a case where a substituent is introduced in the range in which a desired effect is achieved.

A substituent in which substitution or non-substitution is not indicated in this specification (in the same manner as in the linking group) means having an arbitrary substituent in the group. The meaning is the same as in the compound in which substitution or non-substitution is not indicated. Examples of the preferable substituent include the substituent T below.

Examples of the substituent T include the followings. Examples thereof include an alkyl group (preferably an alkyl group having 1 to 20 carbon atoms, for example, methyl, ethyl, isopropyl, t-butyl, pentyl, heptyl, 1-ethylpentyl, benzyl, 2-ethoxyethyl, and 1-carboxymethyl), an alkenyl group (preferably an alkenyl group having 2 to 20 carbon atoms, for example, vinyl, allyl, and oleyl), an alkynyl group (preferably an alkynyl group having 2 to 20 carbon atoms, for example, ethynyl, butadienyl, and phenylethynyl), a cycloalkyl group (preferably a cycloalkyl group having 3 to 20 carbon atoms, for example, cyclopropyl, cyclopentyl, cyclohexyl, and 4-methylcyclohexyl), an aryl group (preferably an aryl group having 6 to 26 carbon atoms, for example, phenyl, 1-naphthyl, 4-methoxyphenyl, 2-chlorophenyl, and 3-methylphenyl), a hetero cyclic group (preferably a hetero cyclic group having 2 to 20 carbon atoms, a hetero cyclic group of 5 or 6-membered ring having at least one of an oxygen atom, a sulfur atom, and a nitrogen atom is preferable, for example, tetrahydropyran, tetrahydrofuran, 2-pyridyl, 4-pyridyl, 2-imidazolyl, 2-benzimidazolyl, 2-thiazolyl, and 2-oxazolyl), an alkoxy group (preferably an alkoxy group having 1 to 20 carbon atoms, for example, methoxy, ethoxy, isopropyloxy, and benzyloxy), an aryloxy group (preferably an aryloxy group having 6 to 26 carbon atoms, for example, phenoxy, 1-naphthyloxy, 3-methylphenoxy, and 4-methoxyphenoxy), an alkoxycarbonyl group (preferably an alkoxycarbonyl group having 2 to 20 carbon atoms, for example, ethoxycarbonyl and 2-ethylhexyloxycarbonyl), an aryloxycarbonyl group (preferably an aryloxycarbonyl group having 6 to 26 carbon atoms, for example, phenoxycarbonyl, 1-naphthyloxycarbonyl, 3-methylphenoxycarbonyl, and 4-methoxyphenoxycarbonyl), an amino group (preferably an amino group having 0 to 20 carbon atoms, examples thereof include an alkylamino group and an arylamino group, for example, amino, N,N-dimethylamino, N,N-diethylamino, N-ethylamino, and anilino), a sulfamoyl group (preferably a sulfamoyl group having 0 to 20 carbon atoms, for example, N,N-dimethylsulfamoyl and N-phenylsulfamoyl), an acyl group (preferably an acyl group having 1 to 20 carbon atoms, for example, acetyl, propionyl, and butyryl), an aryloyl group (preferably an aryloyl group having 7 to 23 carbon atoms, for example, benzoyl), an acyloxy group (preferably an acyloxy group having 1 to 20 carbon atoms, for example, acetyloxy), an aryloyloxy group (preferably an aryloyloxy group having 7 to 23 carbon atoms, for example, benzoyloxy), a carbamoyl group (preferably a carbamoyl group having 1 to 20 carbon atoms, for example, N,N-dimethylcarbamoyl and N-phenylcarbamoyl), an acylamino group (preferably an acylamino group having 1 to 20 carbon atoms, for example, acetylamino, and benzoylamino), an alkylthio group (preferably an alkylthio group having 1 to 20 carbon atoms, for example, methylthio, ethylthio, isopropylthio, and benzylthio), an arylthio group (preferably an arylthio group having 6 to 26 carbon atoms, for example, phenylthio, 1-naphthylthio, 3-methylphenylthio, and 4-methoxyphenylthio), alkylsulfonyl group (preferably an alkylsulfonyl group having 1 to 20 carbon atoms, for example, methylsulfonyl and ethylsulfonyl), an arylsulfonyl group (preferably an arylsulfonyl group having 6 to 22 carbon atoms, for example, benzenesulfonyl), an alkylsilyl group (preferably an alkylsilyl group having 1 to 20 carbon atoms, for example, monomethylsilyl, dimethylsilyl, trimethylsilyl, and triethylsilyl), an arylsilyl group (preferably an arylsilyl group having 6 to 42 carbon atoms, for example, triphenylsilyl), a phosphoryl group (preferably a phosphoryl group having 0 to 20 carbon atoms, for example, —OP(=O)(RP)$_2$), a phosphonyl group (preferably a phosphonyl group having 0 to 20 carbon atoms, for example, —P(=O)(RP)$_2$), a phosphinyl group (preferably a phosphinyl group having 0 to 20 carbon atoms, for example, —P(RP)$_2$), a (meth)acryloyl group, a (meth)acryloyloxy group, a hydroxyl group, a cyano group, and a halogen atom (for example, a fluorine atom, a chlorine atom, a bromine atom, and an iodine atom).

In addition, the substituent T may be further substituted with each of these groups exemplified as the substituent T.

If the compound; the substituent or the linking group; or the like include an alkyl group or an alkylene group; an alkenyl group or an alkenylene group; an alkynyl group or an alkynylene group; or the like, these may have a cyclic structure or chain structure, or a straight-chain structure or branched-chain structure, and may be substituted or non-substituted as described above.

The respective substituents defined in this specification may be substituted through a linking group L described below, or the linking group L may be inserted in the structure of the substituent, in the range in which the effect of the invention is achieved. For example, an alkyl group or an alkylene group; an alkenyl group or an alkenylene group; or the like may have a hetero linking group inserted in the structure thereof.

As the linking group L, a hydrocarbon linking group [an alkylene group having 1 to 10 carbon atoms (more preferably having 1 to 6 carbon atoms and still more preferably having 1 to 3 carbon atoms), an alkenylene group having 2 to 10 carbon atoms (more preferably having 2 to 6 carbon atoms and still more preferably having 2 to 4 carbon atoms), an alkynylene group having 2 to 10 carbon atoms (more preferably having 2 to 6 carbon atoms and still more preferably having 2 to 4 carbon atoms), or an arylene group having 6 to 22 carbon atoms (more preferably having 6 to 10 carbon atoms)], a hetero linking group [a carbonyl group (—CO—), a thiocarbonyl group (—CS—), an ether group (—O—), a thioether group (—S—), an imino group (—NR$^N$—), an imine linking group (R$^N$—N=C< and —N=C(R$^N$)—), a sulfonyl group (—SO$_2$—), a sulfinyl group (—SO—), a phosphoric acid-linking group (—O—P(OH)(O)—O—), or phosphonic acid-linking group (—P(OH)(O)—O—)], or a linking group obtained by linking these groups are preferable. In addition, if a ring is formed by condensation, the hydrocarbon linking group may be linked by appropriately forming a double bond or a triple bond. As the formed ring, a 5-membered ring or a 6-membered ring is preferable. As the 5-membered ring, a nitrogen-containing 5-membered ring is preferable, and examples of the compound forming the ring include pyrrole, imidazole, pyrazole, indazole, indole, benzimidazole, pyrrolidine, imidazolidine, pyrazolidine, indoline, carbazole, and a derivative thereof. Examples of the compound forming the 6-membered ring include piperidine, morpholine, piperazine, and a derivative thereof. In addition, when an aryl group, a hetero cyclic group, or the like is included, these may be a single ring or a condensed ring. In the same manner, these may be substituted or non-substituted.

$R^N$ is a hydrogen atom or a substituent. As the substituent, an alkyl group (preferably having 1 to 24 carbon atoms, more preferably having 1 to 12, still more preferably having 1 to 6 carbon atoms, and particularly preferably having 1 to 3 carbon atoms), an alkenyl group (preferably having 2 to 24 carbon atoms, more preferably having 2 to 12 carbon atoms, still more preferably having 2 to 6 carbon atoms, and particularly preferably having 2 to 3 carbon atoms), an alkynyl group (preferably having 2 to 24 carbon atoms, more preferably having 2 to 12 carbon atoms, still more preferably having 2 to 6 carbon atoms, and particularly preferably having 2 to 3 carbon atoms), an aralkyl group (preferably having 7 to 22 carbon atoms, more preferably having 7 to 14 carbon atoms, and particularly preferably 7 to 10 carbon atoms), and an aryl group (preferably having 6 to 22 carbon atoms, more preferably having 6 to 14 carbon atoms, and particularly preferably having 6 to 10 carbon atoms) are preferable.

$R^P$ is a hydrogen atom, a hydroxyl group, or a substituent. As the substituent, an alkyl group (preferably having 1 to 24 carbon atoms, more preferably having 1 to 12 carbon atoms, still more preferably having 1 to 6 carbon atoms, and particularly preferably having 1 to 3 carbon atoms), an alkenyl group (preferably having 2 to 24 carbon atoms, more preferably having 2 to 12 carbon atoms, still more preferably having 2 to 6 carbon atoms, and particularly preferably having 2 to 3 carbon atoms), an alkynyl group (preferably having 2 to 24 carbon atoms, more preferably having 2 to 12 carbon atoms, still more preferably having 2 to 6 carbon atoms, and particularly preferably having 2 to 3 carbon atoms), an aralkyl group (preferably having 7 to 22 carbon atoms, more preferably having 7 to 14 carbon atoms, and particularly preferably having 7 to 10 carbon atoms), an aryl group (preferably having 6 to 22 carbon atoms, more preferably having 6 to 14 carbon atoms, and particularly preferably having 6 to 10 carbon atoms), an alkoxy group (preferably having 1 to 24 carbon atoms, more preferably having 1 to 12 carbon atoms, still more preferably having 1 to 6 carbon atoms, and particularly preferably having 1 to 3 carbon atoms), an alkenyloxy group (preferably having 2 to 24 carbon atoms, more preferably having 2 to 12 carbon atoms, still more preferably having 2 to 6 carbon atoms, and particularly preferably having 2 to 3 carbon atoms), an alkynyloxy group (preferably having 2 to 24 carbon atoms, more preferably having 2 to 12 carbon atoms, still more preferably having 2 to 6 carbon atoms, and particularly preferably having 2 to 3 carbon atoms), an aralkyloxy group (preferably having 7 to 22 carbon atoms, more preferably having 7 to 14 carbon atoms, and particularly preferably having 7 to 10 carbon atoms), and an aryloxy group (preferably having 6 to 22 carbon atoms, more preferably having 6 to 14 carbon atoms, and particularly preferably having 6 to 10 carbon atoms) are preferable. In this specification, the number of atoms forming a linking group is preferably 1 to 36, more preferably 1 to 24, still more preferably 1 to 12, and particularly preferably 1 to 6. The number of linking atoms of the linking group is preferably 10 or less and more preferably 8 or less. The lower limit thereof is 1 or greater. The number of the linking atoms of the linking group refers to a minimum number of atoms that are positioned in a course connecting predetermined structural portions, to be related to the linking. For example, if the linking group is —CH$_2$—C(=O)—O—, the number of atoms forming the linking group is 6, but the number of linking atoms of the linking group becomes 3.

Specifically, examples of the combination of the linking groups include the followings. Examples are an oxycarbonyl group (—OCO—), a carbonate group (—OCOO—), an amide group (—CONH—), an urethane group (—NHCOO—), an urea group (—NHCONH—), a (poly) alkyleneoxy group (—(Lr—O)x-), a carbonyl(poly)oxyalkylene group (—CO—(O—Lr)x-), a carbonyl(poly)alkyleneoxy group (—CO—(Lr—O)x-), a carbonyloxy(poly) alkyleneoxy group (—COO—(Lr—O)x-), a (poly) alkyleneimino group (—(Lr—NR$^N$)x), an alkylene(poly) iminoalkylene group (—Lr—(NR$^N$—Lr)x-), a carbonyl (poly)iminoalkylene group (—CO—(NR$^N$—Lr)x-), a carbonyl(poly)alkyleneimino group (—CO—(Lr—NR$^N$) x-), a (poly)ester group (—(CO—O—Lr)x-, —(O—CO—Lr)x-, —(O—Lr—CO)x-, —(Lr—CO—O)x-, —(Lr—O—CO)x-), and a (poly)amide group (—(CO—NR$^N$—Lr)x-, -(NR$^N$_CO—Lr)x-, —(NR$^N$—Lr—CO)x-, —(Lr—CO—NR$^N$)x-, and —(Lr—NR$^N$—CO)x-). x is an integer of 1 or greater, preferably 1 to 500, and more preferably 1 to 100.

Lr is preferably an alkylene group, an alkenylene group, and an alkynylene group. The number of carbon atoms of Lr is preferably 1 to 12, more preferably 1 to 6, and particularly preferably 1 to 3. Plural Lr's, R$^N$'s, R$^P$'s, or x's do not have to be identical to each other. The direction of the linking group is not limited to the description above, and may be understood to be a direction appropriately matched with a predetermined chemical formula.

As the macromonomer, a macromonomer having an ethylenically unsaturated bond in a terminal may be used. Here, the macromonomer is formed of a polymer chain portion and a portion of a polymerizable functional group having an ethylenically unsaturated double bond in a terminal thereof.

In the present invention, the mass-average molecular weight of the macromonomer is more preferably 2,000 or more and particularly preferably 3,000 or more. The upper limit is preferably 500,000 or less, more preferably 100,000 or less, and particularly preferably 30,000 or less.

In addition, the content of the macromonomer in the polymer is preferably 10% to 50% by mass and more preferably 20% to 40% by mass of the total mass of the polymer.

Examples of the polymer forming the binder particles include a fluorine-containing resin, a hydrocarbon-based thermoplastic resin, an acrylic resin, a vinyl resin, a urethane resin (hereinafter, also referred to as polyurethane), polyurea, polyamide, polyimide, polyester, polyether, and the like. Among these, polyamide, polyimide, polyurea, a urethane resin, or an acrylic resin (an acrylic acid ester resin) is preferred, and polyurea, a urethane resin, or an acrylic resin is particularly preferred. The polymer may be used singly or two or more polymers described above may be jointly used.

The acrylic resin is a polymer having a repeating unit derived from an acrylic monomer as a repeating unit that forms the main chain of the acrylic resin. As the acrylic monomer, a monomer selected from (meth)acrylic acid, (meth)acrylic acid esters, (meth)acrylic acid amides, and (meth)acrylonitrile is preferably used.

The number of polymerizable groups such as a vinyl group in the monomer is not particularly limited, but is preferably 1 to 8 and more preferably 1 to 4.

The polymer including a repeating unit derived from an acrylic monomer is, specifically, preferably a polymer including a repeating unit derived from at least one of monomers represented by Formulae (a-1) to (a-8). The number of the monomers represented by Formulae (a-1) to (a-8) which serve as the repeating unit in the polymer may be one or more.

(a-1)

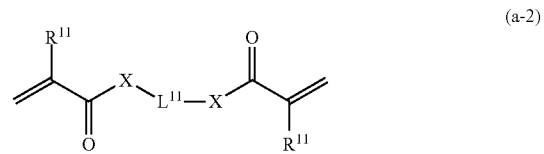

(a-2)

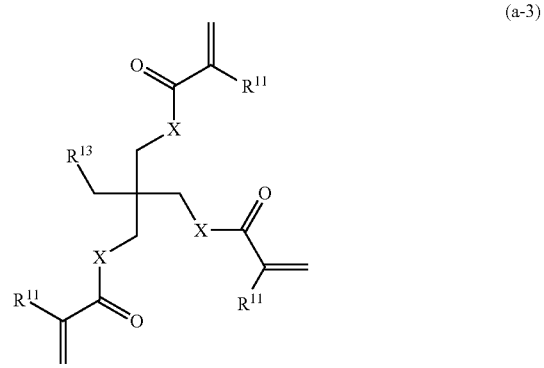

(a-3)

(a-4)

(a-5)

(a-6)

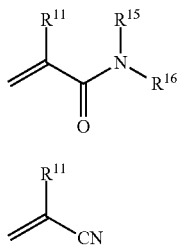

(a-7)

(a-8)

In the formulae, $R^{11}$ represents a hydrogen atom, a hydroxy group, a cyano group, a halogen atom, an alkyl group, an alkenyl group, an alkynyl group, or an aryl group.

The alkyl group that can be used as $R^{11}$ is not particularly limited, an alkyl group having 1 to 24 carbon atoms is preferred, an alkyl group having 1 to 12 carbon atoms is more preferred, and an alkyl group having 1 to 6 carbon atoms is particularly preferred.

The alkenyl group that can be used as $R^{11}$ is not particularly limited, an alkenyl group having 2 to 24 carbon atoms is preferred, an alkenyl group having 2 to 12 carbon atoms is more preferred, and an alkenyl group having 2 to 6 carbon atoms is particularly preferred.

The alkynyl group that can be used as $R^{11}$ is not particularly limited, an alkynyl group having 2 to 24 carbon atoms is preferred, an alkynyl group having 2 to 12 carbon atoms is more preferred, and an alkynyl group having 2 to 6 carbon atoms is particularly preferred.

The aryl group that can be used as $R^{11}$ is not particularly limited, an aryl group having 6 to 22 carbon atoms is preferred, and an aryl group having 6 to 14 carbon atoms is more preferred.

Examples of the halogen atom that can be used as $R^{11}$ include a fluorine atom, a chlorine atom, a bromine atom, and an iodine atom, and a fluorine atom, a chlorine atom, or a bromine atom is preferred.

Among these, $R^{11}$ is preferably a hydrogen atom or an alkyl group and more preferably a hydrogen atom or methyl.

In a case in which $R^{11}$ is a group which may have a substituent (an alkyl group, an alkenyl group, an alkynyl group, or an aryl group), $R^{11}$ may further have another substituent. Examples of the substituent include the substituent Z described below, and, among these, a halogen atom (a fluorine atom or the like), a hydroxy group, a carboxy group, an ester group, and an amide group are preferred.

$R^{12}$ represents a hydrogen atom or a substituent. The substituent is not particularly limited, and examples thereof include the substituent Z described below. Among these, a hydrogen atom, an alkyl group (preferably having 1 to 24 carbon atoms, more preferably having 1 to 12 carbon atoms, and particularly preferably having 1 to 6 carbon atoms), an alkenyl group (preferably having from 2 to 12 carbon atoms and more preferably having 2 to 6 carbon atoms), an aryl group (preferably having 6 to 22 carbon atoms and more preferably having 6 to 14 carbon atoms), an aralkyl group (preferably having 7 to 23 carbon atoms and more preferably having 7 to 15 carbon atoms), an alkoxy group (preferably having 1 to 12 carbon atoms, more preferably having 1 to 6 carbon atoms, and particularly preferably having 1 to 3 carbon atoms), an aryloxy group (preferably having 6 to 22 carbon atoms, more preferably having 6 to 14 carbon atoms, and particularly preferably having 6 to 10 carbon atoms), an aralkyloxy group (preferably having 7 to 23 carbon atoms, more preferably having 7 to 15 carbon atoms, and particularly preferably having 7 to 11 carbon atoms), a cyano group, a carboxy group, a hydroxy group, a thiol group (a sulfanyl group), a sulfonic acid group, a phosphoric acid group, a phosphonic acid group, an aliphatic heterocyclic group containing an oxygen atom (preferably having 2 to 12 carbon atoms and more preferably having 2 to 6 carbon atoms), a (meth) acryloyl group, an amino group, and an ammonium group are preferred.

Examples of the amino group that can be used as $R^{12}$ include an unsubstituted amino group ($NH_2$) and a mono- or di-substituted amino group ($NR^N{}_2$). $R^N$ represents a hydrogen atom or a substituent. Examples of the substituent include the substituent Z described below, and, among these, an alkyl group (preferably having 1 to 12 carbon atoms, more preferably having 1 to 4 carbon atoms, and particularly preferably having 1 or 2 carbon atoms; a structure forming a cyclic structure including an amino group is also preferred) and an aryl group (preferably having 6 to 22 carbon atoms, more preferably having 6 to 14 carbon atoms) are preferred, and an alkyl group having 1 or 2 carbon atoms is particularly preferred. At least one of the two $R^N$'s is a substituent.

Examples of the ammonium group (salt) that can be used as $R^{12}$ may have a substituent. Examples of the substituent include the substituent Z described below, and, among these, an alkyl group (preferably having 1 to 12 carbon atoms, more preferably having 1 to 4 carbon atoms, and particularly preferably having 1 or 2 carbon atoms; a structure forming a cyclic structure including an amino group is also preferred) and an aryl group (preferably having 6 to 22 carbon atoms, more preferably having 6 to 14 carbon atoms) are preferred, and an alkyl group having 1 or 2 carbon atoms is particularly preferred. A counter ion of the ammonium group is not particularly limited, and examples thereof include halide ions (among these, $Cl^-$, $Br^-$, and $I^-$ are preferred, and $Cl^-$ is particularly preferred), inorganic fluoride ions (examples thereof include $PF_6^-$, $BF_4^-$, $AsF_6^-$ and $SbF_6^-$, and $PF_6^-$ and $BF_4^-$ are particularly preferred), perhalogen acid ions (examples thereof include $ClO_4^-$, $BrO_4^-$, $IO_4^-$, and $ClO_4^-$ is particularly preferred), and bissulfonylimide ions (examples thereof include $(CF_3SO_2)_2^-$, $N(CF_3CF_2SO_2)_2^-$, $N(FSO_2)_2^-$, and $N(CF_3SO_2)$ $(C_4F_9SO_2)^-$, and $N(CF_3SO_2)_2^-$ or $N(FSO_2)_2^-$ is particularly preferred). Among these, halide ions and bissulfonylimide ions are preferred.

Among these, $R^{12}$ is preferably a hydrogen atom, an alkyl group, a cyano group, a phenyl group, a carboxy group, a hydroxy group, a sulfonic acid group, a phosphoric acid group, an aliphatic heterocyclic group containing an oxygen atom, an amino group, or an ammonium group, more preferably a hydrogen atom, an alkyl group having 1 to 6 carbon atoms, a carboxy group, a phosphoric acid group, a hydroxy group, an amino group, or an ammonium group, and particularly preferably a hydrogen atom, an alkyl group having 1 to 4 carbon atoms, a carboxy group, a phosphoric acid group, or a hydroxy group.

In a case in which $R^{12}$ is a group which may have a substituent, $R^{12}$ may further have another substituent. Examples of the substituent include the substituent Z described below, and, among these, a halogen atom (preferably a fluorine atom or a chlorine atom), an alkyl group, a carbamoyl group, and a hydroxy group are preferred.

$R^{13}$ represents a hydrogen atom, an alkyl group, a hydroxy group-containing group, or a carboxy group-containing group. A hydrogen atom, an alkyl group having 1 to 6 carbon atoms (preferably having 1 to 3 carbon atoms), a hydroxy group-containing group having 0 to 6 carbon atoms (preferably having 0 to 3 carbon atoms), and a carboxy group-containing group having 1 to 6 carbon atoms (preferably having 1 to 3 carbon atoms) are preferred. Meanwhile, $R^{13}$ may be the following linking group $L^{11}$ (for example, an oxygen atom) and constitute a dimer in this portion.

The hydroxy group-containing group is not particularly limited as long as the group has at least one hydroxy group, and examples thereof include a hydroxy group, a hydroxyethyl group, a hydroxybutyl group, and the like. The carboxy group-containing group is not particularly limited as long as the group has at least one carboxy group, and examples thereof include a carboxy group, a carboxyethyl group, a (meth)acryloyloxy group, and the like.

In the present invention, an "xxx group-containing group" refers to a group made of an xxx group alone and a group made up of an xxx group and a linking group. Here, the linking group is not particularly limited, and examples thereof include the linking group $L^{11}$ described below (excluding a single bond).

$R^{14}$ represents a hydrogen atom or a substituent. Examples of the substituent that can be used as $R^{14}$ include the substituent Z described below. Among these, $R^{14}$ is preferably a hydrogen atom, an alkyl group (preferably having 1 to 24 carbon atoms, more preferably having 1 to 12 carbon atoms, and particularly preferably having 1 to 6 carbon atoms), an alkenyl group (preferably having from 2 to 12 carbon atoms and more preferably having 2 to 6 carbon atoms), an aryl group (preferably having 6 to 22 carbon atoms and more preferably having 6 to 14 carbon atoms), or an aralkyl group (preferably having 7 to 23 carbon atoms and more preferably having 7 to 15 carbon atoms). Among these, a hydrogen atom, methyl, ethyl, propyl, butyl, and phenyl are particularly preferred.

$R^{15}$ and $R^{16}$ represent a substituent. Examples of the substituent that can be used as $R^{15}$ or $R^{16}$ include the substituent Z described below. Among these, $R^{15}$ or $R^{16}$ is preferably an alkyl group (preferably having 1 to 24 carbon atoms, more preferably having 1 to 12 carbon atoms, and particularly preferably having 1 to 6 carbon atoms), an alkenyl group (preferably having from 2 to 12 carbon atoms and more preferably having 2 to 6 carbon atoms), an aryl group (preferably having 6 to 22 carbon atoms and more preferably having 6 to 14 carbon atoms), or an aralkyl group (preferably having 7 to 23 carbon atoms and more preferably having 7 to 15 carbon atoms). Among these, a hydrogen atom, methyl, ethyl, propyl, butyl, and phenyl are particularly preferred.

$R^{15}$ and $R^{16}$ may bond together and form a ring including an N atom. At this time, $R^{15}$ and $R^{16}$ may bond together through an oxygen atom, a sulfur atom, or the like.

$L^{11}$ represents a single bond or a linking group. The linking group is preferably a hydrocarbon linking group [an alkylene group having 1 to 10 carbon atoms (more preferably having 1 to 6 carbon atoms and still more preferably having 1 to 3 carbon atoms), an alkenylene group having 2 to 10 carbon atoms (more preferably having 2 to 6 carbon atoms and more preferably having 2 to 4), an alkynylene groups having 2 to 10 carbon atoms (more preferably having 2 to 6 carbon atoms and still more preferably having 2 to 4 carbon atoms), and an arylene groups having 6 to 22 carbon atoms (more preferably having 6 to 10 carbon atoms), or a combination thereof], a hetero linking group [a carbonyl group (—CO—), a thiolcarbonyl group (—CS—), an ether group (—O—), a thioether group (—S—), an imino group (—$NR^N$—), an ammonium linking group (—$NR^N{}_2{}^+$—), a polysulfide group (having 1 to 8 sulfur atoms), an imine linking group ($R^N$—N=C<, —N=C($R^N$)—), a sulfonyl group (—$SO_2$—), a sulfinyl group (—SO—), a phosphoric acid linking group (—O—P(OH)(O)—O—), a phosphonic acid linking group (—P(OH)(O)—O—), or a combination thereof], or a linking group made of a combination thereof. $R^N$ in $L^{11}$ is the same as $R^N$ in the amino group that may be used as $R^{12}$.

Meanwhile, in a case in which the substituents or the linking groups are condensed and form a ring, the hydrocarbon linking groups may appropriately form a double bond or a triple bond and link together. The ring to be formed is preferably a five-membered ring or a six-membered ring. The five-membered ring is preferably a nitrogen-containing five-membered ring, and examples of a compound forming the ring include pyrrole, imidazole, pyrazole, indazole, indole, benzoimidazole, pyrrolidine, imidazoline, pyrazolidine, indoline, carbazole, derivatives thereof, and the like. Examples of the six-membered ring include piperidine, morpholine, piperazine, and derivatives thereof. In addition, in a case in which the compound includes an aryl group, a heteroring group, or the like, the group may be a single ring or a condensed ring, and, similarly, may be substituted or unsubstituted.

In a case in which $L^{11}$ is a linking group made of combinations, the number of combinations is not particularly limited, but is, for example, preferably 2 to 30, more preferably 2 to 16, still more preferably 2 to 8, and particularly preferably 2 or 3. Examples of the linking group made of combinations include an alkylene group having 1 to 6 carbon atoms (preferably having 1 to 3 carbon atoms), an arylene group having 6 to 24 carbon atoms (preferably having 6 to 10 carbon atoms), an oxygen atom, a sulfur atom, an imino group ($NR^N$), a carbonyl group, a (poly)alkyleneoxy group, a (poly)ester group, a (poly)amide group, and groups relating to these combinations. Among these, an alkylene group having 1 to 3 carbon atoms, an oxygen atom, a carbonyl group, a (poly)alkyleneoxy group, a (poly)ester group, and groups relating to these combinations are more preferred. Additionally, examples thereof include linking groups having a monomer exemplified below.

Among these, $L^{11}$ is more preferably a single bond, an alkylene group (preferably having 1 to 6 carbon atoms and more preferably having 1 to 3 carbon atoms), a carbonyl group, an ether group, an imino group, a sulfonyl group, a phosphoric acid linking group, or a linking group made of a combination thereof. A single bond, an alkylene group having 1 to 3 carbon atoms, a carbonyl group, an ether group, an imino group, and a linking group made of a combination thereof are particularly preferred.

In a case in which $L^{11}$ is a group which may have a substituent, $L^{11}$ may further have another substituent. Examples of the substituent include the substituent Z described below, and, among these, a halogen atom (preferably a fluorine atom or a chlorine atom), an alkyl group, an acyl group, a carbamoyl group, and a hydroxy group are preferred.

X represents —O— or >NH.

The polymer having an acrylic monomer may have a vinyl-based monomer. The vinyl-based monomer is not particularly limited as long as the monomer is a monomer having a carbon unsaturated bond (excluding the above-described acrylic monomer). Examples thereof include a styrene monomer, a vinyl ether monomer, a cyclic olefin monomer (such as norbornene), a diene monomer, and the like. The monomer may further have a substituent. Examples of the substituent include the substituent Z described below, and, among these, a halogen atom (preferably a fluorine atom or a chlorine atom), an alkyl group, an acyl group, a carbamoyl group, a hydroxy group, and a carboxyl group are preferred.

Hereinafter, examples of the acrylic monomer and the vinyl-based monomer will be illustrated, but the present invention is not limited thereto. In the following formulae, n represents 1 to 1,000,000 and is preferably 1 to 10,000 and more preferably 1 to 500 unlike n in the above description.

A-1
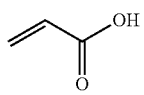

A-2
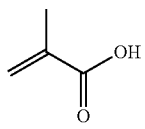

A-3
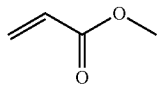

A-4
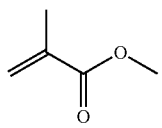

A-5
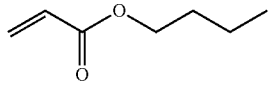

A-6
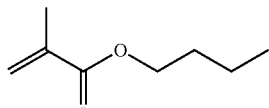

A-7
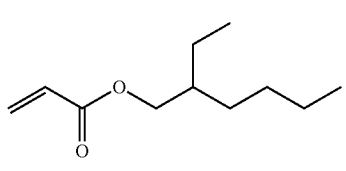

A-8
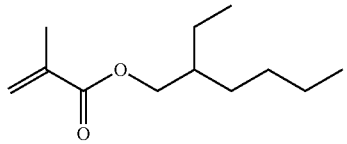

A-9
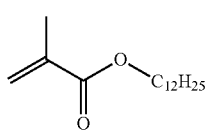

A-10
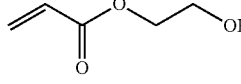

A-11
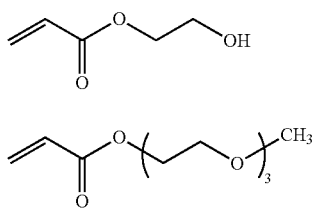

-continued

A-12
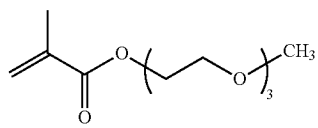

A-13
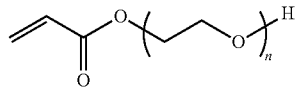

A-14
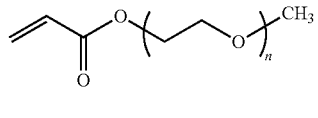

A-15
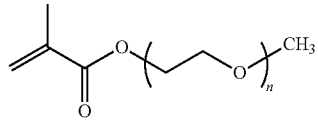

A-16
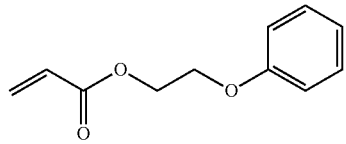

A-17
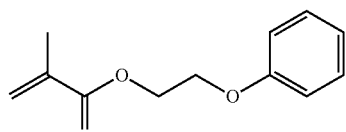

A-18
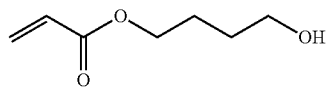

A-19
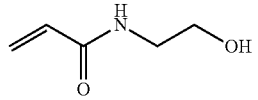

A-20
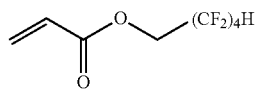

A-21
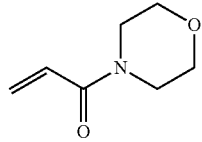

A-22
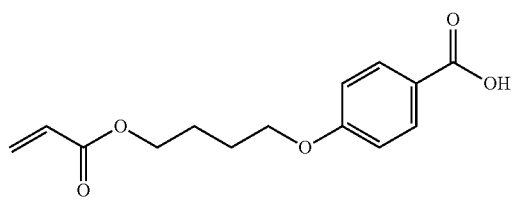

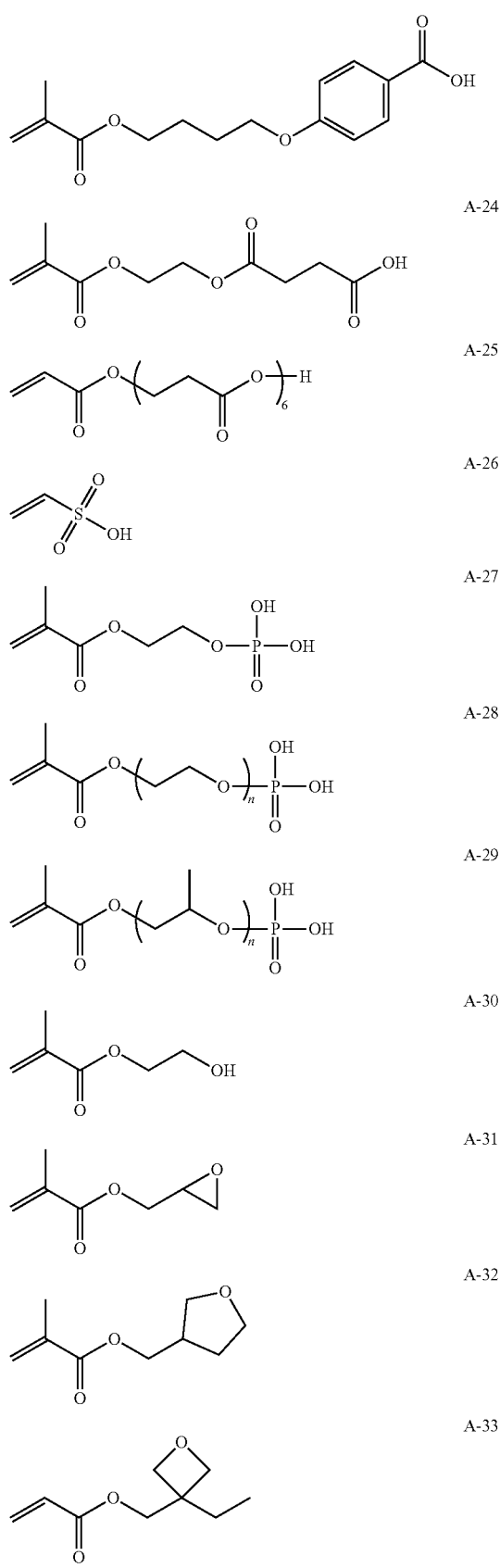

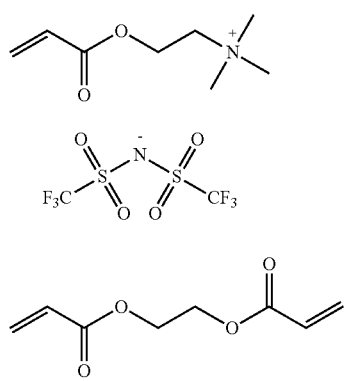
A-47
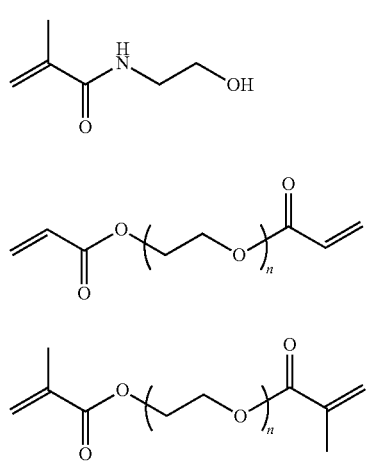
A-48
A-49
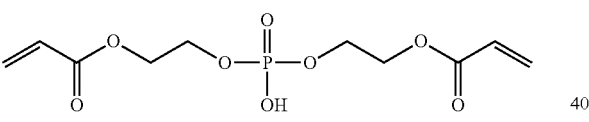
A-50
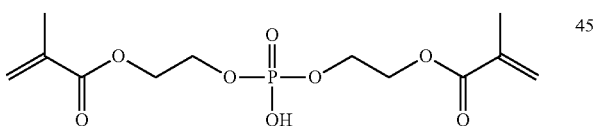
A-51
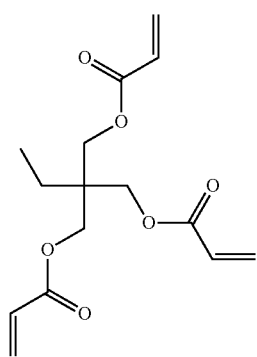
A-52
A-53
A-54
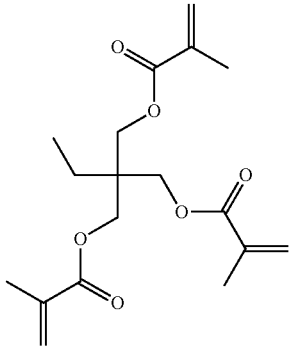
A-55
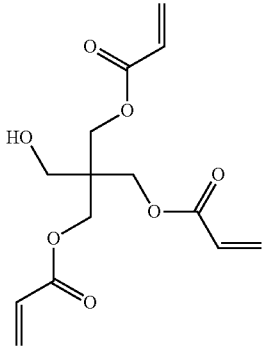
A-56
A-57
A-58
A-59

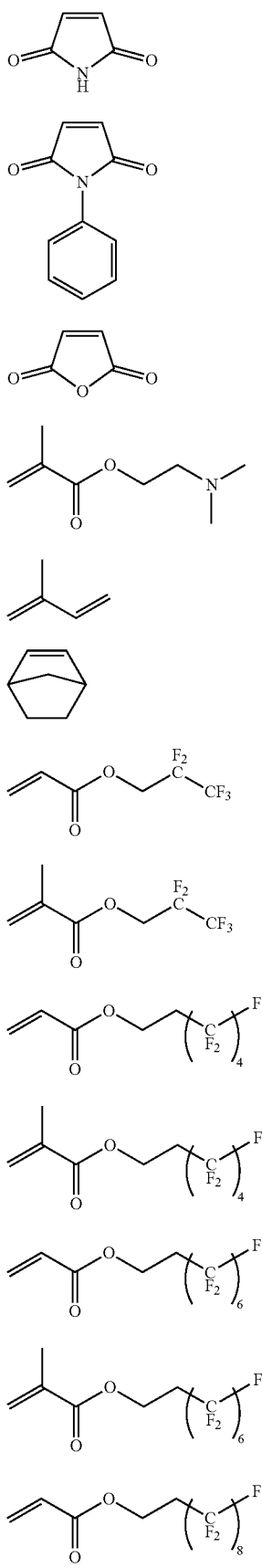
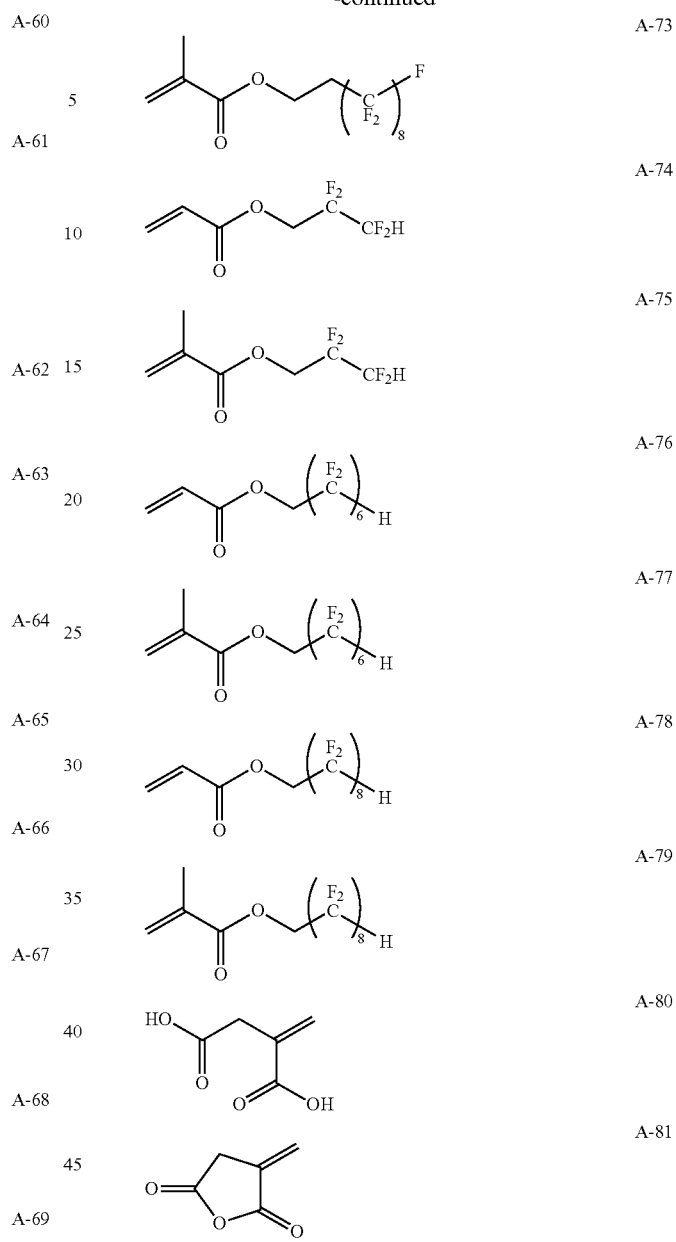

The polymer forming the binder particles is also preferably a polymer (condensed body) having a partial structure represented by Formula (1) (preferably in the main chain).

$$\begin{array}{c} -C-N- \\ \parallel \phantom{-} | \\ O \phantom{-} R \end{array} \quad \text{Formula (I)}$$

In Formula (I), R represents a hydrogen atom or a monovalent organic group.

Examples of the polymer having the partial structure represented by Formula (I) include a polymer having an amide bond, a polymer having a urea bond, a polymer having an imide bond, a polymer having a urethane bond, and the like.

Examples of the organic group as R include an alkyl group, an alkenyl group, an aryl group, and a heteroaryl group. Among these, R is preferably a hydrogen atom.

Polymer Having Amide Bond

Examples of the polymer having an amide bond include polyamides and the like.

The polyamide can be obtained by the condensation polymerization of a diamine compound and a dicarboxylic acid compound or the ring-opening polymerization of lactam.

Examples of the diamine compound include aliphatic diamine compounds such as ethylenediamine, 1-methylethylenediamine, 1,3-propylenediamine, tetramethylenediamine, pentamethylenediamine, heptamethylenediamine, octamethylenediamine, nonamethylenediamine, decamethylenediamine, undecamethylenediamine, dodecamethylenediamine, cyclohexanediamine, and bis-(4,4'-aminohexyl)methane and aromatic diamines such as paraxylylenediamine and 2,2-bis(4-aminophenyl)hexafluoropropane. In addition, as a commercially available product of a diamine having a polypropyleneoxy chain, it is possible to use "JEFFAMINE" series (trade name, manufactured by Huntsman Corporation and Mitsui Fine Chemicals, Inc.). Examples of "JEFFAMINE" series include JEFFAMINE D-230, JEFFAMINE D-400, JEFFAMINE D-2000, JEFFAMINE XTJ-510, JEFFAMINE XTJ-500, JEFFAMINE XTJ-501, JEFFAMINE XTJ-502, JEFFAMINE HK-511, JEFFAMINE EDR-148, JEFFAMINE XTJ-512, JEFFAMINE XTJ-542, JEFFAMINE XTJ-533, JEFFAMINE XTJ-536, and the like.

Examples of the dicarboxylic acid compound include aliphatic dicarboxylic acids such as phthalic acid, malonic acid, succinic acid, glutaric acid, sebacic acid, pimelic acid, suberic acid, azelaic acid, undecanoic acid, undecadionic acid, dodecadioic acid, dimer acid, and 1,4-cyclohexanedicarboxylic acid and aromatic dicarboxylic acids such as paraxylylene dicarboxylic acid, methxylylene dicarboxylic acid, 2,6-naphthalene dicarboxylic acid, and 4,4'-diphenyldicarboxylic acid.

The number of each of the diamine compounds and the dicarboxylic acid compounds that can be used is one or more. In addition, in the polyamide, the combination of the diamine compound and the dicarboxylic acid compound is not particularly limited.

The lactam is not particularly limited, and it is possible to use ordinary lactam that forms the polyamide without any particular limitations.

Polymer Having Urea Bond

Examples of the polymer having a urea bond include polyurea. The polyurea can be synthesized by condensation-polymerizing a diisocyanate compound and a diamine compound in the presence of an amine catalyst.

Specific examples of the diisocyanate compound are not particularly limited, can be appropriately selected depending on the purpose, and include aromatic diisocyanate compounds such as 2,4-tolylene diisocyanate, dimers of 2,4-tolylene diisocyanate, 2,6-tolylene diisocyanate, p-xylylene diisocyanate, m-xylylene diisocyanate, 4,4'-diphenylmethane diisocyanate (MDI), 1,5-naphthylene diisocyanate, and 3,3'-dimethylbiphenyl-4,4'-diisocyanate; aliphatic diisocyanate compounds such as hexamethylene diisocyanate, trimethylhexamethylene diisocyanate, lysine diisocyanate, and dimer acid diisocyanate; alicyclic diisocyanate compounds such as isophorone diisocyanate, 4,4'-methylene bis(cyclohexyl isocyanate), methylcyclohexane-2,4 (or 2,6)-diyl diisocyanate, and 1,3-(isocyanatomethyl) cyclohexane; diisocyanate compounds that are reaction products of a diol and a diisocyanate such as an adduct of 1 mol of 1,3-butylene glycol and 2 mol of tolyene diisocyanate; and the like. Among these, 4,4'-diphenylmethane diisocyanate (MDI) and 4,4'-methylene bis(cyclohexyl isocyanate) are preferred.

Specific examples of the diamine compound include the above-described examples of the compound and the like.

The number of each of the diisocyanate compounds and the diamine compounds that can be used is one or more. In addition, in the polyurea, the combination of the diisocyanate compound and the diamine compound is not particularly limited.

Polymer Having Imide Bond

Examples of the polymer having an imide bond include polyimides. The polyimide can be obtained by causing an addition reaction between tetracarboxylic dianhydride and a diamine compound so as to form a polyamic acid and then opening the ring.

Specific examples of the tetracarboxylic dianhydride include 3,3',4,4'-biphenyltetracarboxylic dianhydride (s-BPDA) and pyromellitic dianhydride (PMDA), 2,3,3',4'-biphenyltetracarboxylic dianhydride (A-BPDA), oxydiphthalic dianhydride, diphenylsulfone-3,4,3',4'-tetracarboxylic dianhydride, bis(3,4-dicarboxyphenyl) sulfide dianhydride, 2,2-bis(3,4-dicarboxyphenyl)-1,1,1,3,3,3-hexafluoropropanediamine, 2,3,3',4'-benzophenonetetracarboxylic dianhydride, 3,3', 4,4'-benzophenonetetracarboxylic dianhydride, bis(3,4-dicarboxyphenyl)methane dianhydride, 2,2-bis(3,4-dicarboxyphenyl)propane dianhydride, p-phenylene bis(trimellitic acid monoester anhydride), p-biphenylene bis (trimellitic acid monoester anhydride), m-terphenyl-3,4,3',4'-tetracarboxylic dianhydride, p-terphenyl-3,4,3',4'-tetracarboxylic dianhydride, 1,3-bis(3,4-dicarboxyphenoxy)benzene dianhydride, 1,4-bis(3,4-dicarboxyphenoxy)benzene dianhydride, 1,4-bis(3,4-dicarboxyphenoxy)biphenyl anhydride, 2,2-bis[(3,4-dicarboxyphenoxy)phenyl]propane dianhydride, 2,3,6,7-naphthalenetetracarboxylic dianhydride, 1,4,5,8-naphthalenetetracarboxylic dianhydride, 4,4'-(2,2-hexafluoroisopropylidene)diphthalic dianhydride, and the like. The tetracarboxylic dianhydride may be used singly or two or more tetracarboxylic dianhydrides may be used in mixture.

The polyimide preferably includes, as the tetracarboxylic acid component, at least one of s-BPDA and PMDA, and, for example, the content of s-BPDA is preferably 50 mol % or more, more preferably 70 mol % or more, and particularly preferably 75 mol % or more with respect to 100 mol % of the tetracarboxylic acid component. The tetracarboxylic dianhydride preferably has a rigid benzene ring.

Specific examples of the diamine compound include the above-described examples of the compound and the like. The diamine compound is preferably a structure having amino groups at both terminals of a polyethylene oxide chain, a polypropylene oxide chain, a polycarbonate chain, or a polyester chain.

The number of each of the tetracarboxylic dianhydrides and the diamine compounds that can be used is one or more. In addition, in the polyimide, the combination of the tetracarboxylic dianhydride, and the diamine compound is not particularly limited.

Polymer Having Urethane Bond

Examples of the polymer having a urethane bond include polyurethane. The polyurethane can be obtained by the condensation polymerization of a diisocyanate compound and a diol compound in the presence of titanium, tin, and a bismuth catalyst.

Examples of the diisocyanate compound include the above-described examples of the compound.

Specific examples of the diol compound include ethylene glycol, diethylene glycol, triethylene glycol, tetraethylene glycol, propylene glycol, dipropylene glycol, polyethylene glycol (for example, polyethylene glycol having an average molecular weight of 200, 400, 600, 1,000, 1,500, 2,000, 3,000, or 7,500), polypropylene glycol (for example, polypropylene glycol having an average molecular weight of 400, 700, 1,000, 2,000, 3,000, or 4,000), neopentyl glycol, 1,3-butylene glycol, 1,4-butanediol, 1,3-butanediol, 1,6-hexanediol, 2-butene-1,4-diol, 2,2,4-trimethyl-1,3-pentanediol, 1,4-bis-p-hydroxyethoxycyclohexane, cyclohexanedimethanol, tricyclodecanedimethanol, hydrogenated bisphenol A, hydrogenated bisphenol F, ethylene oxide adducts of bisphenol A, propylene oxide adducts of bisphenol A, ethylene oxide adducts of bisphenol F, propylene oxide adducts of bisphenol F, and the like. The diol compound can be procured from commercially available products, and examples thereof include a polyether diol compound, a polyester diol compound, a polycarbonate diol compound, a polyalkylene diol compound, and a silicone diol compound.

The diol compound preferably has at least one of a polyethylene oxide chain, a polypropylene oxide chain, a polycarbonate chain, a polyester chain, a polybutadiene chain, a polyisoprene chain, a polyalkylene chain, and a silicone chain. In addition, from the viewpoint of the improvement of the adsorption property to sulfide-based inorganic solid electrolyte or active materials, the diol compound preferably has a carbon-carbon unsaturated bond or a polar group (an alcoholic hydroxyl group, a phenolic hydroxyl group, a thiol group, a carboxy group, a sulfonic acid group, a sulfonamide group, a phosphoric acid group, a nitrile group, an amino group, a zwitter ion-containing group, a metal hydroxide, or a metal alkoxide). As the diol compound, it is possible to use 2,2-bis(hydroxymethyl) propionate. As a commercially available product of the diol compound having a carbon-carbon unsaturated bond, it is possible to preferably use BLEMMER GLM (manufactured by NOF Corporation) and the compound described in JP2007-187836A.

In the case of the polyurethane, as a polymerization terminator, it is possible to use a monoalcohol or a mono amine. The polymerization terminator is introduced into the terminal portion of a polyurethane main chain. As a method for introducing a soft segment into a polyurethane terminal, it is possible to use polyalkylene glycol monoalkyl ether (preferably polyethylene glycol monoalkyl ether or polypropylene monoalkyl ether), polycarbonate diol monoalkyl ether, polyester diol monoalkyl ether, polyester monoalcohol, or the like.

In addition, in a case in which a monoalcohol or monoamine having a polar group or a carbon-carbon unsaturated bond is used, it is possible to introduce the polar group or the carbon-carbon unsaturated bond into a terminal of the polyurethane main chain. Examples thereof include hydroxyacetic acid, hydroxypropionic acid, 4-hydroxybenzyl alcohol, 3-mercapto-1-propanol, 2,3-dimercapto-1-propanol, 3-mercapto-1-hexanol, 3-hydroxypropanesulfonic acid, 2-cyanoethanol, 3-hydroxyglutaronitrile, 2-aminoethanol, 2-hydroxyethyl methacrylate, 2-hydroxyethyl acrylate, N-methacrylylene diamine, and the like.

The number of each of the diisocyanate compounds, the diol compounds, and the polymerization terminators that can be used is one or more.

In addition, in the polyurethane, the combination of the diisocyanate compound and the diol compound is not particularly limited.

The expression of a compound in the present specification (for example, a case in which a substance is called with 'compound' at the end) indicates not only the compound but also salts thereof and ions thereof. In addition, the expression also indicates derivatives obtained by partially changing the compound, for example, introducing a substituent into the compound without impairing desired effects.

The expression of a substituent that is not clearly expressed as substituted or unsubstituted in the present specification (which is also true for a linking group) means that the group may have an appropriate substituent. What has been described above is also true for compounds that are not clearly expressed as substituted or unsubstituted. Examples of the preferred substituent include the substituent Z described below.

In addition, in the present specification, in the case of being simply expressed as a YYY group, the YYY group is selected from the following substituent Z that corresponds to the group.

Examples of the substituent Z include substituents described below.

Examples thereof include an alkyl group (preferably an alkyl group having 1 to 20 carbon atoms, for example, methyl, ethyl, isopropyl, t-butyl, pentyl, heptyl, 1-ethylpentyl, benzyl, 2-ethoxyethyl, 1-carboxymethyl, or the like), an alkenyl group (preferably an alkenyl group having 2 to 20 carbon atoms, for example, vinyl, allyl, olefin, or the like), an alkynyl group (preferably an alkynyl group having 2 to 20 carbon atoms, for example, ethynyl, butadiynyl, phenylethynyl, or the like), a cycloalkyl group (preferably a cycloalkyl group having 3 to 20 carbon atoms, for example, cyclopropyl, cyclopentyl, cyclohexyl, 4-methylcyclohexyl, or the like; here, an alkyl group mentioned in the present specification, generally, also refers to a cycloalkyl group), an aryl group (preferably an aryl group having 6 to 26 carbon atoms, for example, phenyl, 1-naphthyl, 4-methoxyphenyl, 2-chlorophenyl, 3-methylphenyl, or the like), an aralkyl group (preferably an aralkyl group having 7 to 23 carbon atoms, for example, benzyl, phenethyl, or the like), a heterocyclic group (preferably a heterocyclic group having 2 to 20 carbon atoms, more preferably a 5- or 6-membered heterocyclic group having at least one of an oxygen atom, a sulfur atom, and a nitrogen atom, for example, tetrahydropyran, tetrahydrofuran, 2-pyridyl, 4-pyridyl, 2-imidazolyl, 2-benzimidazolyl, 2-thiazolyl, 2-oxazolyl, a pyrrolidone group, or the like), an alkoxy group (preferably an alkoxy group having 1 to 20 carbon atoms, for example, methoxy, ethoxy, isopropyloxy, benzyloxy, or the like), an aryloxy group (preferably an aryloxy group having 6 to 26 carbon atoms, for example, phenoxy, 1-naphthyloxy, 3-methylphenoxy, 4-methoxyphenoxy, or the like; here, an alkoxy group mentioned in the present specification, generally, also refers to an aryloxy group), an alkoxycarbonyl group (preferably an alkoxycarbonyl group having 2 to 20 carbon atoms, for example, ethoxycarbonyl, 2-ethylhexyloxycarbonyl, or the like), an aryloxycarbonyl group (preferably an aryloxycarbonyl group having 6 to 26 carbon atoms, for example, phenoxycarbonyl, 1-naphthyloxycarbonyl, 3-methyl phenoxycarbonyl, 4-methoxy phenoxycarbonyl, or the like), an amino group (preferably an amino group having 0 to 20 carbon atoms, including an alkylamino group and an arylamino group, for example, amino, N,N-dimethylamino, N,N-diethylamino, N-ethylamino, aniline, or the like), a sulfamoyl group (preferably a sulfamoyl group having 0 to 20 carbon atoms, for example, N,N-dimethylsulfamoyl, N-phenylsulfamoyl, or the like), an acyl group (preferably an acyl group having 1 to 20 carbon atoms, for example, acetyl, propionyl, butyryl, or the like), an aryloyl group (preferably an aryloyl group having 7 to 23 carbon atoms, for example, benzoyl or the like; here, an acyl group mentioned in the present specification, generally, also refers to an aryloyl group), an acyloxy group (preferably an acyloxy group having 1 to 20 carbon atoms, for example, acetyloxy or the like), an aryloyloxy group (preferably an aryloyloxy group having 7 to 23 carbon atoms, for example, benzoyloxy or the like; here, an acyloxy group mentioned in the present specification, generally, also refers to an aryloyloxy group), a carbamoyl group (preferably a carbamoyl group having 1 to 20 carbon atoms, for example, N,N-dimethylcarbamoyl, N-phenylcarbamoyl, or the like), an acylamino group (preferably an acylamino group having 1 to 20 carbon atoms, for example, acetylamino, benzoylamino, or the like), an alkylthio group (preferably an alkylthio group having 1 to 20 carbon atoms, for example, methylthio, ethylthio, isopropylthio, benzylthio, or the like), an arylthio group (preferably an arylthio group having 6 to 26 carbon atoms, for example, phenylthio, 1-naphthylthio, 3-methylphenylthio, 4-methoxyphenylthio, or the like), an alkylsulfonyl group (preferably an alkylsulfonyl group having 1 to 20 carbon atoms, for example, methylsulfonyl, ethylsulfonyl, or the like), an arylsulfonyl group (preferably an arylsulfonyl group having 6 to 22 carbon atoms, for example, benzenesulfonyl or the like), an alkylsilyl group (preferably an alkylsilyl group having 1 to 20 carbon atoms, for example, monomethylsilyl, dimethylsilyl, trimethylsilyl, triethylsilyl, or the like), an arylsilyl group (preferably an arylsilyl group having 6 to 42 carbon atoms, for example, triphenylsilyl or the like), an alkoxysilyl group (preferably an alkoxysilyl group having 1 to 20 carbon atoms, for example, monomethoxysilyl, dimethoxysilyl, trimethoxysilyl, triethoxysilyl, or the like), an aryloxysilyl group (preferably an aryloxysilyl group having 6 to 42 carbon atoms, for example, triphenyloxysilyl or the like), a phosphoryl group (preferably a phosphoryl group having 0 to 20 carbon atoms, for example, —OP(=O)(R$^P$)$_2$), a phosphonyl group (preferably a phosphonyl group having 0 to 20 carbon atoms, for example, —P(=O)(R$^P$)$_2$), a phosphinyl group (preferably a phosphinyl group having 0 to 20 carbon atoms, for example, —P(R$^P$)$_2$), a (meth)acryloyl group, a (meth)acryloyloxy group, a (meth)acryloylimino group (a (meth)acrylamide group), a hydroxy group, a thiol group, a carboxy group, a phosphoric acid group, a phosphonic acid group, a sulfonic acid group, a cyano group, and a halogen atom (for example, a fluorine atom, a chlorine atom, a bromine atom, an iodine atom, or the like).

In addition, in each of the groups exemplified as the substituent Z, the substituent Z may be further substituted.

R$^P$ is a hydrogen atom, a hydroxyl group, or a substituent. The substituent is preferably an alkyl group (preferably having 1 to 24 carbon atoms, more preferably having 1 to 12 carbon atoms, still more preferably having 1 to 6 carbon atoms, and particularly preferably having 1 to 3 carbon atoms), an alkenyl group (preferably having 2 to 24 carbon atoms, more preferably having 2 to 12 carbon atoms, still more preferably having 2 to 6 carbon atoms, and particularly preferably having 2 or 3 carbon atoms), an alkynyl group (preferably having 2 to 24 carbon atoms, more preferably having 2 to 12 carbon atoms, still more preferably having 2 to 6 carbon atoms, and particularly preferably having 2 or 3 carbon atoms), an aralkyl group (preferably having 7 to 22 carbon atoms, more preferably having 7 to 14 carbon atoms, and particularly preferably having 7 to 10 carbon atoms), an aryl group (preferably having 6 to 22 carbon atoms, more preferably having 6 to 14 carbon atoms, and particularly preferably having 6 to 10 carbon atoms), an alkoxy group (preferably having 1 to 24 carbon atoms, more preferably having 1 to 12 carbon atoms, still more preferably having 1 to 6 carbon atoms, and particularly preferably having 1 to 3 carbon atoms), an alkenyloxy group (preferably having 2 to 24 carbon atoms, more preferably having 2 to 12 carbon atoms, still more preferably having 2 to 6 carbon atoms, and particularly preferably having 2 or 3 carbon atoms), an alkynyloxy group (preferably having 2 to 24 carbon atoms, more preferably having 2 to 12 carbon atoms, still more preferably having 2 to 6 carbon atoms, and particularly preferably having 2 or 3 carbon atoms), an aralkyloxy group (preferably having 7 to 22 carbon atoms, more preferably having 7 to 14 carbon atoms, and particularly preferably having 7 to 10 carbon atoms), or an aryloxy group (preferably having 6 to 22 carbon atoms, more preferably having 6 to 14 carbon atoms, and particularly preferably having 6 to 10).

In a case in which the compound, the substituent, the linking group, or the like includes an alkyl group, an alkylene group, an alkenyl group, an alkenylene group, an alkynyl group, an alkynylene group, or the like, this group may have a circular shape or a chain shape, may be a straight chain or branched, and may be substituted or unsubstituted as described above.

As the binder particles, a commercially available product can be used, and the binder particles can be synthesized according to an ordinary polymerization reaction, condensation reaction, or the like. The SP value of the polymer can be appropriately set depending on the kind and amount used of the monomer or the condensation component, a chain transfer agent, or the like, and the average particle diameter can be appropriately set in a predetermined range depending on the kind of the monomer or the condensation component, the amount of a dispersion component, the polymerization temperature, the dropwise addition time, and the dropwise addition method.

The solvent that is used for the polymerization reaction or condensation reaction of the polymer is not particularly limited. Meanwhile, solvents that do not react with the inorganic solid electrolyte or the active materials and furthermore do not decompose the inorganic solid electrolyte or the active materials are preferably used. For example, it is possible to use hydrocarbon solvents (toluene, heptane, and xylene), ester solvents (ethyl acetate and propylene glycol monomethyl ether acetate), ether solvents (tetrahydrofuran, dioxane, and 1,2-diethoxyethane), ketone solvents (acetone, methyl ethyl ketone, and cyclohexanone), nitrile solvents (acetonitrile, propionitrile, butyronitrile, and isobutyronitrile), and halogen solvents (dichloromethane and chloroform).

In the present invention, one kind of the binder particles may be used singly or two or more kinds of the binder particles may be used in combination.

The content of the binder particles in the solid electrolyte composition is preferably 0.1% by mass or more, more preferably 0.3% by mass or more, and particularly preferably 1% by mass or more in the solid content. The upper limit is preferably 20% by mass or less, more preferably 10% by mass or less, and particularly preferably 5% by mass or less.

In a case in which the binder particles are used in the above-described range, it is possible to more efficiently realize both the fixing property of the solid electrolyte and the suppression of the interface resistance.

(Dispersion Medium)

The solid electrolyte composition of the present invention contains a dispersion medium.

The dispersion medium needs to be capable of dispersing the respective components described above, and examples thereof include a variety of organic solvents. Specific examples of the dispersion medium include dispersion media described below.

Examples of alcohol compound solvents include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of ether compound solvents include alkylene glycol alkyl ethers (ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol monomethyl ether, dipropylene glycol monomethyl ether, tripropylene glycol monomethyl ether, diethylene glycol monobutyl ether, and the like), dialkyl ethers (dimethyl ether, diethyl ether, diisopropyl ether, dibutyl ether, and the like), and cyclic ethers (tetrahydrofuran, dioxane(including each of 1,2-, 1,3- and 1,4-isomers)).

Examples of amide compound solvents include N,N-dimethylformamide, N-methyl-2-pyrrolidone, 2-pyrrolidinone, 1,3-dimethyl-2-imidazolidinone, 8-caprolactam, formamide, N-methylformamide, acetamide, N-methylacetamide, N,N-dimethylacetamide, N-methylpropanamide, hexamethylphosphoric triamide, and the like.

Examples of amino compound solvents include triethylamine, diisopropylethylamine, tributylamine, and the like.

Examples of ketone compound solvents include acetone, methyl ethyl ketone, methyl isobutyl ketone, and cyclohexanone.

Examples of aromatic compound solvents include benzene, toluene, xylene, and the like.

Examples of aliphatic compound solvents include hexane, heptane, octane, decane, and the like.

Examples of nitrile compound solvents include acetonitrile, propionitrile, butyronitrile, and the like.

Examples of ester compound solvents include ethyl acetate, butyl acetate, propyl acetate, butyl butyrate, butyl pentanoate, and the like.

Examples of non-aqueous dispersion media include the aromatic compound solvents, the aliphatic compound solvents, and the like.

In the present invention, among these, the amino compound solvents, the ether compound solvents, the ketone compound solvents, the aromatic compound solvents, and the aliphatic compound solvents are preferred, and the ether compound solvents, the aromatic compound solvents, and the aliphatic compound solvents are more preferred. In the present invention, it is preferable to use a sulfide-based inorganic solid electrolyte and, furthermore, select a specific organic solvent described above. In the case of selecting this combination, the organic solvent does not include any functional groups that are active to the sulfide-based inorganic solid electrolyte, and thus the sulfide-based inorganic solid electrolyte is stably handled, which is preferable. Particularly, a combination of the sulfide-based inorganic solid electrolyte and the aliphatic compound solvent is preferred.

The C Log P value of the dispersion medium that is used in the present invention is preferably 1 or more, more preferably 1.5 or more, still more preferably 2 or more, and particularly preferably 2.5 or more. There is no particular upper limit, but the upper limit is practically 10 or less.

Examples of the above-described dispersion medium in the above-described dispersion media include toluene, xylylene, hexane, heptane, octane, acetone, methyl ethyl ketone (MEK), dibutyl ether, N-methyl-2-pyrrolidinone, ethyl acetate, butyl butylate, tetrahydrofuran, tributylamine, and the like. Among these, toluene, xylylene, hexane, heptane, dibutyl ether, and tributylamine are particularly preferred. In a case in which the C log P value is set in the above-described range, the dispersion medium does not include any functional groups or has a hydrophobic substituent, and thus it is possible to stably handle the sulfide-based inorganic solid electrolyte without dissolving the sulfide-based inorganic solid electrolyte.

Hereinafter, the C Log P value of several dispersion media will be illustrated together with the chemical formulae.

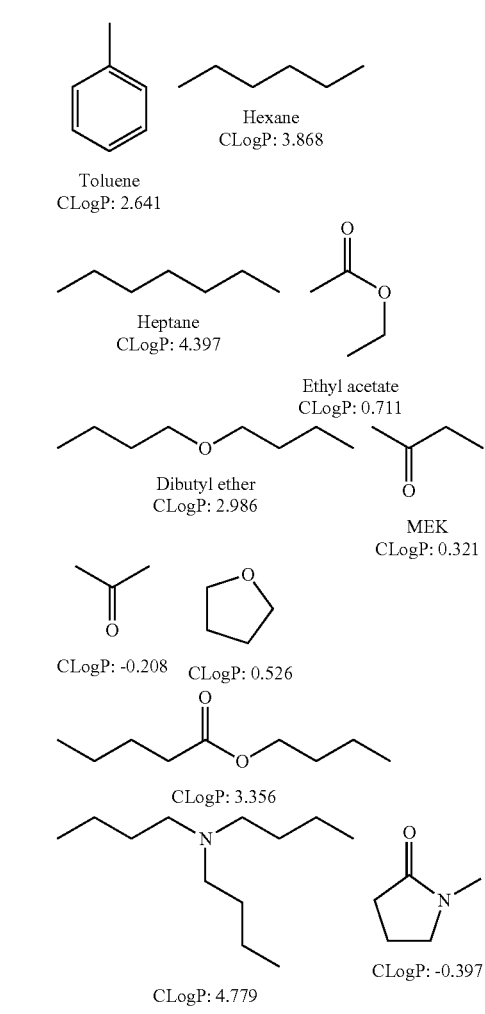

In the present invention, the C log P value refers to a value of the common logarithm of the partition coefficient P into 1-octanol and water obtained by calculation. As a method or software for calculating the C log P value, a well-known method or software can be used; however, unless particularly otherwise described, a value computed after the drawing of a structure using ChemDraw manufactured by PerkinElmer Co., Ltd.

The boiling point of the dispersion medium at normal pressure (one atmosphere) is preferably 50° C. or higher and more preferably 70° C. or higher. The upper limit is preferably 250° C. or lower and more preferably 220° C. or lower.

The dispersion medium may be used singly or two or more dispersion media may be used in combination.

In the present invention, the content of the dispersion medium in the solid electrolyte composition can be appropriately set in consideration of the balance between the viscosity of the solid electrolyte composition and the drying load. The content of the dispersion medium in the solid electrolyte composition is generally preferably 20% to 99% by mass, more preferably 25% to 70% by mass, and particularly preferably 30% to 60% by mass.

(Active Material)

The solid electrolyte composition of the present invention may contain an active material capable of intercalating and deintercalating ions of metal elements belonging to Group I or II of the periodic table. Examples of the active material include a positive electrode active material and a negative electrode active material which will be described below, and a transition metal oxide that is a positive electrode active material or a metal oxide that is a negative electrode active material is preferred.

In the present invention, the solid electrolyte composition containing an active material (a positive electrode active material or a negative electrode active material) will be referred to as a composition for an electrode layer (a composition for a positive electrode or a composition for a negative electrode) in some cases.

—Positive Electrode Active Material—

A positive electrode active material that the solid electrolyte composition of the present invention may contain is preferably a positive electrode active material capable of reversibly intercalating and/or deintercalating lithium ions. The above-described material is not particularly limited as long as the material has the above-described characteristics and may be transition metal oxides, elements capable of being complexed with Li such as sulfur, or the like.

Among these, as the positive electrode active material, transition metal oxides are preferably used, and transition metal oxides having a transition metal element $M^a$ (one or more elements selected from Co, Ni, Fe, Mn, Cu, and V) are more preferred. In addition, an element $M^b$ (an element of Group I (Ia) of the periodic table other than lithium, an element of Group II (IIa), or an element such as Al, Ga, In, Ge, Sn, Pb, Sb, Bi, Si, P, or B) may be mixed into this transition metal oxide. The amount of the element mixed is preferably 0 to 30 mol % of the amount of the transition metal element $M^a$. The positive electrode active material is more preferably synthesized by mixing the element into the transition metal oxide so that the molar ratio of Li/$M^a$ reaches 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), lithium-containing transition metal silicate compounds (ME), and the like.

Specific examples of the transition metal oxides having a bedded salt-type structure (MA) include $LiCoO_2$ (lithium cobalt oxide [LCO]), $LiNi_2O_2$ (lithium nickelate), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric acid compounds (MC) include olivine-type iron phosphate salts such as $LiFePO_4$ and $Li_3Fe_2(PO_4)_3$, iron pyrophosphates such as $LiFeP_2O_7$, cobalt phosphates such as $LiCoPO_4$, and monoclinic nasicon-type vanadium phosphate salt such as $Li_3V_2(PO_4)_3$ (lithium vanadium phosphate).

Examples of the lithium-containing transition metal halogenated phosphoric acid compounds (MD) include iron fluorophosphates such as $Li_2FePO_4F$, manganese fluorophosphates such as $Li_2MnPO_4F$, and cobalt fluorophosphates such as $Li_2CoPO_4F$.

Examples of the lithium-containing transition metal silicate compounds (ME) include $Li_2FeSiO_4$, $Li_2MnSiO_4$, $Li_2CoSiO_4$, and the like.

In the present invention, the transition metal oxides having a bedded salt-type structure (MA) are preferred, and LCO or NMC is more preferred.

The shape of the positive electrode active material is not particularly limited, but is preferably particulate. The volume-average particle diameter (circle-equivalent average particle diameter) of the positive electrode active material is not particularly limited. For example, it is possible to set the volume-average particle diameter to 0.1 to 50 μm. In order to provide a predetermined particle diameter to the positive electrode active material, an ordinary crusher or classifier may be used. Positive electrode active materials obtained using a firing method may be used after being washed with water, an acidic aqueous solution, an alkaline aqueous solution, or an organic solvent. The volume-average particle diameter (circle-equivalent average particle diameter) of positive electrode active material particles can be measured using a laser diffraction/scattering-type particle size distribution measurement instrument LA-920 (trade name, manufactured by Horiba Ltd.).

The positive electrode active material may be used singly or two or more positive electrode active materials may be used in combination.

In the case of forming the positive electrode active material layer, the mass (mg) of the positive electrode active material per unit area ($cm^2$) of the positive electrode active material layer (weight per unit area) is not particularly limited, and can be appropriately determined depending on the set battery capacity.

The content of the positive electrode active material in the solid electrolyte composition is not particularly limited, but is preferably 10% to 95% by mass, more preferably 30% to 90% by mass, still more preferably 50% to 85% by mass, and particularly preferably 70% to 80% by mass with respect to 100% by mass of the solid components in the composition for a positive electrode.

—Negative Electrode Active Material—

A negative electrode active material that the solid electrolyte composition of the present invention may contain is preferably a negative electrode active material capable of reversibly intercalating and deintercalating lithium ions. The above-described material is not particularly limited as long as the material has the above-described characteristics, and examples thereof include carbonaceous materials, metal oxides such as tin oxide and silicon oxide, metal complex oxides, a lithium single body or lithium alloys such as lithium aluminum alloys, metals capable of forming alloys with lithium such as Sn, Si, and In and the like. Among these, carbonaceous materials or lithium complex oxides are preferably used in terms of reliability. In addition, the metal complex oxides are preferably capable of absorbing and deintercalating lithium. The materials are not particularly limited, but preferably contain titanium and/or lithium as constituent components from the viewpoint of high-current density charging and discharging characteristics.

The carbonaceous material that is used as the negative electrode active material is a material substantially made of carbon. Examples thereof include petroleum pitch, carbon black such as acetylene black (AB), graphite (natural graphite, artificial graphite such as highly oriented pyrolytic graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and active carbon fibers, mesophase microspheres, graphite whisker, planar graphite, and the like.

These carbonaceous materials can also be differentiated into non-graphitizable carbonaceous materials and graphite-based carbonaceous materials depending on the degree of graphitization. In addition, the carbonaceous material preferably has the surface separation or the density and the size of crystallites described in JP1987-22066A (JP-S62-22066A), JP1990-6856A (JP-H2-6856A), and JP1991-45473A (JP-H3-45473A). The carbonaceous material does not need to be the same material, and it is also possible to use a mixture of the natural graphite and the artificial graphite described in JP1993-90844A (JP-H5-90844A), graphite having the coating layer described in JP1994-4516A (JP-H6-4516A), and the like.

The metal oxides and the metal complex oxides being applied as the negative electrode active material are particularly preferably amorphous oxides, and furthermore, chalcogenides which are reaction products between a metal element and an element belonging to Group XVI of the periodic table are also preferably used. The amorphous oxides mentioned herein refer to oxides having a broad scattering band having a peak of a 2θ value in a range of 200 to 400 in an X-ray diffraction method in which CuKα rays are used and may have crystalline diffraction lines. The highest intensity in the crystalline diffraction line appearing at the 2θ value of 400 or more and 700 or less is preferably 100 times or less and more preferably five times or less of the diffraction line intensity at the peak of the broad scattering line appearing at the 2θ value of 200 or more and 400 or less and particularly preferably does not have any crystalline diffraction lines.

In a compound group consisting of the amorphous oxides and the chalcogenides, amorphous oxides of semimetal elements and chalcogenides are more preferred, and elements belonging to Groups XIII (IIIB) to XV (VB) of the periodic table, oxides consisting of one element or a combination of two or more elements of Al, Ga, Si, Sn, Ge, Pb, Sb, and Bi, and chalcogenides are particularly preferred. Specific examples of preferred amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_8Bi_2O_3$, $Bi_2O_4$, $SnSiO_3$, GeS, SnS, $SnS_2$, PbS, $PbS_2$, $Sb_2S_3$, $Sb_2S_5$, and $SnSiS_3$. In addition, these amorphous oxides may be complex oxides with lithium oxide, for example, $Li_2SnO_2$.

The negative electrode active material preferably contains a titanium atom. More specifically, $Li_4Ti_5O_{12}$ (lithium titanium oxide [LTO]) is preferred since the volume fluctuation during the absorption and emission of lithium ions is small and thus the high-speed charging and discharging characteristics are excellent and the deterioration of electrodes is suppressed, whereby it becomes possible to improve the service lives of lithium ion secondary batteries.

In the present invention, hard carbon or graphite is preferably used, and graphite is more preferably used. Meanwhile, in the present invention, the carbonaceous material may be used singly or two or more carbonaceous materials may be used in combination.

The shape of the negative electrode active material is not particularly limited, but is preferably particulate. The average particle diameter of the negative electrode active material is preferably 0.1 to 60 µm. In order to provide a predetermined particle diameter, an ordinary crusher or classifier is used. For example, a mortar, a ball mill, a sand mill, an oscillatory ball mill, a satellite ball mill, a planetary ball mill, a swirling airflow-type jet mill, a sieve, or the like is preferably used. During crushing, it is also possible to carry out wet-type crushing in which water or an organic solvent such as methanol is made to coexist as necessary. In order to provide a desired particle diameter, classification is preferably carried out. The classification method is not particularly limited, and it is possible to use a sieve, a wind power classifier, or the like depending on the necessity. Both of dry-type classification and wet-type classification can be carried out. The average particle diameter of negative electrode active material particles can be measured using the same method as the method for measuring the volume-average particle diameter of the positive electrode active material.

The chemical formulae of the compounds obtained using a firing method can be computed using an inductively coupled plasma (ICP) emission spectroscopic analysis method as a measurement method or from the mass ratio of powder before and after firing as a convenient method.

Preferred examples of negative electrode active materials that can be jointly used with the amorphous oxide negative electrode active material mainly including Sn, Si, or Ge include carbon materials capable of adsorbing and/or emitting lithium ions or lithium metal, lithium, lithium alloys, and metal capable of forming an alloy with lithium.

In the present invention, a Si-based negative electrode is also preferably applied. Generally, a Si negative electrode is capable of absorbing a larger number of Li ions than carbon negative electrodes (graphite, acetylene black, and the like). That is, the amount of Li ions absorbed per unit weight increases. Therefore, it is possible to increase the battery capacity. As a result, there is an advantage that the driving time of batteries can be extended.

The negative electrode active material may be used singly or two or more negative electrode active materials may be used in combination.

In the case of forming a negative electrode active material layer, the mass (mg) of the negative electrode active material per unit area ($cm^2$) in the negative electrode active material layer (weight per unit area) is not particularly limited and can be appropriately determined depending on the set battery capacity.

The content of the negative electrode active material in the solid electrolyte composition is not particularly limited, but is preferably 10% to 80% by mass, more preferably 20% to 80% by mass, more preferably 30% to 80% by mass, and still more preferably 40% to 75% by mass with respect to 100% by mass of the solid components.

(Auxiliary Conductive Agent)

The solid electrolyte composition of the present invention may also appropriately contain an auxiliary conductive agent that is used to improve the electron conductivity of the active materials as necessary. As the auxiliary conductive agent, ordinary auxiliary conductive agents can be used. The auxiliary conductive agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene or may be metal powder or a metal fiber of copper, nickel, or the like, and a conductive polymer such as polyaniline, polypyrrole, polythiophene, polyacetylene, or a polyphenylene derivative may also be used. In addition, these auxiliary conductive agents may be used singly or two or more auxiliary conductive agents may be used.

In a case in which the solid electrolyte composition of the present invention includes the auxiliary conductive agent, the content of the auxiliary conductive agent in the solid electrolyte composition is preferably 0% to 10% by mass.

(Lithium Salt)

The solid electrolyte composition of the present invention preferably contains a lithium salt (supporting electrolyte).

The lithium salt is preferably a lithium salt that is ordinarily used in this kind of products and is not particularly limited, and the lithium salts described in Paragraphs 0082 to 0085 of JP2015-088486A are preferred.

In a case in which the solid electrolyte composition of the present invention includes the lithium salt, the content of the lithium salt is preferably 0.1 parts by mass or more and more preferably 5 parts by mass or more with respect to 100 parts by mass of the solid electrolyte. The upper limit is preferably 50 parts by mass or less and more preferably 20 parts by mass or less.

(Dispersant)

The solid electrolyte composition of the present invention may contain a dispersant. In a case in which the dispersant is added to the solid electrolyte composition, it is possible to suppress the agglomeration of the electrode active material or the inorganic solid electrolyte and form a uniform active material layer and a uniform solid electrolyte layer even in a case in which the concentration of any of the electrode active material and the inorganic solid electrolyte is high.

As the dispersant, a dispersant that is ordinarily used in all-solid state secondary batteries can be appropriately selected and used. For example, a dispersant which is made of a low-molecular-weight molecule or an oligomer having a molecular weight of 200 or more and less than 3,000 and contains a functional group represented by a group of functional groups (I) and an alkyl group having 8 or more carbon atoms or an aryl group having 10 or more carbon atoms in the same molecule is preferred.

Group of functional groups (I): an acidic group, a group having a basic nitrogen atom, a (meth)acyl group, a (meth) acrylamide group, an alkoxysilyl group, an epoxy group, an oxetanyl group, an isocyanate group, a cyano group, a thiol group, and a hydroloxy group (an acidic group, a group having a basic nitrogen atom, an alkoxysilyl group, an epoxy group, an oxetanyl group, a cyano group, a thiol group, and a hydroloxy group are preferred, and a carboxy group, a sulfonic acid group, a cyano group, an amino group, and a hydroxy group are more preferred).

In a case in which there is a layer including the dispersant in the all-solid state secondary battery of the present invention, the content of the dispersant in the layer is preferably 0.2% to 10% by mass.

(Preparation of Solid Electrolyte Composition)

The solid electrolyte composition of the present invention can be manufactured by mixing the inorganic solid electrolyte, the binder particles, the dispersion medium, and, as necessary, other components using, for example, a variety of mixers.

[Sheet for all-Solid State Secondary Battery]

A sheet for an all-solid state secondary battery of the present invention may be a sheet that is used for all-solid state secondary batteries and includes a variety of aspects depending on the use. Examples thereof include a sheet that is preferably used in a solid electrolyte layer (also referred to as a solid electrolyte sheet for an all-solid state secondary battery), a sheet that is preferably used in an electrode or a laminate of an electrode and a solid electrolyte layer (an electrode sheet for an all-solid state secondary battery), and the like. In the present invention, there are cases in which a variety of sheets described above will be collectively referred to as the sheet for an all-solid state secondary battery.

The sheet for an all-solid state secondary battery of the present invention is a sheet having a solid electrolyte layer or an active material (an electrode layer) on a base material. This sheet for an all-solid state secondary battery may have other layers as long as the sheet has a base material and a solid electrolyte layer or an active material, and a sheet having an active material layer is classified as an electrode sheet for an all-solid state secondary battery described below. Examples of other layers include a protective layer, a collector, a coating layer (a collector, another solid electrolyte layer, or another active material), and the like.

Examples of the solid electrolyte sheet for an all-solid state secondary battery of the present invention include a sheet having a solid electrolyte layer and, as necessary, a protective layer in this order on a base material which is intended to form the solid electrolyte layer of the all-solid state secondary battery of the present invention.

The base material is not particularly limited as long as the base material is capable of supporting the solid electrolyte layer, and examples thereof include sheet bodies (plate-like bodies) of the materials, the organic materials, the inorganic materials, and the like which have been described in the section of the collector. Examples of the organic materials include a variety of polymers, and specific examples thereof include polyethylene terephthalate, polypropylene, polyethylene, cellulose, and the like. Examples of the inorganic materials include glass, ceramic, and the like.

The constitution and the layer thickness of the solid electrolyte layer in the sheet for an all-solid state secondary battery are the same as the constitution and the layer thickness of the solid electrolyte layer described in the section of the all-solid state secondary battery of the present invention.

This sheet is obtained by forming a film of the solid electrolyte composition of the present invention on a base material (possibly, through other layers) (by means of coating and drying) and forming a solid electrolyte layer on the base material.

The electrode sheet for an all-solid state secondary battery of the present invention (also simply referred to as "the electrode sheet of the present invention") is an electrode sheet having an active material layer on a metal foil as a collector which is intended to form the active material layer of the all-solid state secondary battery of the present invention. This electrode sheet is generally a sheet having a collector and an active material layer, but may be an aspect having a collector, an active material layer, and a solid electrolyte layer in this order or an aspect having a collector, an active material layer, a solid electrolyte layer, and an active material layer in this order.

The constitutions and the layer thicknesses of the respective layers constituting the electrode sheet are the same as the constitutions and the layer thicknesses of the respective layers described in the section of the all-solid state secondary battery of the present invention. The electrode sheet is obtained by forming a film of the solid electrolyte composition of the present invention which contains an active material on a metal foil (by means of coating and drying) and forming an active material layer on the metal foil.

[Manufacturing of all-Solid State Secondary Battery and Electrode Sheet for all-Solid State Secondary Battery]

The all-solid state secondary battery and the electrode sheet for an all-solid state secondary battery can be manufactured using an ordinary method. Specifically, the all-solid state secondary battery and the electrode sheet for an all-solid state secondary battery can be manufactured by forming the respective layers described above using the solid electrolyte composition of the present invention and the like. The details will be described below.

The all-solid state secondary battery of the present invention can be manufactured using a method including (through) a step of applying the solid electrolyte composition of the present invention onto a metal foil which serves as a collector and forming a coated film (film manufacturing).

For example, a solid electrolyte composition containing a positive electrode active material is applied as a material for a positive electrode (a composition for a positive electrode layer) onto a metal foil which is a positive electrode collector so as to form a positive electrode active material layer, thereby producing a positive electrode sheet for an all-solid state secondary battery. Next, a solid electrolyte composition for forming a solid electrolyte layer is applied onto the positive electrode active material layer so as to form a solid electrolyte layer. Furthermore, a solid electrolyte composition containing a negative electrode active material is applied as a material for a negative electrode (a composition for a negative electrode layer) onto the solid electrolyte layer so as to form a negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can be produced by enclosing the all-solid state secondary battery in a chassis as necessary.

In addition, it is also possible to manufacture an all-solid state secondary battery by carrying out the methods for forming the respective layers in a reverse order so as to form a negative electrode active material layer, a solid electrolyte layer, and a positive electrode active material layer on a negative electrode collector and overlaying a positive electrode collector thereon.

As another method, the following method can be exemplified. That is, a positive electrode sheet for an all-solid state secondary battery is produced as described above. In addition, a solid electrolyte composition containing a negative electrode active material is applied as a material for a negative electrode (a composition for a negative electrode layer) onto a metal foil which is a negative electrode collector so as to form a negative electrode active material layer, thereby producing a negative electrode sheet for an all-solid state secondary battery. Next, a solid electrolyte layer is formed on the active material layer in any one of these sheets as described above. Furthermore, the other one of the positive electrode sheet for an all-solid state secondary battery and the negative electrode sheet for an all-solid state secondary battery is laminated on the solid electrolyte layer so that the solid electrolyte layer and the active material layer come into contact with each other. An all-solid state secondary battery can be manufactured as described above.

As still another method, the following method can be exemplified. That is, a positive electrode sheet for an all-solid state secondary battery and a negative electrode sheet for an all-solid state secondary battery are produced as described above. In addition, separately from the positive electrode sheet for an all-solid state secondary battery and the negative electrode sheet for an all-solid state secondary battery, a solid electrolyte composition is applied onto a base material, thereby producing a solid electrolyte sheet for an all-solid state secondary battery consisting of a solid electrolyte layer. Furthermore, the positive electrode sheet for an all-solid state secondary battery and the negative electrode sheet for an all-solid state secondary battery are laminated together so as to sandwich the solid electrolyte layer that has been peeled off from the base material. An all-solid state secondary battery can be manufactured as described above.

An all-solid state secondary battery can be manufactured by combining the above-described forming methods. For example, a positive electrode sheet for an all-solid state secondary battery, a negative electrode sheet for an all-solid state secondary battery, and a solid electrolyte sheet for an all-solid state secondary battery are produced respectively. Next, a solid electrolyte layer peeled off from a base material is laminated on the negative electrode sheet for an all-solid state secondary battery and is then attached to the positive electrode sheet for an all-solid state secondary battery, whereby an all-solid state secondary battery can be manufactured. In this method, it is also possible to laminate the solid electrolyte layer on the positive electrode sheet for an all-solid state secondary battery and attach the solid electrolyte layer to the negative electrode sheet for an all-solid state secondary battery.

In the above-described manufacturing method, the solid electrolyte composition of the present invention may be used for any one of the composition for a positive electrode, the solid electrolyte composition, and the composition for a negative electrode, and the solid electrolyte composition of the present invention is preferably used for all of the compositions.

(Formation of Individual Layers (Film Formation))

The method for applying the solid electrolyte composition is not particularly limited and can be appropriately selected. Examples thereof include coating (preferably wet-type coating), spray coating, spin coating, dip coating, slit coating, stripe coating, and bar coating.

At this time, the composition for forming the positive electrode active material layer, the composition for forming the inorganic solid electrolyte layer, and the composition for forming the negative electrode active material layer may be dried after being applied respectively or may be dried after being applied so as to form multiple layers.

The drying temperature is not particularly limited. The lower limit is preferably 30° C. or higher, more preferably 60° C. or higher, and still more preferably 80° C. or higher, and the upper limit is preferably 300° C. or lower, more preferably 250° C. or lower, and still more preferably 200° C. or lower. In a case in which the compositions are heated in the above-described temperature range, it is possible to remove the dispersion medium and form a solid state. In addition, the temperature is not excessively increased, and the respective members of the all-solid state secondary battery are not impaired, which is preferable. Therefore, in the all-solid state secondary battery, excellent general performance is exhibited, and it is possible to obtain a favorable bonding property and a favorable ion conductivity even without pressurization.

After the production of the applied solid electrolyte composition or the all-solid state secondary battery, the respective layers or the all-solid state secondary battery is preferably pressurized. In addition, the respective layers are also preferably pressurized in a state of being laminated together. Examples of the pressurization method include a hydraulic cylinder pressing machine and the like. The welding pressure is not particularly limited, but is, generally, preferably in a range of 50 to 1,500 MPa.

In addition, the applied solid electrolyte composition may be heated at the same time as pressurization. The heating temperature is not particularly limited, but is generally in a range of 30° C. to 300° C. The respective layers or the all-solid state secondary battery can also be pressed at a temperature higher than the glass transition temperature of the inorganic solid electrolyte. Meanwhile, in a case in which the inorganic solid electrolyte and the binder particles coexist, the respective layers or the all-solid state secondary battery can also be pressed at a temperature higher than the glass transition temperature of the polymer forming the binder particles. However, generally, the pressing temperature is a temperature that does not exceed the melting point of the polymer.

The pressurization may be carried out in a state in which the applied solvent or dispersion medium has been dried in advance or in a state in which the solvent or the dispersion medium remains.

The atmosphere during the pressurization is not particularly limited and may be any one of under the dried air (the dew point: −20° C. or lower), in an inert gas (for example, in an argon gas, in a helium gas, or in a nitrogen gas), and the like.

The pressing time may be a short time (for example, within several hours) at a high pressure or a long time (one day or longer) under the application of an intermediate pressure. In the case of members other than the sheet for an all-solid state secondary battery, for example, the all-solid state secondary battery, it is also possible to use a restraining device (screw fastening pressure or the like) in order to continuously apply an intermediate pressure.

The pressing pressure may be a pressure that is constant or varies with respect to a portion under pressure such as a sheet surface.

The pressing pressure can be changed depending on the area or film thickness of the portion under pressure. In addition, it is also possible to apply different pressures to the same portion.

A pressing surface may be flat or roughened.

(Initialization)

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then decreasing the pressure up to a pressure at which the all-solid state secondary battery is ordinarily used.

[Uses of all-Solid State Secondary Battery]

The all-solid state secondary battery of the present invention can be applied to a variety of uses. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, memory cards, portable tape recorders, radios, backup power supplies, and the like. Additionally, examples of consumer uses include automobiles, electric vehicles, motors, lighting equipment, toys, game devices, road conditioners, watches, strobes, cameras, medical devices (pacemakers, hearing aids, shoulder massage devices, and the like), and the like. Furthermore, the all-solid state secondary battery can be used for a variety of military uses and universe uses. In addition, the all-solid state secondary battery can also be combined with solar batteries.

Among these, the all-solid state secondary battery is preferably applied to applications for which a high capacity and high-rate discharging characteristics are required. For example, in electricity storage facilities in which an increase in the capacity is expected in the future, it is necessary to satisfy both high safety, which is essential, and furthermore, the battery performance. In addition, in electric vehicles mounting high-capacity secondary batteries and domestic uses in which batteries are charged out every day, better safety is required against overcharging. According to the present invention, it is possible to preferably cope with the above-described use aspects and exhibit excellent effects.

All-solid state secondary batteries refer to secondary batteries having a positive electrode, a negative electrode, and an electrolyte which are all constituted of solid. In other words, all-solid state secondary batteries are differentiated from electrolytic solution-type secondary batteries in which a carbonate-based solvent is used as an electrolyte. Among these, the present invention is assumed to be an inorganic all-solid state secondary battery. All-solid state secondary batteries are classified into organic (polymer) all-solid state secondary batteries in which a polymer compound such as polyethylene oxide is used as an electrolyte and inorganic all-solid state secondary batteries in which the Li—P—S, LLT, LLZ, or the like is used. Meanwhile, the application of polymer compounds to inorganic all-solid state secondary batteries is not inhibited, and polymer compounds can also be applied as positive electrode active materials, negative electrode active materials, and binder particles of inorganic solid electrolyte particles.

Inorganic solid electrolytes are differentiated from electrolytes in which the above-described polymer compound such as polyethylene oxide is used as an ion conductive medium (polymer electrolyte), and inorganic compounds serve as ion conductive media. Specific examples thereof include the Li—P—S, LLT, and LLZ. Inorganic solid electrolytes do not emit positive ions (Li ions) and exhibit an ion transportation function. In contrast, there are cases in which materials serving as an ion supply source which is added to electrolytic solutions or solid electrolyte layers and emits positive ions (Li ions) are referred to as electrolytes; however, in the case of being differentiated from electrolytes as the ion transportation materials, the materials are referred to as "electrolyte salts" or "supporting electrolytes". Examples of the electrolyte salts include lithium bistrifluoromethanesulfonylimide (LiTFSI).

In the case of being referred to as a "composition" in the present invention, the "composition" refers to a mixture obtained by uniformly mixing two or more components. Here, the composition needs to substantially maintain uniformity and may partially include agglomeration or uneven distribution as long as the compositions exhibit desired effects. In addition, in the case of being referred to as a solid electrolyte composition, the solid electrolyte composition basically refers to a composition (typically having a paste form) which serves as a material for forming the solid electrolyte layer or the like, and an electrolyte layer or the like formed by curing the above-described composition is not considered as the solid electrolyte composition.

EXAMPLES

Hereinafter, the present invention will be described in more detail on the basis of examples. Meanwhile, the present invention is not interpreted to be limited thereto. In the following examples, "parts" and "%" expressing compositions are mass-based unless particularly otherwise described. In the present invention, "room temperature" refers to 25° C.

Example 1

In Example 1, a sheet for an all-solid state secondary battery was produced, and the performance was evaluated.
<Synthesis of Binder Particles (Preparation of Binder Particle Dispersion Liquids)>
(1) Synthesis of Binder Particles B-1 to B-6 Consisting of Acrylic Resin Heptane (160 parts by mass) was added to a 1 L three-neck flask equipped with a reflux cooling pipe and a gas introduction cock and heated to 80° C. after the introduction of nitrogen gas at a flow rate of 200 mL/min for 10 minutes. A liquid prepared in a separate container (a liquid obtained by mixing hydroxyethyl acrylate A-10 (manufactured by Wako Pure Chemical Industries, Ltd.) (90 parts by mass), acrylic acid A-1 (manufactured by Wako Pure Chemical Industries, Ltd.) (7 parts by mass), a macromonomer MM-1 described below (41 parts by mass, solid content amount), and a polymerization initiator V-601 (trade name, manufactured by Wako Pure Chemical Industries, Ltd.) (1.4 parts by mass)) was added dropwise thereto for two hours, and then the components were stirred at 80° C. for two hours. After that, V-601 (1.4 parts by mass) was added to the obtained mixture, and furthermore, the components were stirred at 90° C. for two hours. The obtained solution was diluted with heptane, thereby obtaining a dispersion liquid of binder particles B-1. The concentration of solid contents was 39.3%, the SP value was 11.6, and the mass-average molecular weight was 101,000.

Dispersion liquids of binder particles B-2 to B-6 were respectively prepared according to monomers and the ratios thereof shown in Table 1 in the preparation of the binder particle B-1 dispersion liquid.

(Synthesis of Macromonomer MM-1)

Toluene (190 parts by mass) was added to a 1 L three-neck flask equipped with a reflux cooling pipe and a gas introduction cock, nitrogen gas was introduced into the flask at a flow rate of 200 mL/min for 10 minutes, and toluene was heated to 80° C. A liquid prepared in a separate container (the following formulation a) was added dropwise thereto for two hours, and then the components were stirred at 80° C. for two hours. After that, V-601 (manufactured by Wako Pure Chemical Industries, Ltd.) (0.2 parts by mass) was added thereto, and furthermore, the components were stirred at 95° C. for two hours. 2,2,6,6,-Tetramethyl piperidine-1-oxyl (manufactured by Tokyo Chemical Industry Co., Ltd.) (0.025 parts by mass), glycidyl methacrylate (manufactured by Wako Pure Chemical Industries, Ltd.) (13 parts by mass), and tetrabutyl ammonium bromide (manufactured by Tokyo Chemical Industry Co., Ltd.) (2.5 parts by mass) were added to the solution held at 95° C. after stirring and stirred at 120° C. for three hours. The obtained mixture was cooled to room temperature, added to methanol, and precipitated, the precipitate was filtered and then washed with methanol twice, and heptane (300 parts by mass) was added to the precipitate and dissolved the precipitate. A part of the obtained solution was distilled away at a reduced pressure, thereby obtaining a solution of the macromonomer MM-1. The concentration of solid contents was 43.4%, the SP value was 9.1, and the mass-average molecular weight was 16,000. The obtained macromonomer MM-1 will be illustrated below.

| (Formula α) | |
|---|---|
| Dodecyl methacrylate (manufactured by Wako Pure Chemical Industries, Ltd.) | 150 parts by mass |
| Methyl methacrylate A-4 (manufactured by Wako Pure Chemical Industries, Ltd.) | 59 parts by mass |
| 3-Mercaptobutyric acid (manufactured by Tokyo Chemical Industry Co., Ltd.) | 2 parts by mass |
| V-601 (manufactured by Wako Pure Chemical Industries, Ltd.) | 1.9 parts by mass |

Macromonomer MM-1

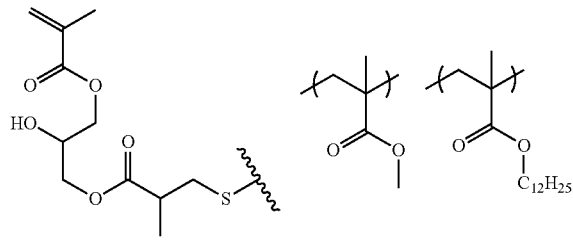

(Synthesis of Macromonomer MM-2)

Toluene (190 parts by mass) was added to a 1 L three-neck flask equipped with a reflux cooling pipe and a gas introduction cock, nitrogen gas was introduced into the flask at a flow rate of 200 mL/min for 10 minutes, and toluene was heated to 80° C. A liquid prepared in a separate container (the following formulation p) was added dropwise thereto for two hours, and then the components were stirred at 80° C. for two hours. After that, V-601 (manufactured by Wako Pure Chemical Industries, Ltd.) (0.2 parts by mass) was added thereto, and furthermore, the components were stirred at 95° C. for two hours. 2,2,6,6,-Tetramethyl piperidine-1-oxyl (manufactured by Tokyo Chemical Industry Co., Ltd.) (0.025 parts by mass), 2-isocyanatoethyl methacrylate (manufactured by Wako Pure Chemical Industries, Ltd.) (13 parts by mass), and a bismuth catalyst: NEOSTAN U-600 (trade name, manufactured by Nitto Kasei Co., Ltd.) (0.6 parts by mass) were added to the solution held at 95° C. after stirring and stirred at 95° C. for three hours. The obtained mixture was cooled to room temperature, added to methanol, and precipitated, the precipitate was filtered and then washed with methanol twice, and then heptane (300 parts by mass) was added to the precipitate and dissolved the precipitate. A part of the obtained solution was distilled away at a reduced pressure, thereby obtaining a solution of the macromonomer MM-2. The concentration of solid contents was 40.5%, the SP value was 9.1, and the mass-average molecular weight was 13,000. The obtained macromonomer MM-2 will be illustrated below.

methyl ethyl ketone was distilled away, and then the solid content was dissolved in heptane, thereby obtaining a heptane solution of 25% by mass of terminal diol modified polydodecyl methacrylate (292 g).

The mass-average molecular weight of the obtained polymer was 3,200.

Subsequently, polyurea colloid particles MM-3 were synthesized.

Specifically, the heptane solution of 25% by mass of terminal diol modified polydodecyl methacrylate (260 g) was added to a 1 L three-neck flask and diluted with heptane (110 g). Isophorone diisocyanate (manufactured by Wako Pure Chemical Industries, Ltd.) (11.1 g) and NEOSTAN U-600 (trade name, manufactured by Nitto Kasei Co., Ltd.) (0.1 g) were added thereto and heated and stirred at 75° C. for five hours. After that, a heptane (125 g)-diluted liquid of isophorone diamine (amine compound) (0.4 g) was added dropwise thereto for one hour. Ten minutes after the initiation of the dropwise addition, the polymer solution changed from a transparent solution to a solution having a light yellow fluorescent color. From this change, it was found that urea colloids were formed. The reaction liquid was cooled to room temperature, and a heptane solution of 15% by mass of polyurea colloid particles MM-3 (506 g) was obtained.

| (Formula β) | |
|---|---|
| Dodecyl methacrylate (manufactured by Wako Pure Chemical Industries, Ltd.) | 150 parts by mass |
| Methyl methacrylate A-4 (manufactured by Wako Pure Chemical Industries, Ltd.) | 59 parts by mass |
| 6-Mercapto-1-hexanol (manufactured by Aldrich-Sigma, Co. LLC.) | 2 parts by mass |
| V-601 (manufactured by Wako Pure Chemical Industries, Ltd.) | 1.9 parts by mass |

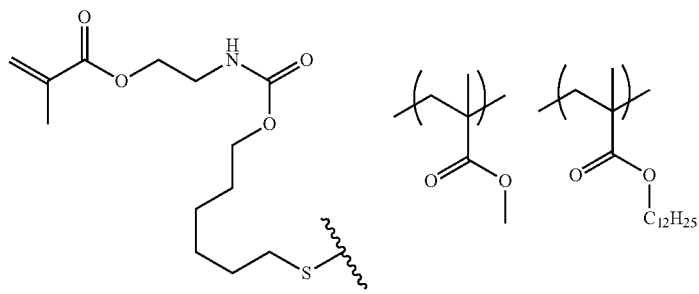

Macromonomer MM-2

(2) Synthesis of Binder Particles B-7 Consisting of Urethane Resin

In order to synthesize binder particles B-7 consisting of a urethane resin, first, terminal diol dodecyl polymethacrylate was synthesized.

Specifically, methyl ethyl ketone (20 mL) was prepared in a 500 mL three-neck flask and heated to 75° C. under a nitrogen stream. Meanwhile, dodecyl methacrylate (manufactured by Wako Pure Chemical Industries, Ltd.) (70 g) and methyl ethyl ketone (110 g) were prepared in a 500 mL measuring cylinder and stirred for 10 minutes. Thioglycerol (manufactured by Wako Pure Chemical Industries, Ltd.) (2.9 g) as a chain transfer agent and a radical polymerization initiator V-601 (manufactured by Wako Pure Chemical Industries, Ltd.) (3.2 g) were added thereto and further stirred for 10 minutes. The obtained monomer solution was added dropwise to the 500 mL three-neck flask for two hours, and radical polymerization was initiated. Furthermore, after the dropwise addition, the components were heated and stirred at 75° C. for six hours. The obtained polymerized liquid was condensed at a reduced pressure, The mass-average molecular weight of the polyurea of the polyurea colloid particles MM-3 was 9,600.

Next, a urethane resin B-7 was synthesized using polyurea colloid particles MM-3. Specifically, m-phenylene diisocyanate (manufactured by Tokyo Chemical Industry Co., Ltd.) (3.2 g) and polyethylene glycol (mass-average molecular weight: 400, manufactured by Aldrich-Sigma, Co. LLC.) (8.0 g) were added to a 50 mL sample bottle. The heptane solution of 15% by mass of polyurea colloid particles MM-3 (32.0 g) was added thereto and dispersed for 30 minutes using a homogenizer while being heated at 50° C. During the addition and dispersion, the liquid mixture was microparticulated and turned into a light orange slurry. The obtained slurry was injected into a 200 mL three-neck flask that had been heated to 80° C. in advance, NEOSTAN U-600 (trade name, manufactured by Nitto Kasei Co., Ltd.) (0.1 g) was added thereto and heated and stirred at 80° C. and a rotation speed of 400 rpm for three hours. The slurry had a white emulsion form. Therefore, it was assumed that binder particles consisting of a urethane resin were formed. The white emulsion-form slurry was cooled, thereby obtaining a heptane dispersion liquid of binder particles B-7 consisting of a urethane resin. The concentration of solid contents was 40.3%, the SP value was 11.1, and the mass-average molecular weight was 96,000.

The measurement results of the concentrations of solid contents of the dispersion liquids of the binder particles and the macromonomer solutions, and the SP values, the mass-average molecular weights, the glass transition temperatures (Tg), and the average particle diameters of the polymers forming the binder particles and the macromonomers are shown in Table 1.

<Method for Calculating SP Value>

The SP values ($cal^{1/2}$ $cm^{-3/2}$) of the polymer forming the binder particles and the macromonomer were calculated on the basis of the above-described method.

<Measurement of Average Particle Diameter of Binder Particles>

The average particle diameter (PD) of the binder particles was measured in the following order. A dried specimen of the dispersion liquid of the binder particles prepared above was dissolved using an appropriate solvent (a dispersion medium that was used to prepare the solid electrolyte composition; heptane in the case of the binder particles B-1), thereby preparing a dispersion liquid (1% by mass). This dispersion liquid specimen was irradiated with 1 kHz ultrasonic waves for 10 minutes, and then the volume-average particle diameter of resin particles was measured using a laser diffraction/scattering-type particle size distribution measurement instrument LA-920 (trade name, manufactured by Horiba Ltd.).

<Measurement of Mass-Average Molecular Weight>

The mass-average molecular weights of the polymers forming the binder particles and the macromonomers were measured using the above-described method (Condition 2).

TABLE 1

| No. | M1 | % | M2 | % | M3 | % | MM | % | SP value | Tg °C. | PD nm | Mass-average molecular weight | Concentration of solid contents % |
|---|---|---|---|---|---|---|---|---|---|---|---|---|---|
| B-1 | A-10* | 65 | A-1 | 5 | | | MM-1 | 30 | 11.6 | 0 | 280 | 101,000 | 39.3 |
| B-2 | A-10* | 35 | A-19* | 30 | A-1 | 5 | MM-1 | 30 | 12.4 | 6 | 292 | 95,000 | 40.1 |
| B-3 | A-42* | 35 | A-5 | 30 | A-1 | 5 | MM-1 | 30 | 10.5 | 1 | 181 | 87,000 | 38.5 |
| B-4 | A-10* | 65 | A-1 | 5 | | | MM-2 | 30 | 11.6 | 0 | 202 | 96,000 | 41.2 |
| B-5 | A-19* | 65 | A-1 | 5 | | | MM-1 | 30 | 13 | 28 | 387 | 78,000 | 36.7 |
| B-6 | A-30* | 65 | A-1 | 5 | | | MM-1 | 30 | 11 | 38 | 273 | 85,000 | 39 |
| B-7 | mPD | 20 | PEG* | 50 | | | MM-3 | 30 | 11.1 | −20 | 370 | 96,000 | 40.3 |

<Notes of Table>
"%" in the table represents "% by mass" (corresponding to the copolymerization ratio or the condensation ratio)
M1 to M3: Monomers.
*Monomers having an SP value of 10.5 ($cal^{1/2}cm^{-3/2}$) or more
MM: Macromonomer
mPD: m-Phenylene diisocyanate
PEG: Polyethylene glycol
SP value: The SP value ($cal^{1/2}cm^{-3/2}$) of the polymer constituting the binder particles
Tg: The glass transition temperature of the polymer constituting the binder particles
PD: The average particle diameter of the binder particles <Method for Measuring Concentrations of Solid Contents>

The concentrations of solid contents of the dispersion liquids of the binder particles and the macromonomer solutions were measured on the basis of the following method.

The dispersion liquid of the binder particles or the macromonomer solution (approximately 1.5 g) was weighed in an aluminum cup having a diameter of 7 cm, and the weighing value was scanned to three places of decimals. Subsequently, the dispersion liquid or the macromonomer solution was heated and dried at 90° C. for two hours in a nitrogen atmosphere and heated and dried at 140° C. for two hours. The weight of the obtained residue in the aluminum cup was measured, and the concentration of solid contents was computed from the following expression. The measurement was carried out five times, and the average value of three measurement values excluding the maximum value and the minimum value was employed.

The concentration of solid contents (%)=the amount (g) of the residue in the aluminum cup/the dispersion liquid of the binder particles or the macromonomer solution (g)

<Method for Measuring Glass Transition Temperature (Tg)>

The glass transition temperature (Tg) of the polymer forming the binder particles was measured using the above-described method. The results are shown in Table 1.

<Synthesis of Binder Particles BC-1 for Comparison> n-Butyl acrylate (700 parts by mass), styrene (200 parts by mass), methacrylic acid (5 parts by mass), divinyl benzene (10 parts by mass), polyoxyethylene lauryl ether (manufactured by Kao Corporation, EMULGEN 108, nonionic surfactant, the number of carbon atoms in an alkyl group: 12, HLB value: 12.1) (25 parts by mass), ion exchange water (1,500 parts by mass), and 2,2'-azobisisobutylorinitrile (15 parts by mass) as a polymerization initiator were prepared in an autoclave and stirred for 10 minutes. After that, the components were heated to 80° C. and thus polymerized. In addition, after the initiation of the polymerization, the components were cooled, thereby stopping the polymerization reaction. Decalin (3,000 parts by mass) was added to the obtained dispersion liquid, and the dispersion liquid was dried at a reduced pressure so as to remove moisture, thereby obtaining latex of binder particles BC-1. The SP value of the polymer forming the binder particles BC-1 was 9.5.

<Synthesis of Binder Particles BC-2 for Comparison>

Ion exchange water (167 g) was injected into a 2 L three-neck flask equipped with a reflux cooling pipe and a gas introduction cock, nitrogen gas was introduced into the flask at a flow rate of 200 mL/min for 10 minutes, and then the components were heated to 80° C. After the temperature reached 80° C., butyl acrylate (10 g), styrene (8 g), and sodium lauryl sulfate (0.2 g) were injected thereinto. Potassium persulfate (0.14 g) was dissolved in ion exchange water (9.0 g) and injected into a reactor held at 80° C. Furthermore, while a reaction product obtained by mixing and emulsifying ion exchange water (167 g), styrene (54 g), butyl acrylate (108 g), allyl methacrylate (2 g), itaconic acid (10 g), and sodium lauryl sulfate (0.3 g) was added dropwise thereto for three hours, a solution obtained by dissolving potassium persulfate (0.4 g) in ion exchange water (18.0 g) was injected thereinto in the same manner for three hours. NMP (500 g) was added to the obtained binder particle polymerized substance (50 g), and then water was removed by means of distillation at 90° C., thereby obtaining latex of binder particles BC-2. The SP value of the polymer forming the binder particles BC-2 was 9.2.

<Synthesis of Sulfide-Based Inorganic Solid Electrolyte>

In a globe box under an argon atmosphere (dew point: −70° C.), lithium sulfide ($Li_2S$, manufactured by Aldrich-Sigma, Co. LLC. Purity: >99.98%) (2.42 g) and diphosphorus pentasulfide ($P_2S_5$, manufactured by Aldrich-Sigma, Co. LLC. Purity: >99%) (3.90 g) were weighed respectively, injected into an agate mortar, and mixed together using an agate muddler for five minutes. The mixing ratio between $Li_2S$ and $P_2S_5$ was set to 75:25 ($Li_2S:P_2S_5$) in terms of molar ratio.

Zirconia beads having a diameter of 5 mm (66 g) were injected into a 45 mL zirconia container (manufactured by Fritsch Japan Co., Ltd.), the full amount of a mixture of the lithium sulfide and the diphosphorus pentasulfide was injected thereinto, and the container was completely sealed in the argon atmosphere. The container was set in a planetary ball mill P-7 (trade name, manufactured by Fritsch Japan Co., Ltd.), mechanical milling was carried out at a temperature of 25° C. and a rotation speed of 510 rpm for 20 hours, thereby obtaining yellow powder (6.20 g) of a sulfide-based inorganic solid electrolyte (Li/P/S glass, expressed as LPS in some cases).

<Example of Preparation of Solid Electrolyte Compositions>

180 zirconia beads having a diameter of 5 mm were injected into a 45 mL zirconia container (manufactured by Fritsch Japan Co., Ltd.), and LPS synthesized above (4.85 g), the binder particles shown in Table 2 (0.15 g in terms of the solid content mass), and a dispersion medium shown in Table 2 (17.0 g) were injected thereinto as. After that, the container was set in a planetary ball mill P-7 manufactured by Fritsch Japan Co., Ltd., the components were continuously mixed at a temperature of 25° C. and a rotation speed of 300 rpm for two hours, thereby preparing individual solid electrolyte compositions S-2 to S-9 and T-1 to T-2.

The C log P values of the dispersion media shown in the table are values computed as described above.

TABLE 2

| No. | Sulfide-based inorganic solid electrolyte | % | Binder particles | % | Dispersion medium | CLog P value | Note |
|---|---|---|---|---|---|---|---|
| S-1 | LPS | 97% | B-1 | 3% | Heptane | 4.4 | Present Invention |
| S-2 | LPS | 97% | B-1 | 3% | DBE | 2.99 | Present Invention |

TABLE 2-continued

| No. | Sulfide-based inorganic solid electrolyte | % | Binder particles | % | Dispersion medium | CLog P value | Note |
|---|---|---|---|---|---|---|---|
| S-3 | LPS | 97% | B-1 | 3% | MEK | 0.32 | Present Invention |
| S-4 | LPS | 97% | B-2 | 3% | Heptane | 4.4 | Present Invention |
| S-5 | LPS | 97% | B-3 | 3% | Heptane | 4.4 | Present Invention |
| S-6 | LPS | 97% | B-4 | 3% | Heptane | 4.4 | Present Invention |
| S-7 | LPS | 97% | B-5 | 3% | Heptane | 4.4 | Present Invention |
| S-8 | LPS | 97% | B-6 | 3% | Heptane | 4.4 | Present Invention |
| S-9 | LPS | 97% | B-7 | 3% | Heptane | 4.4 | Present Invention |
| T-1 | LPS | 97% | BC-1 | 3% | Toluene | 2.64 | Comparative Example |
| T-2 | LPS | 97% | BC-2 | 3% | NMP | −0.4 | Comparative Example |

<Notes of Table>
In the table, the numerical values of the sulfide-based inorganic solid electrolyte and the binder particles are mass ratios (%).
Regarding the numbers of the binder particles, refer to the numbers in Table 1.
CLog P value: The CLog P value of the dispersion medium
LPS: Sulfide-based inorganic solid electrolyte synthesized above
DBE: Dibutyl ether
MEK: Methyl ethyl ketone
NMP: N-methylpyrrolidone <Production of Sheets for all-Solid State Secondary Battery (Solid Electrolyte Sheets for all-Solid State Secondary Battery)>

Each of the solid electrolyte compositions obtained above was applied onto a 20 μm-thick aluminum foil using an applicator (trade name: SA-201 Baker type applicator, manufactured by Tester Sangyo Co., Ltd.) and heated at 80° C. for two hours, thereby drying the solid electrolyte composition. After that, the dried solid electrolyte composition was heated and pressurized at a temperature of 120° C. and a pressure of 600 MPa using a heat pressing machine so as to obtain a predetermined density, thereby obtaining each of sheets for an all-solid state secondary battery No. 101 to 109 and c11 and c12. The film thickness of the solid electrolyte layer was 50 μm.

On the produced sheets for an all-solid state secondary battery, the following tests were carried out, and the results are shown in Table 3.

<Measurement of Ion Conductivity>

Figure 2:
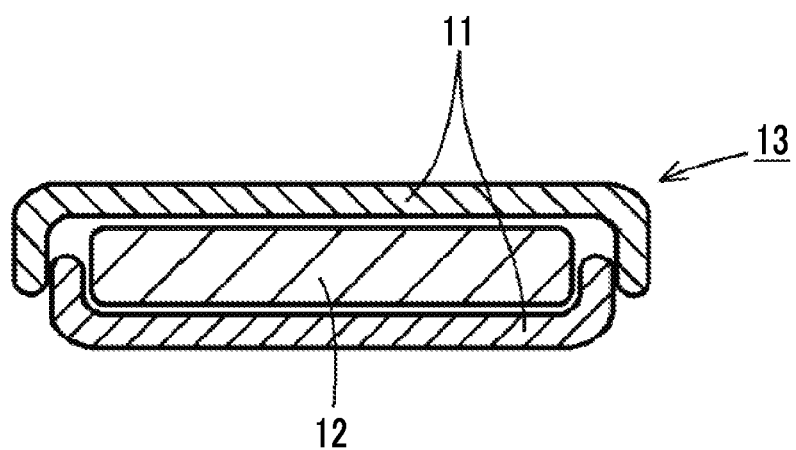
FIG. 2 is a vertical cross-sectional view schematically illustrating an all-solid state secondary battery (coin battery) produced in an example.

A disc-shaped piece having a diameter of 14.5 mm was cut out from the sheet for an all-solid state secondary battery obtained above, and the sheet for an all-solid state secondary battery 12 was put into a coin case 11 illustrated in FIG. 2. Specifically, an aluminum foil cut out in a disc shape having a diameter of 15 mm (not illustrated in FIG. 2) was brought into contact with the solid electrolyte layer, a spacer and a washer (both are not illustrated in FIG. 2) were combined into the coin case, and the aluminum foil was put into the 2032-type stainless steel coin case 11. The coin case 11 was swaged, thereby producing a cell for measuring ion conductivity (coin battery) 13.

The ion conductivity was measured using the above-obtained cell for ion conductivity measurement. Specifically, the alternating current impedance was measured in a constant-temperature tank (30° C.) using a 1255B FREQUENCY RESPONSE ANALYZER (trade name) manufactured by Solartron Analytical. Inc. at a voltage magnitude of 5 mV and a wavelength of 1 MHz to 1 Hz. Therefore, the resistance of the specimen in the film thickness direction was obtained by means of calculation using Expression (A).

Ion conductivity (mS/cm)=1,000×specimen film thickness (cm)/(resistance (Ω)×specimen area (cm$^2$))  Expression (A)

<Evaluation of Bonding Property>

A disc-shaped piece having a diameter of 14.5 mm was cut out from the sheet for an all-solid state secondary battery, the surface portion (an observation region of 500 μm×500 μm) of the solid electrolyte layer in the cut-out sheet was observed using an optical microscope for inspection (ECLIPSE Ci (trade name), manufactured by Nikon Corporation), and the presence and absence of chips, cracks, or fissures in the solid electrolyte layer and the occurrence of the peeling of the solid electrolyte layer from the aluminum foil (collector) were evaluated using the following standards. In the present test, the evaluation standards of "3" or higher are pass.

—Evaluation Standards—

5: No defects (chips, cracks, fissures, and peeling) were observed.

4: The area of defect portions was more than 0% and 10% or less of the total area which was the observation subject.

3: The area of defect portions was more than 10% and 30% or less of the total area which was the observation subject.

2: The area of defect portions was more than 30% and 90% or less of the total area which was the observation subject.

1: The area of defect portions was more than 90% of the total area which was the observation subject.

TABLE 3

| No. | Solid electrolyte composition | Bonding property | Ion conductivity (mS/cm) | Note |
|---|---|---|---|---|
| 101 | S-1 | 5 | 0.4 | Present Invention |
| 102 | S-2 | 5 | 0.38 | Present Invention |
| 103 | S-3 | 4 | 0.22 | Present Invention |
| 104 | S-4 | 5 | 0.42 | Present Invention |
| 105 | S-5 | 3 | 0.37 | Present Invention |
| 106 | S-6 | 5 | 0.39 | Present Invention |
| 107 | S-7 | 4 | 0.35 | Present Invention |
| 108 | S-8 | 3 | 0.36 | Present Invention |
| 109 | S-9 | 4 | 0.36 | Present Invention |
| c11 | T-1 | 1 | 0.18 | Comparative Example |
| c12 | T-2 | 1 | 0.02 | Comparative Example |

From the results shown in Table 3, it was found that the solid electrolyte composition of the present invention including the inorganic solid electrolyte, the specific binder particles, and the dispersion medium is capable of suppressing an increase in the interface resistance between the solid particles and the like or between the solid particles and the collector (the ion conductivity is high) and, furthermore, realizing a favorable bonding property.

In contrast, the solid electrolyte compositions of the comparative examples not containing the specific binder particles were insufficient in terms of both the ion conductivity and the bonding property.

Example 2

In Example 2, a negative electrode sheet for an all-solid state secondary battery was produced, and the performance was evaluated.

<Preparation of Composition for Negative Electrode Layer>

One hundred eighty zirconia beads having a diameter of 5 mm were injected into a 45 mL zirconia container (manufactured by Fritsch Japan Co., Ltd.), and LPS synthesized in Example 1 (2.7 g), a dispersion liquid of the binder particles B-2 (0.3 g in terms of the solid content), and heptanes (22 g) as a dispersion medium were injected thereinto. After that, the container was set in a planetary ball mill P-7 manufactured by Fritsch Japan Co., Ltd., the components were stirred at a temperature of 25° C. and a rotation speed of 300 rpm for two hours. After that, a negative electrode active material (7.0 g) shown in Table 4 was injected thereinto, the container was, again, set in the planetary ball mill P-7, and the components were continuously mixed together at a temperature of 25° C. and a rotation speed of 100 rpm for 15 minutes. Compositions for a negative electrode layer N-1 and N-2 were obtained in the above-described manner.

<Production of Negative Electrode Sheet for all-Solid State Secondary Battery>

Each of the compositions for a negative electrode layer obtained above was applied onto a 20 μm-thick stainless steel foil using the Baker type applicator and heated at 80° C. for two hours, thereby drying the composition for a negative electrode layer. After that, the dried composition for a negative electrode layer was heated (at 120° C.) and pressurized (600 MPa for one minute) using a heat pressing machine so as to obtain a predetermined density, thereby producing a negative electrode sheet for an all-solid state secondary battery having a 110 μm-thick negative electrode active material layer.

For the produced negative electrode sheets for an all-solid state secondary battery, the bonding property was evaluated in the same manner as in the evaluation of the bonding property of the sheet for an all-solid state secondary battery in Example 1. The results are shown in Table 4.

From the results of Table 4, it was found that the use of graphite as the negative electrode active material degrades the bonding property.

TABLE 4

| No. | Negative electrode active material | % | Solid electrolyte | % | Binder particles | % | Dispersion medium | Bonding property |
|---|---|---|---|---|---|---|---|---|
| N-1 | LTO | 70 | LPS | 27 | B-2 | 3 | Heptane | 5 |
| N-2 | Graphite | 70 | LPS | 27 | B-2 | 3 | Heptane | 2 |

<Notes of Table>
Content: Mass-based
LTO: Lithium titanium oxide

Example 3

In Example 3, an all-solid state secondary battery illustrated in FIG. 2 which had the layer constitution illustrated in FIG. 1 was produced, and the performance thereof was evaluated.

<Preparation of Composition for Positive Electrode Layer>

One hundred eighty zirconia beads having a diameter of 5 mm were injected into a 45 mL zirconia container (manufactured by Fritsch Japan Co., Ltd.), and LPS synthesized in Example 1 (2.7 g) and a dispersion liquid of binder particles (0.3 g in terms of the solid content) were injected into a dispersion medium (22 g) as shown in Table 5. After that, the container was set in a planetary ball mill P-7 manufactured by Fritsch Japan Co., Ltd., the components were stirred at a temperature of 25° C. and a rotation speed of 300 rpm for two hours. After that, a positive electrode active material shown in Table 5 (7.0 g) was injected thereinto, the container was, again, set in the planetary ball mill P-7, and the components were continuously mixed together at a temperature of 25° C. and a rotation speed of 100 rpm for 15 minutes. Individual compositions for a positive electrode layer U-1 to U-9 and V-1 and V-2 were obtained in the above-described manner.

TABLE 5

| No. | Positive electrode active material | % | Solid electrolyte | % | Binder particles | % | Dispersion medium | Bonding property |
|---|---|---|---|---|---|---|---|---|
| U-1 | NMC | 70 | LPS | 27 | B-1 | 3 | Heptane | Present Invention |
| U-2 | LCD | 70 | LPS | 27 | B-1 | 3 | Heptane | Present Invention |
| U-3 | NMC | 70 | LPS | 27 | B-1 | 3 | MEK | Present Invention |
| U-4 | NMC | 70 | LPS | 27 | B-2 | 3 | Heptane | Present Invention |
| U-5 | NMC | 70 | LPS | 27 | B-3 | 3 | Heptane | Present Invention |
| U-6 | NMC | 70 | LPS | 27 | B-4 | 3 | Heptane | Present Invention |
| U-7 | NMC | 70 | LPS | 27 | B-5 | 3 | Heptane | Present Invention |
| U-8 | NMC | 70 | LPS | 27 | B-6 | 3 | Heptane | Present Invention |
| U-9 | NMC | 70 | LPS | 27 | B-7 | 3 | Heptane | Present Invention |
| V-1 | NMC | 70 | LPS | 27 | BC-1 | 3 | Toluene | Comparative Example |
| V-2 | NMC | 70 | LPS | 27 | BC-2 | 3 | NMP | Comparative Example |

<Notes of Table>
Content: Mass-based
NMC; Li(Ni$_{1/3}$Mn$_{1/3}$Co$_{1/3}$)O$_2$ Lithium nickel manganese cobalt oxide (Nippon Chemical Industrial Co., Ltd.)
LCO; LiCoO$_2$ Lithium cobalt oxide <Production of Positive Electrode Sheet for all-Solid State Secondary Battery>

Each of the compositions for a positive electrode layer shown in Table 6 was applied onto a 20 μm-thick aluminum foil using the Baker type applicator and heated at 80° C. for two hours, thereby drying the composition for a positive electrode layer. After that, the dried composition for a positive electrode layer was heated (at 120° C.) and pressurized (600 MPa for one minute) using a heat pressing machine so as to obtain a predetermined density, thereby producing a positive electrode sheet for an all-solid state secondary battery having a 80 μm-thick positive electrode active material layer.

Next, each of the solid electrolyte compositions shown in Table 6, which was produced in Example 1, was applied on the obtained positive electrode active material layer using the Baker type applicator and heated at 80° C. for two hours, thereby drying solid electrolyte composition. After that, the dried solid electrolyte composition was heated (at 120° C.) and pressurized (600 MPa for one minute) using a heat pressing machine so as to obtain a predetermined density, thereby producing a positive electrode sheet for an all-solid state secondary battery including a 30 μm-thick solid electrolyte layer.

<Production of all-Solid State Secondary Battery>

A disc-shaped piece having a diameter of 14.5 mm was cut out from the positive electrode sheet for an all-solid state secondary battery obtained above, was put into a 2032-type stainless steel coin case 11 into which a spacer and a washer were combined, and an indium foil cut out to a diameter of 15 mm was overlaid on the solid electrolyte layer. A stainless steel foil was further overlaid on the indium foil, and the coin case 11 was swaged, thereby producing all-solid state secondary batteries No. 201 to 209 and c21 and c22 illustrated in FIG. 2.

The layer constitution of the all-solid state secondary battery manufactured as described above is the layer constitution illustrated in FIG. 1.

<Evaluation of Resistance>

Each of the all-solid state secondary batteries produced above was evaluated using a charge and discharge evaluation device TOSCAT-3000 (trade name, manufactured by Toyo System Corporation). The all-solid state secondary battery was charged at a current density of 0.1 mA/cm$^2$ until the battery voltage reached 3.6 V. The all-solid state secondary battery was discharged at a current density of 0.1 mA/cm$^2$ until the battery voltage reached 1.9 V. The charging and discharge were repeated, the battery voltage after three cycles of 5 mAh/g (the quantity of electricity per gram of the mass of the active material) discharging was scanned using the following standards, and the resistance was evaluated. A high battery voltage indicates a low resistance. In the present test, the evaluation standards of "C" or higher are pass.

—Evaluation Standards—
A: 3.4 V or higher
B: 3.2 V or higher and lower than 3.4 V
C: 3.0 V or higher and less than 3.2 V
D: Lower than 3.0 V
E: Charging and discharging was not possible.

<Evaluation of Cycle Characteristics (Discharge Capacity Retention)>

The cycle characteristics of each of the all-solid state secondary batteries produced above were evaluated using a charge and discharge evaluation device TOSCAT-3000. The all-solid state secondary battery was charged at a current density of 0.1 mA/cm$^2$ until the battery voltage reached 3.6 V. The all-solid state secondary battery was discharged at a current density of 0.1 mA/cm$^2$ until the battery voltage reached 1.9 V. Three cycles of charging and discharging were repeated under the above-described conditions, thereby carrying out initialization.

Each of the initialized all-solid state secondary batteries was charged at a current density of 0.2 mA/cm$^2$ until the battery voltage reached 4.2 V and then discharged at a current density of 0.2 mA/cm$^2$ until the battery voltage reached 2.5 V. The above-described charging and discharging was considered as one cycle, and the charging and discharging was repeated.

The discharge capacity at the first cycle of this charging and discharging after the initialization was considered as 100%, and the number of cycles repeated until the discharge capacity retention reached 80% was evaluated using the following standards. In the present test, the evaluation standards of "C" or higher are pass.

—Evaluation Standards—
A: 200 cycles or more
B: 100 cycles or more and less than 200 cycles
C: 50 cycles or more and less than 100 cycles
D: Less than 50 cycles
E: Charging and discharging was not possible.

TABLE 6

| No. | Layer constitution Positive electrode layer | Solid electrolyte layer | Resistance | Cycle characteristics | Note |
|---|---|---|---|---|---|
| 201 | U-1 | S-1 | A | B | Present Invention |
| 202 | U-2 | S-2 | A | B | Present Invention |
| 203 | U-3 | S-3 | C | C | Present Invention |
| 204 | U-4 | S-4 | A | A | Present Invention |
| 205 | U-5 | S-5 | B | C | Present Invention |
| 206 | U-6 | S-6 | A | B | Present Invention |
| 207 | U-7 | S-7 | B | C | Present Invention |
| 208 | U-8 | S-8 | C | C | Present Invention |
| 209 | U-9 | S-9 | C | B | Present Invention |
| c21 | V-1 | T-1 | D | E | Comparative Example |
| c22 | V-2 | T-2 | E | E | Comparative Example |

The results of Table 6 show that, in the all-solid state secondary batteries in which the positive electrode active material layer and the solid electrolyte layer were formed using the solid electrolyte composition of the present invention including the inorganic solid electrolyte, the specific binder particles, and the dispersion medium, the resistance was small, and furthermore, the cycle characteristics (the bonding property) were also excellent.

In contrast, in the all-solid state secondary batteries in which the positive electrode active material layer and the solid electrolyte layer were formed using the solid electrolyte composition for comparison not containing the specific binder particles, neither the resistance nor the cycle characteristics were sufficient.

The present invention has been described together with the embodiment; however, unless particularly specified, the present inventors do not intend to limit the present invention to any detailed portion of the description and consider that the present invention is supposed to be broadly interpreted within the concept and scope of the present invention described in the claims.

The present application claims priority on the basis of JP2015-241755 filed on Dec. 11, 2015 in Japan, the content of which is incorporated herein by reference.

Explanation of References

1: negative electrode collector
2: negative electrode active material layer
3: solid electrolyte layer
4: positive electrode active material layer
5: positive electrode collector
6: operation portion
10: all-solid state secondary battery
11: coin case
12: sheet for all-solid state secondary battery
13: cell for measuring ion conductivity (coin battery)

What is claimed is:

1. A solid electrolyte composition comprising:
an inorganic solid electrolyte having conductivity for ions of metal elements belonging to Group I or II of the periodic table;
binder particles which include a polymer having an SP value of 11 cal$^{1/2}$ cm$^{-3/2}$ or more and have an average particle diameter of 10 nm or more and 50,000 nm or less, wherein the SP value of the polymer is a value that is computed from the SP values of individual repeating units obtained using the Hoy method; and
a dispersion medium,
wherein the mass-average molecular weight of the polymer forming the binder particles is 5,000 or more, and
the polymer is an acrylic resin and said acrylic resin includes a repeating unit of at least one of monomers represented by the following Formulae (a-1) to (a-3) and (a-7),

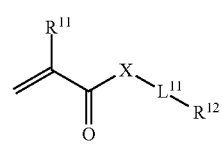

(a-1)

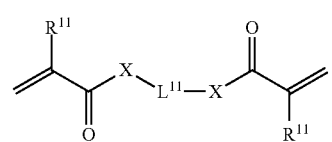

(a-2)

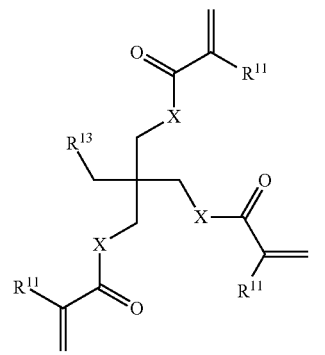

(a-3)

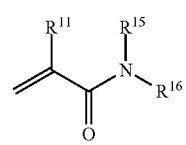

(a-7)

wherein the acrylic resin including a repeating unit of a monomer represented by the Formula (a-1) has the repeating unit of a monomer represented by the Formula (a-1) in its main chain and a repeating unit of a macromonomer having a mass-average molecular weight of 1,000 or more and 500,000 or less as the side chain component, said macromonomer containing a repeating unit of a (meth)acrylic acid ester monomer,
in the Formula (a-1), $R^{11}$ represents a hydrogen atom, a halogen atom, an alkyl group, an alkenyl group, an alkynyl group, or an aryl group, X represents O or >NH, $L^{11}$ represents a single bond or an unsubstituted alkylene group having 1 to 3 carbon atoms, and $R^{12}$ represents a hydrogen atom, an unsubstituted alkyl group having 1 to 6 carbon atoms, or a hydroxyl group (—OH), in the Formulae (a-2), (a-3) and (a-7), $L^{11}$ represents a single bond or a linking group that is selected from a group consisting of a hydrocarbon linking group selected from a group consisting of an alkylene group having 1 to 10 carbon atoms, an alkenylene group having 2 to 10 carbon atoms, an alkynylene groups having 2 to 10 carbon atoms, an arylene groups having 6 to 22 carbon atoms, and a combination thereof; a hetero linking group selected from a group consisting of a carbonyl group (—CO—), a thiolcarbonyl group (—CS—), a thioether group (—S—), an imino group (—$NR^N$—), an ammonium linking group (—$NR^N_2$,—), a polysulfide group having 1 to 8 sulfur atoms, an imine linking group ($R^N$—N=C<, —N=C($R^N$)—), a sulfonyl group (—$SO_2$—), a sulfinyl group (—SO—), a phosphoric acid linking group (—O—P(OH)(O)—O—), a phosphonic acid linking group (—P(OH)(O)—O—), and a combination thereof, wherein $R^N$ has the same meaning as $R^{12}$; and a linking group made of a combination thereof, X represents —O— or >NH, $R^{11}$ represents a hydrogen atom, a hydroxy group, a halogen atom, an alkyl group, an alkenyl group, an alkynyl group, or an aryl group, $R^{12}$ represents a hydrogen atom or a substituent, $R^{13}$ represents a hydrogen atom, an alkyl group, a hydroxy group-containing group, or a carboxy group-containing group and $R^{13}$ may be the linking group of $L^{11}$ and constitute a dimer at this portion, and $R^{15}$ and $R^{16}$ each independently represent a substituent.

2. The solid electrolyte composition according to claim 1, wherein the polymer includes a repeating unit derived from a monomer having an SP value of 12 $cal^{1/2}$ $cm^{-3/2}$ or more or a partial structure derived from a condensation component having an SP value of 12 $cal^{1/2}$ $cm^{-3/2}$ or more in an amount of 35% by mass or more and 100% by mass or less of the entirety of the polymer.

3. The solid electrolyte composition according to claim 1, wherein a glass transition temperature of the polymer is 30° C. or lower.

4. The solid electrolyte composition according to claim 1, wherein the polymer includes a hydroxy group or a carbamoyl group.

5. The solid electrolyte composition according to claim 1, wherein the inorganic solid electrolyte is represented by Formula (1), $$L_{a1}M_{b1}P_{c1}S_{d1}A_{e1} \quad (1)$$

in the formula, L represents an element selected from Li, Na, and K, M represents an element selected from B, Zn, Sn, Si, Cu, Ga, Sb, Al, and Ge, A represents I, Br, Cl, or F, a1 to e1 represent the compositional ratios among the respective elements, and a1:b1:c1:d1:e1 satisfies 1 to 12:0 to 5:1:2 to 12:0 to 10.

6. The solid electrolyte composition according to claim 1, wherein a C log P value of the dispersion medium is 1 or more.

7. The solid electrolyte composition according to claim 1, wherein the dispersion medium is selected from an ether compound solvent, an aromatic compound solvent, and an aliphatic compound solvent.

8. The solid electrolyte composition according to claim 1, further comprising:

an active material capable of intercalating and deintercalating ions of metal elements belonging to Group I or Group II of the periodic table.

9. The solid electrolyte composition according to claim 8, wherein the active material is a transition metal oxide or a metal oxide.

10. A sheet for an all-solid state secondary battery, comprising:
a film of the solid electrolyte composition according to claim 1 formed on a base material.

11. An electrode sheet for an all-solid state secondary battery, comprising:
a film of the solid electrolyte composition according to claim 8 formed on a metal foil.

12. The solid electrolyte composition according to claim 1, wherein $L^{11}$ represents the hydrocarbon linking group or the hetero linking group.

13. The solid electrolyte composition according to claim 1, wherein an SP value of the polymer is 11.5 $cal^{1/2}$ $cm^{-3/2}$ or more.

14. An all-solid state secondary battery comprising:
a positive electrode active material layer;
a solid electrolyte layer; and
a negative electrode active material layer in this order,
wherein at least one of the positive electrode active material layer, the solid electrolyte layer, and the negative electrode active material layer is a layer including an inorganic solid electrolyte having conductivity for ions of metal elements belonging to Group I or II of the periodic table and binder particles which include a polymer having an SP value of 11 $cal^{1/2}$ $cm^{-3/2}$ or more and have an average particle diameter of 10 nm or more and 50,000 nm or less,
wherein the mass-average molecular weight of the polymer forming the binder particles is 5,000 or more, and the polymer is an acrylic resin and said acrylic resin includes a repeating unit of at least one of monomers represented by the following Formulae (a-1) to (a-3) and (a-7),

(a-1)

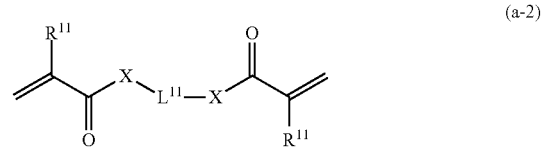
(a-2)

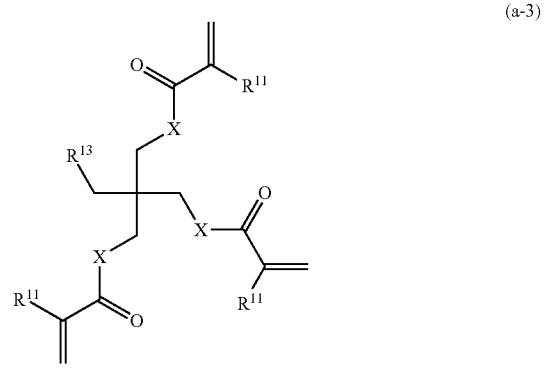
(a-3)

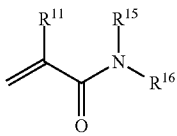

(a-7)

wherein the acrylic resin including a repeating unit of a monomer represented by the Formula (a-1) has the repeating unit of a monomer represented by the Formula (a-1) in its main chain and a repeating unit of a macromonomer having a mass-average molecular weight of 1,000 or more and 500,000 or less as the side chain component, said macromonomer containing a repeating unit of a (meth)acrylic acid ester monomer, in the Formula (a-1), $R^{11}$ represents a hydrogen atom, a halogen atom, an alkyl group, an alkenyl group, an alkynyl group, or an aryl group, X represents O or >NH, $L^{11}$ represents a single bond or an unsubstituted alkylene group having 1 to 3 carbon atoms, and $R^{12}$ represents a hydrogen atom, an unsubstituted alkyl group having 1 to 6 carbon atoms, or a hydroxyl group (—OH), in the Formulae (a-2), (a-3) and (a-7), $L^{11}$ represents a single bond or a linking group that is selected from a group consisting of a hydrocarbon linking group selected from a group consisting of an alkylene group having 1 to 10 carbon atoms, an alkenylene group having 2 to 10 carbon atoms, an alkynylene groups having 2 to 10 carbon atoms, an arylene groups having 6 to 22 carbon atoms, and a combination thereof; a hetero linking group selected from a group consisting of a carbonyl group (—CO—), a thiolcarbonyl group (—CS—), a thioether group (—S—), an imino group (—$NR^N$—), an ammonium linking group (—$NR^N{}_{2+}$—), a polysulfide group having 1 to 8 sulfur atoms, an imine linking group ($R^N$—N=C<, —N=C($R^N$)—), a sulfonyl group (—$SO_2$—), a sulfinyl group (—SO—), a phosphoric acid linking group (—O—P(OH)(O)—O—), a phosphonic acid linking group (—P(OH)(O)—O—), and a combination thereof, wherein $R^N$ has the same meaning as $R^{12}$; and a linking group made of a combination thereof, X represents —O— or >NH, $R^{11}$ represents a hydrogen atom, a hydroxy group, a halogen atom, an alkyl group, an alkenyl group, an alkynyl group, or an aryl group, $R^{12}$ represents a hydrogen atom or a substituent, $R^{13}$ represents a hydrogen atom, an alkyl group, a hydroxy group-containing group, or a carboxy group-containing group and $R^{13}$ may be the linking group of $L^{11}$ and constitute a dimer at this portion, and $R^{15}$ and $R^{16}$ each independently represent a substituent.

15. The all-solid state secondary battery according to claim 14, wherein $L^{11}$ represents the hydrocarbon linking group or the hetero linking group.

16. The all-solid state secondary battery according to claim 14, wherein an SP value of the polymer is 11.5 $cal^{1/2}$ $cm^{-3/2}$ or more.

* * * * *